US009846555B2

(12) United States Patent
Inoue et al.

(10) Patent No.: US 9,846,555 B2
(45) Date of Patent: Dec. 19, 2017

(54) STORAGE SYSTEM AND METHOD OF CREATING BACKUP OF STORAGE SYSTEM

(71) Applicant: HITACHI, LTD., Tokyo (JP)

(72) Inventors: Hironobu Inoue, Tokyo (JP); Hiroyuki Morimoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/121,573

(22) PCT Filed: Jun. 26, 2014

(86) PCT No.: PCT/JP2014/066960
§ 371 (c)(1),
(2) Date: Aug. 25, 2016

(87) PCT Pub. No.: WO2015/198439
PCT Pub. Date: Dec. 30, 2015

(65) Prior Publication Data
US 2016/0371008 A1 Dec. 22, 2016

(51) Int. Cl.
*G06F 3/06* (2006.01)
*G06F 11/16* (2006.01)
*G06F 12/00* (2006.01)

(52) U.S. Cl.
CPC ............... *G06F 3/065* (2013.01); *G06F 3/06* (2013.01); *G06F 3/0619* (2013.01);
(Continued)

(58) Field of Classification Search
CPC ........ G06F 3/065; G06F 11/16; G06F 3/0683; G06F 3/0619; G06F 3/0644; G06F 3/06; G06F 12/00
See application file for complete search history.

(56) References Cited

U.S. PATENT DOCUMENTS 8,161,257 B2 * 4/2012 Takahashi ........... G06F 11/1466
711/162
2005/0235121 A1 10/2005 Ito et al.
(Continued)

FOREIGN PATENT DOCUMENTS

JP 2005-309550 A 11/2005
JP 2005-309793 A 11/2005
JP 5042644 B2 10/2012

*Primary Examiner* — Michael Alsip
(74) *Attorney, Agent, or Firm* — Volpe and Koenig, P.C.

(57) ABSTRACT

According to the present invention, a process that requires for creating a backup at a designated time point is executed by sharing among a plurality of storage control apparatuses. An intermediate storage apparatus 2 reads journal data and a JNCB from a primary storage apparatus 1, and stores the journal data and the JNCB in an intermediate journal volume 28. A secondary storage apparatus 3 reads the journal data and the JNCB from the intermediate storage apparatus 2, and stores the journal data and the JNCB in a secondary journal volume 38. After the secondary storage apparatus 3 having a designated generation restores the journal data up to a designated time point into a secondary data volume 37, the secondary storage apparatus 3 splits a copy pair. Another secondary storage apparatus 3 executes a regular restoring process.

13 Claims, 37 Drawing Sheets

(52) U.S. Cl.
CPC .......... *G06F 3/0644* (2013.01); *G06F 3/0683* (2013.01); *G06F 11/16* (2013.01); *G06F 12/00* (2013.01)

(56) References Cited

U.S. PATENT DOCUMENTS

| | | |
|---|---|---|
| 2005/0240740 A1 | 10/2005 | Takeda et al. |
| 2008/0098188 A1 | 4/2008 | Ito et al. |
| 2008/0177964 A1 | 7/2008 | Takahashi et al. |
| 2009/0327629 A1 | 12/2009 | Ito et al. |
| 2010/0199038 A1 | 8/2010 | Ito et al. |
| 2011/0106766 A1 | 5/2011 | Takahashi et al. |
| 2012/0221814 A1 | 8/2012 | Takahashi et al. |
| 2012/0290787 A1 | 11/2012 | Ito et al. |
| 2014/0317366 A1* | 10/2014 | Sakata .................... G06F 3/065 711/162 |
| 2014/0351538 A1* | 11/2014 | Kono .................... G06F 3/0647 711/162 |
| 2015/0331753 A1* | 11/2015 | Nakajima ............... G06F 3/067 714/15 |

* cited by examiner

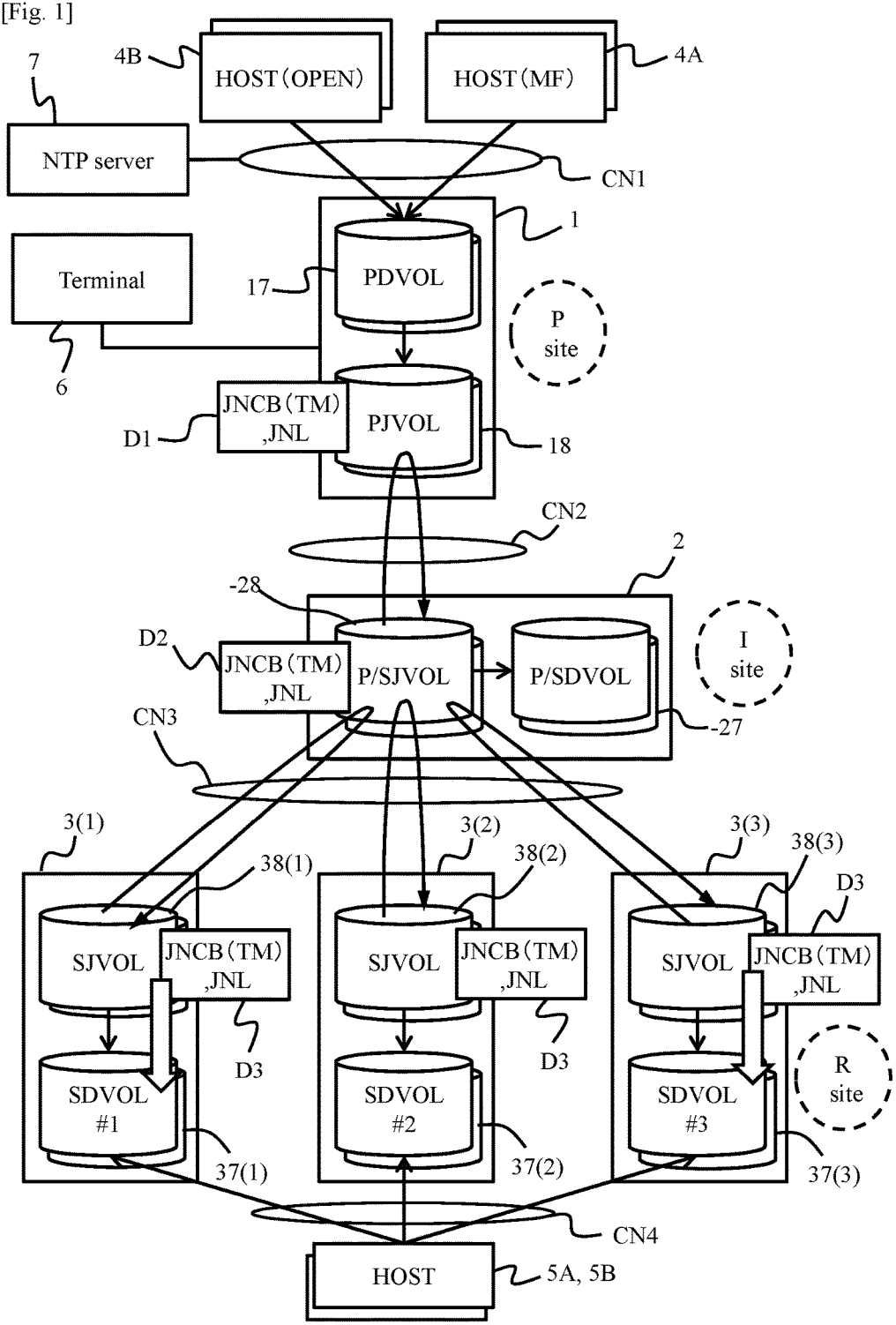
[Fig. 1]

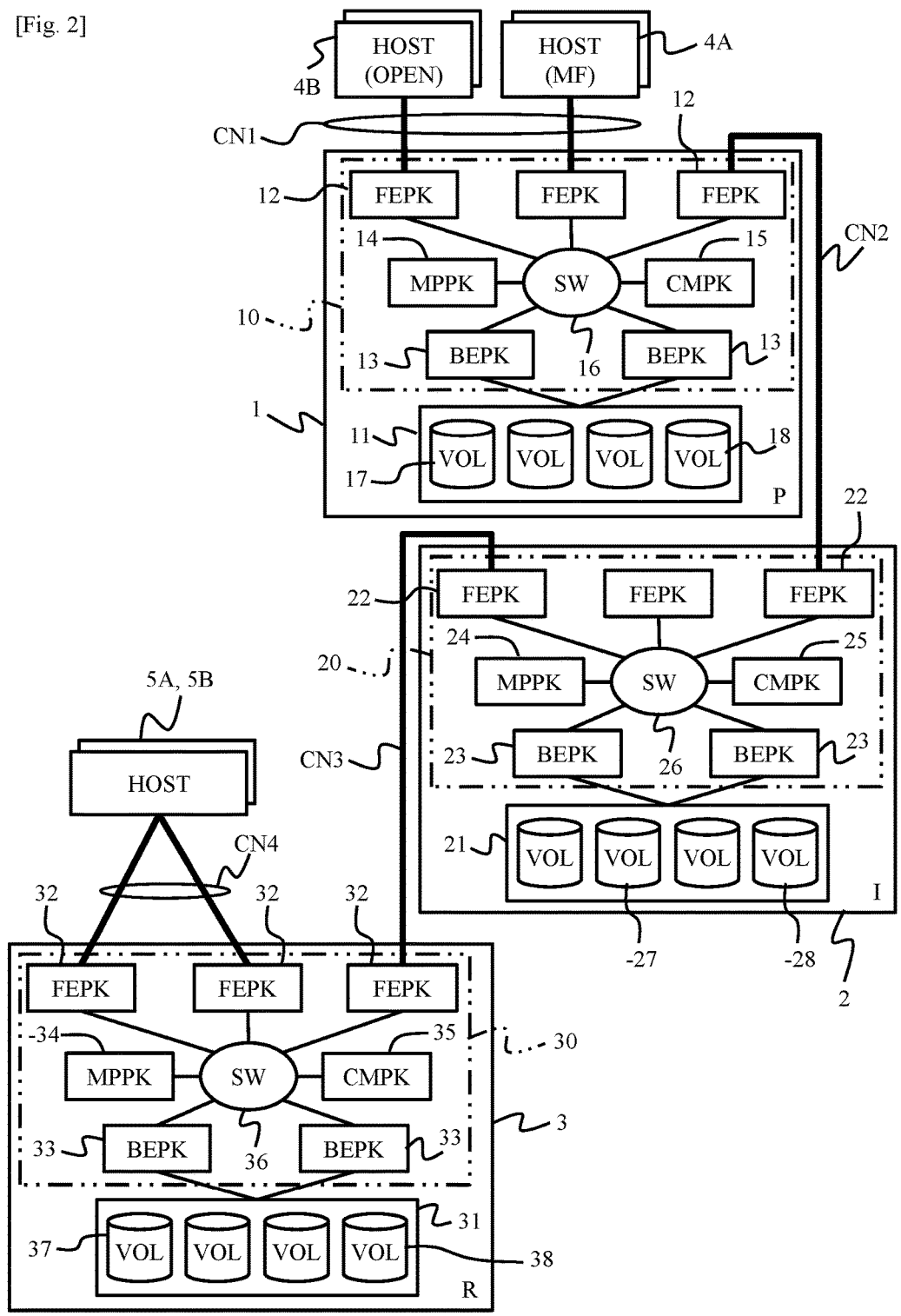
[Fig. 2]

[Fig. 3]
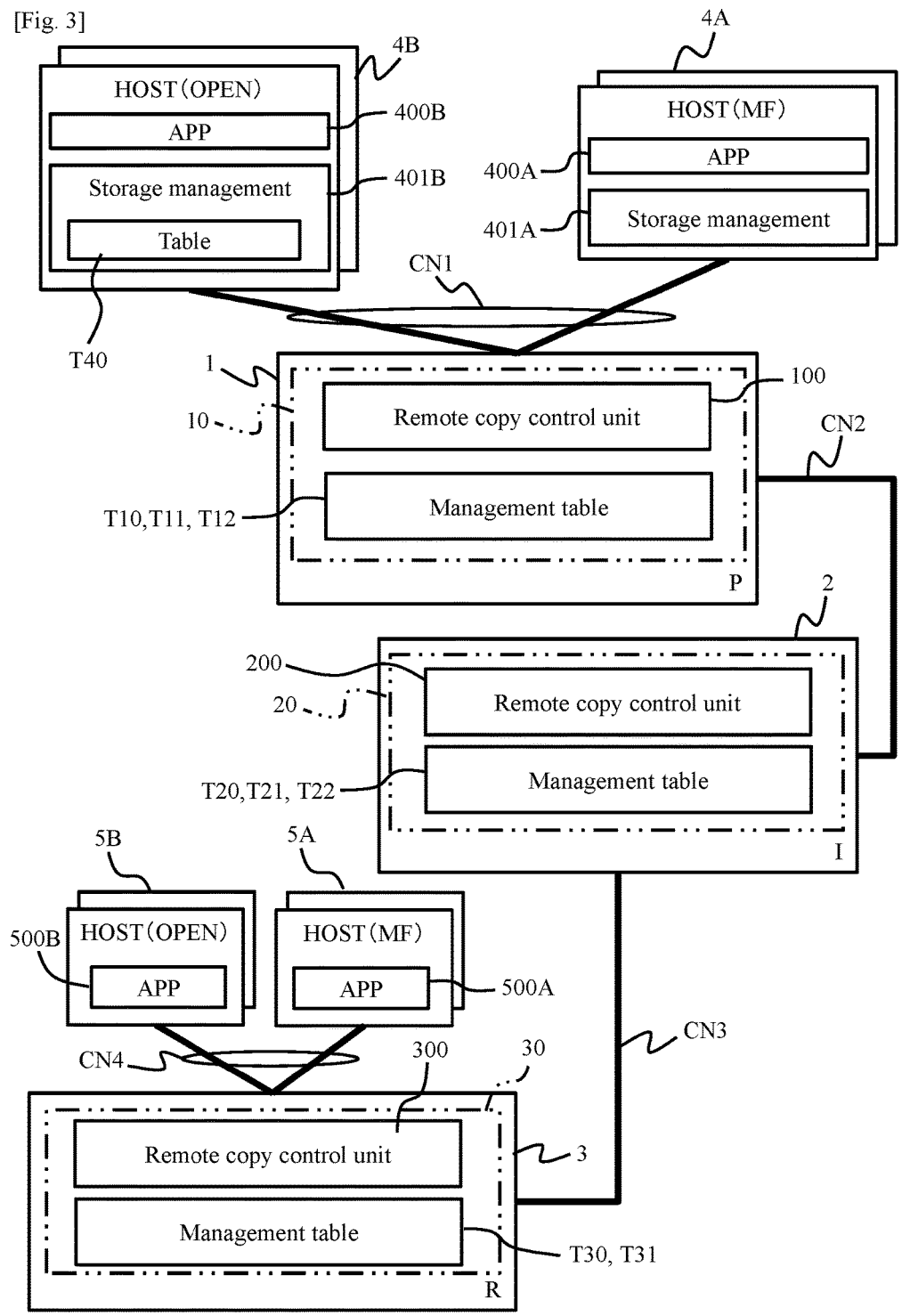

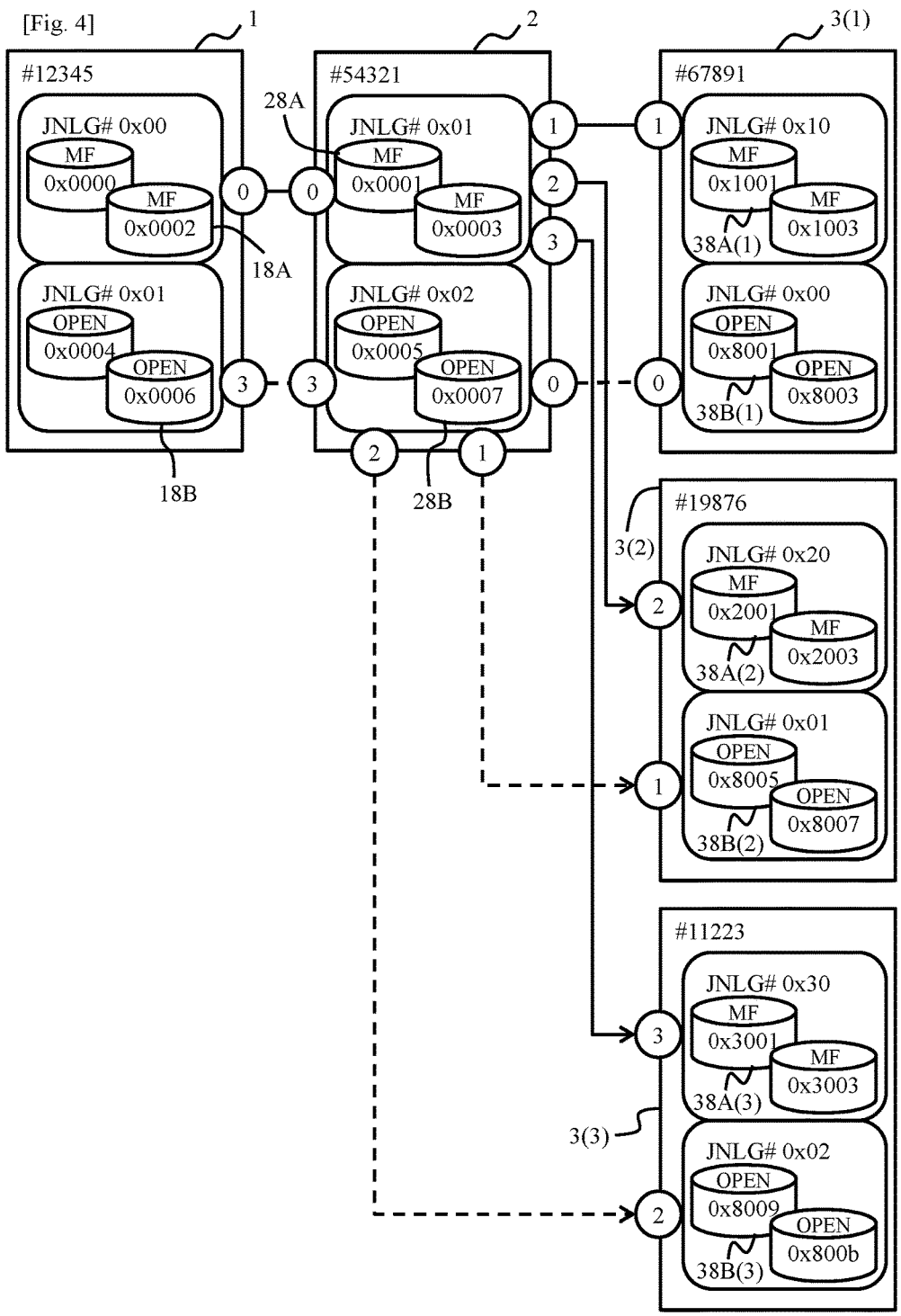

[Fig. 5]

P-site remote copy pair management table T10

| # | Pair | Type | Pair-source VOL | | | | Pair-destination VOL | | | | Mirror attribute | Pair state | |
|---|---|---|---|---|---|---|---|---|---|---|---|---|---|
| | | | SN | VOL# | JNLG# | JNL attribute (JNL atr) | SN | VOL# | JNLG# | MID | | | |
| 0x0000 | Yes | MF | 12345 | 0x0000 | 0x00 | M | 54321 | 0x0001 | 0x01 | 0 | M | PAIR | ... |
| 0x0001 | Yes | MF | 12345 | 0x0002 | 0x00 | M | 54321 | 0x0003 | 0x01 | 0 | M | PAIR | ... |
| 0x0002 | Yes | OPEN | 12345 | 0x0004 | 0x01 | M | 54321 | 0x0005 | 0x02 | 3 | M | PAIR | ... |
| 0x0003 | Yes | OPEN | 12345 | 0x0006 | 0x01 | M | 54321 | 0x0007 | 0x02 | 3 | M | PAIR | ... |
| 0x0004 | Yes | MF | 12345 | 0x0008 | 0x10 | M | 22222 | 0x0009 | 0x11 | 0 | R | PSUS | ... |
| 0x0005 | No | NULL | NULL | NULL | NULL | NULL | NULL | NULL | NULL | NULL | NULL | NULL | ... |
| ... | ... | ... | ... | ... | ... | ... | ... | ... | ... | ... | ... | ... | ... |
| 0xffff | No | NULL | NULL | NULL | NULL | NULL | NULL | NULL | NULL | NULL | NULL | NULL | ... |

[Fig. 6]

I-site remote copy pair management table T20

| # | Pair | Type | Pair-source VOL | | | | Pair-destination VOL | | | | MID | Mirror attribute | Pair state |
|---|---|---|---|---|---|---|---|---|---|---|---|---|---|
| | | | SN | VOL# | JNLG# | JNL atr | SN | VOL# | JNLG# | | | | |
| 0x0000 | Yes | MF | 54321 | 0x0001 | 0x01 | M/R | 12345 | 0x0000 | 0x00 | 0 | R | PAIR |
| 0x0001 | Yes | MF | 54321 | 0x0003 | 0x01 | M/R | 12345 | 0x0002 | 0x00 | 0 | R | PAIR |
| 0x0002 | Yes | MF | 54321 | 0x0001 | 0x01 | M/R | 67891 | 0x1001 | 0x10 | 1 | M | PAIR |
| 0x0003 | Yes | MF | 54321 | 0x0003 | 0x01 | M/R | 67891 | 0x1003 | 0x10 | 1 | M | PAIR |
| 0x0004 | Yes | MF | 54321 | 0x0001 | 0x01 | M/R | 19876 | 0x2001 | 0x20 | 2 | M | PAIR |
| 0x0005 | Yes | MF | 54321 | 0x0003 | 0x01 | M/R | 19876 | 0x2003 | 0x20 | 2 | M | PAIR |
| 0x0006 | Yes | MF | 54321 | 0x0001 | 0x01 | M/R | 11223 | 0x3001 | 0x30 | 3 | M | PAIR |
| 0x0007 | Yes | MF | 54321 | 0x0003 | 0x01 | M/R | 11223 | 0x3003 | 0x30 | 3 | M | PAIR |
| 0x0008 | Yes | OPEN | 54321 | 0x0005 | 0x02 | M/R | 12345 | 0x0004 | 0x01 | 3 | R | PAIR |
| 0x0009 | Yes | OPEN | 54321 | 0x0007 | 0x02 | M/R | 12345 | 0x0006 | 0x01 | 3 | R | PAIR |
| 0x000a | Yes | OPEN | 54321 | 0x0005 | 0x02 | M/R | 67891 | 0x8001 | 0x00 | 0 | M | PAIR |
| 0x000b | Yes | OPEN | 54321 | 0x0007 | 0x02 | M/R | 67891 | 0x8003 | 0x00 | 0 | M | PAIR |
| 0x000c | Yes | OPEN | 54321 | 0x0005 | 0x02 | M/R | 19876 | 0x8005 | 0x01 | 1 | M | PAIR |
| 0x000d | Yes | OPEN | 54321 | 0x0007 | 0x02 | M/R | 19876 | 0x8007 | 0x01 | 1 | M | PAIR |
| 0x000e | Yes | OPEN | 54321 | 0x0005 | 0x02 | M/R | 11223 | 0x8009 | 0x02 | 2 | M | PAIR |
| 0x000f | Yes | OPEN | 54321 | 0x0007 | 0x02 | M/R | 11223 | 0x800b | 0x02 | 2 | M | PAIR |
| 0x0010 | Yes | MF | 54321 | 0x1111 | 0x80 | R | 55555 | 0x2222 | 0x81 | 2 | R | PAIR |
| 0x0011 | Yes | OPEN | 54321 | 0x3333 | 0x82 | M | 55555 | 0x4444 | 0x83 | 3 | M | PSUS |
| 0x0012 | No | NULL | NULL | NULL | NULL | NULL | NULL | NULL | NULL | NULL | NULL | NULL |
| ... | | | | | | | | | | | | |
| 0xffff | No | NULL | NULL | NULL | NULL | NULL | NULL | NULL | NULL | NULL | NULL | NULL |

[Fig. 7]

R-site remote copy pair management table T30(1)

| # | Pair | Type | Pair-source VOL ||||| Pair-destination VOL |||| MID | Mirror attribute | Pair state | |
|---|---|---|---|---|---|---|---|---|---|---|---|---|---|---|
| | | | SN | VOL# | JNLG# | JNL atr | SN | VOL# | JNLG# | | | | |
| 0x0000 | Yes | MF | 67891 | 0x1001 | 0x10 | R | 54321 | 0x0001 | 0x01 | 1 | R | PAIR | ... |
| 0x0001 | Yes | MF | 67891 | 0x1003 | 0x10 | R | 54321 | 0x0003 | 0x01 | 1 | R | PAIR | ... |
| 0x0002 | Yes | OPEN | 67891 | 0x8001 | 0x00 | R | 54321 | 0x0005 | 0x02 | 0 | R | PAIR | ... |
| 0x0003 | Yes | OPEN | 67891 | 0x8003 | 0x00 | R | 54321 | 0x0007 | 0x02 | 0 | R | PAIR | ... |
| 0x0004 | Yes | MF | 66666 | 0x0008 | 0xfe | W | 77777 | 0x0009 | 0xff | 0 | W | PSUS | ... |
| 0x0005 | No | NULL | NULL | NULL | NULL | NULL | NULL | NULL | NULL | NULL | NULL | NULL | ... |
| ... | ... | ... | ... | ... | ... | ... | ... | ... | ... | ... | ... | ... | ... |
| 0xffff | No | NULL | NULL | NULL | NULL | NULL | NULL | NULL | NULL | NULL | NULL | NULL | ... |

[Fig. 8]

R-site remote copy pair management table T30(2)

| # | Pair | Type | Pair-source VOL | | | | Pair-destination VOL | | | MID | Mirror attribute | Pair state |
|---|---|---|---|---|---|---|---|---|---|---|---|---|
| | | | SN | VOL# | JNLG# | JNL atr | SN | VOL# | JNLG# | | | |
| 0x0000 | Yes | MF | 19876 | 0x2001 | 0x20 | R | 54321 | 0x0001 | 0x01 | 2 | R | PAIR |
| 0x0001 | Yes | MF | 19876 | 0x2003 | 0x20 | R | 54321 | 0x0003 | 0x01 | 2 | R | PAIR |
| 0x0002 | Yes | OPEN | 19876 | 0x8005 | 0x01 | R | 54321 | 0x0005 | 0x02 | 1 | R | PAIR |
| 0x0003 | Yes | OPEN | 19876 | 0x8007 | 0x01 | R | 54321 | 0x0007 | 0x02 | 1 | R | PAIR |
| 0x0004 | Yes | OPEN | 88888 | 0x0008 | 0xfe | M | 99999 | 0x0009 | 0xff | 0 | M | PSUS |
| 0x0005 | No | NULL | NULL | NULL | NULL | NULL | NULL | NULL | NULL | NULL | NULL | NULL |
| ... | ... | ... | ... | ... | ... | ... | ... | ... | ... | ... | ... | ... |
| 0xffff | No | NULL | NULL | NULL | NULL | NULL | NULL | NULL | NULL | NULL | NULL | NULL |

[Fig. 9]

R-site remote copy pair management table T30(3)

| # | Pair | Type | Pair-source VOL ||| JNL attribute (JNL atr) | Pair-destination VOL ||| MID | Mirror attribute | Pair state |
|---|---|---|---|---|---|---|---|---|---|---|---|---|
| | | | SN | VOL# | JNLG# | | SN | VOL# | JNLG# | | | |
| 0x0000 | Yes | MF | 11223 | 0x3001 | 0x30 | R | 54321 | 0x0001 | 0x01 | 3 | R | PAIR |
| 0x0001 | Yes | MF | 11223 | 0x3003 | 0x30 | R | 54321 | 0x0003 | 0x01 | 3 | R | PAIR |
| 0x0002 | Yes | OPEN | 11223 | 0x8009 | 0x02 | R | 54321 | 0x0005 | 0x02 | 2 | R | PAIR |
| 0x0003 | Yes | OPEN | 11223 | 0x800b | 0x02 | R | 54321 | 0x0007 | 0x02 | 2 | R | PAIR |
| 0x0004 | Yes | MF | 10101 | 0x0008 | 0xfe | M | 20202 | 0x0009 | 0xff | 0 | M | PSUS |
| 0x0005 | No | NULL | NULL | NULL | NULL | NULL | NULL | NULL | NULL | NULL | NULL | NULL |
| ... | ... | ... | ... | ... | ... | ... | ... | ... | ... | ... | ... | ... |
| 0xffff | No | NULL | NULL | NULL | NULL | NULL | NULL | NULL | NULL | NULL | NULL | NULL |

[Fig. 10]

P-site JNL management table T11

| # | grp. | JNLG# | Type | JVOL# | JNL atr | Freeze | PN | Reservation | Backup Time point | Backup Status | Backup TOV | MID | Y/N | M/R | MIDG# | State |
|---|---|---|---|---|---|---|---|---|---|---|---|---|---|---|---|---|
| 0x00 | Yes | 0x00 | MF | 0xXXXX | M | NULL | 2 | G#0 : No | NULL | NULL | NULL | 0x00 | Yes | M | NULL | start |
| | | | | | | | | G#1 : Yes | 10:00 | Complete | 5min | 0x01 | No | NULL | NULL | init. |
| | | | | | | | | G#2 : No | NULL | NULL | NULL | 0x02 | No | NULL | NULL | init. |
| | | | | | | | | G#3 : Spare | NULL | NULL | NULL | 0x03 | No | NULL | NULL | init. |
| 0x01 | Yes | 0x01 | OPEN | 0xYYYY | M | Received | 2 | G#0 : No | NULL | NULL | NULL | 0x00 | No | NULL | NULL | init. |
| | | | | | | | | G#1 : No | NULL | NULL | NULL | 0x01 | No | NULL | NULL | init. |
| | | | | | | | | G#2 : Yes | NULL | Not Complete | NULL | 0x02 | Yes | M | NULL | start |
| | | | | | | | | G#3 : No | NULL | NULL | NULL | 0x03 | Yes | R | 0x00 | stop |
| 0x02 | Yes | 0x10 | MF | 0xXXXX | R | NULL | 1 | G#0 : No | NULL | NULL | NULL | 0x00 | No | NULL | NULL | init. |
| | | | | | | | | G#1 : No | NULL | NULL | NULL | 0x01 | No | NULL | NULL | init. |
| | | | | | | | | G#2 : No | NULL | NULL | NULL | 0x02 | No | NULL | NULL | init. |
| | | | | | | | | G#3 : Spare | NULL | NULL | NULL | 0x03 | No | NULL | NULL | init. |

[Fig. 11]

I-site JNL management table T21

| # | grp. | JNLG# | Type | JVOL# | JNL atr | Freeze | PN | Backup Reservation | Backup Time point | Backup Status | TOV | MID | Y/N | M/R | MIDG# | State |
|---|---|---|---|---|---|---|---|---|---|---|---|---|---|---|---|---|
| 0x00 | Yes | 0x01 | MF | 0xXXXX | M/R | NULL | 2 | G#0 : No | NULL | NULL | NULL | 0x00 | Yes | R | NULL | start |
| | | | | | | | | G#1 : No | NULL | NULL | NULL | 0x01 | Yes | M | 0x00 | start |
| | | | | | | | | G#2 : No | NULL | NULL | NULL | 0x02 | Yes | M | 0x01 | start |
| | | | | | | | | G#3 : Spare | NULL | NULL | NULL | 0x03 | Yes | M | 0x02 | start |
| 0x01 | Yes | 0x02 | OPEN | 0xYYYY | M/R | NULL | 2 | G#0 : No | NULL | NULL | NULL | 0x00 | Yes | M | 0x00 | start |
| | | | | | | | | G#1 : No | NULL | NULL | NULL | 0x01 | Yes | M | 0x01 | start |
| | | | | | | | | G#2 : No | NULL | NULL | NULL | 0x02 | Yes | M | 0x02 | start |
| | | | | | | | | G#3 : Spare | NULL | NULL | NULL | 0x03 | Yes | R | NULL | init. |
| 0x02 | Yes | 0x80 | MF | 0xXXXX | R | NULL | 1 | G#0 : No | NULL | NULL | NULL | 0x00 | No | ... | NULL | init. |
| | | | | | | | | G#1 : No | NULL | NULL | NULL | 0x01 | No | ... | NULL | init. |
| | | | | | | | | G#2 : No | NULL | NULL | NULL | 0x02 | Yes | ... | 0x00 | start |
| | | | | | | | | G#3 : Spare | NULL | NULL | NULL | 0x03 | No | ... | NULL | init. |

[Fig. 12]

R-site JNL management table T31(1)

| grp.# | JNLG# | Type | JVOL# | JNL atr | Freeze | PN | Reservation | Backup Time point | Backup Status | IOW | MID | Y/N | M/R | MIDG# | State |
|---|---|---|---|---|---|---|---|---|---|---|---|---|---|---|---|
| 0x00 Yes | 0x10 | MF | 0xXXXX | R | NULL | 2 | G#0 : No | NULL | NULL | NULL | 0x00 | No | NULL | NULL | init. |
| | | | | | | | G#1 : No | NULL | NULL | NULL | 0x01 | Yes | R | 0x00 | start |
| | | | | | | | G#2 : No | NULL | NULL | NULL | 0x02 | No | NULL | NULL | init. |
| | | | | | | | G#3 : Spare | NULL | NULL | NULL | 0x03 | No | NULL | NULL | init. |
| 0x01 Yes | 0x00 | OPEN | 0xYYYY | R | NULL | 2 | G#0 : No | NULL | NULL | NULL | 0x00 | Yes | R | 0x00 | start |
| | | | | | | | G#1 : No | NULL | NULL | NULL | 0x01 | No | NULL | NULL | init. |
| | | | | | | | G#2 : No | NULL | NULL | NULL | 0x02 | No | NULL | NULL | init. |
| | | | | | | | G#3 : Spare | NULL | NULL | NULL | 0x03 | No | NULL | NULL | init. |
| 0x02 Yes | 0xfe | MF | 0xXXXX | M | NULL | 1 | G#0 : No | NULL | NULL | NULL | 0x00 | Yes | M | NULL | stop |
| | | | | | | | G#1 : No | NULL | NULL | NULL | 0x01 | No | NULL | NULL | init. |
| | | | | | | | G#2 : No | NULL | NULL | NULL | 0x02 | No | NULL | NULL | init. |
| | | | | | | | G#3 : Spare | NULL | NULL | NULL | 0x03 | No | NULL | NULL | init. |

[Fig. 13]

R-site JNL management table T31(2)

| # | grp. | JNLG# | Type | JVOL# | JNL atr | Freeze | PN | Reservation | Backup Time point | Backup Status | TOV | MID | Y/N | M/R | MIDG# | State |
|---|---|---|---|---|---|---|---|---|---|---|---|---|---|---|---|---|
| 0x00 | YES | 0x20 | MF | 0xXXXX | R | NULL | 2 | G#0 : No | NULL | NULL | NULL | 0x00 | No | NULL | NULL | init. |
| | | | | | | | | G#1 : No | NULL | NULL | NULL | 0x01 | No | NULL | NULL | init. |
| | | | | | | | | G#2 : No | NULL | NULL | NULL | 0x02 | Yes | R | 0x01 | start |
| | | | | | | | | G#3 : Spare | NULL | NULL | NULL | 0x03 | No | NULL | NULL | init. |
| 0x01 | YES | 0x01 | OPEN | 0xYYYY | R | NULL | 2 | G#0 : No | NULL | NULL | NULL | 0x00 | No | NULL | NULL | init. |
| | | | | | | | | G#1 : No | NULL | NULL | NULL | 0x01 | Yes | R | 0x01 | start |
| | | | | | | | | G#2 : No | NULL | NULL | NULL | 0x02 | No | NULL | NULL | init. |
| | | | | | | | | G#3 : Spare | NULL | NULL | NULL | 0x03 | No | NULL | NULL | init. |
| 0x02 | YES | 0xfe | OPEN | 0xXXXX | W | Not | 1 | G#0 : No | NULL | NULL | NULL | 0x00 | Yes | W | NULL | stop |
| | | | | | | | | G#1 : No | NULL | NULL | NULL | 0x01 | No | NULL | NULL | init. |
| | | | | | | | | G#2 : No | NULL | NULL | NULL | 0x02 | No | NULL | NULL | init. |
| | | | | | | | | G#3 : Spare | NULL | NULL | NULL | 0x03 | No | NULL | NULL | init. |

[Fig. 14]

R-site JNL management table T31(3)

| # | grp. | JNLG# | Type | JVOL# | JNL atr | Free size | PN | Reservation | Backup Time point | Status TOV | MID# | Y/N | M/R | MIDG# | State |
|---|------|-------|------|-------|---------|-----------|-----|-------------|-------------------|------------|------|-----|-----|-------|-------|
| 0x00 | YES | 0x30 | MF | 0xXXXX | R | NULL | 2 | G#0 : No | NULL | NULL | 0x00 | No | NULL | NULL | init. |
|  |  |  |  |  |  |  |  | G#1 : No | NULL | NULL | 0x01 | No | NULL | NULL | init. |
|  |  |  |  |  |  |  |  | G#2 : No | NULL | NULL | 0x02 | No | NULL | NULL | init. |
|  |  |  |  |  |  |  |  | G#3 : Spare | NULL | NULL | 0x03 | Yes | R | 0x02 | start |
| 0x01 | YES | 0x02 | OPEN | 0xYYYY | R | NULL | 2 | G#0 : No | NULL | NULL | 0x00 | No | NULL | NULL | init. |
|  |  |  |  |  |  |  |  | G#1 : No | NULL | NULL | 0x01 | Yes | R | 0x02 | start |
|  |  |  |  |  |  |  |  | G#2 : No | NULL | NULL | 0x02 | No | NULL | NULL | init. |
|  |  |  |  |  |  |  |  | G#3 : Spare | NULL | NULL | 0x03 | Yes | W | NULL | stop |
| 0x02 | YES | 0xfe | MF | 0xXXXX | W | NULL | 1 | G#0 : No | NULL | NULL | 0x00 | No | NULL | NULL | init. |
|  |  |  |  |  |  |  |  | G#1 : No | NULL | NULL | 0x01 | No | NULL | NULL | init. |
|  |  |  |  |  |  |  |  | G#2 : No | NULL | NULL | 0x02 | No | NULL | NULL | init. |
|  |  |  |  |  |  |  |  | G#3 : Spare | NULL | NULL | 0x03 | NULL | NULL | NULL | init. |
| 0x03 | No | NULL | NULL | NULL | NULL | NULL | NULL | NULL | NULL | NULL | NULL | NULL | NULL | NULL | NULL |

[Fig. 15]

P-site JNCB management table (MF) T12A

| LDEV# | Start SLOT# | Start LBA | # of LBAs | SEQ# | TimeStamp | Transmission for each MID Y/N | Restored state for each MID | Marker for each generation Y/N | ... |
|---|---|---|---|---|---|---|---|---|---|
| 0x0000 | 0xXXXXX XXXX | 0xXXXX XXXXX | 0xXXXXX XXXX | 0x30 0000 01 | 08:00:00 | MID#0 transmitted | MID#0 restored | No for all generations | ... |
| 0x0000 | 0xXXXXX XXXX | 0xXXXX XXXXX | 0xXXXXX XXXX | 0x30 0000 02 | 08:00:03 | MID#0 transmitted | MID#0 restored | No for all generations | ... |
| 0x0000 | 0xXXXXX XXXX | 0xXXXX XXXXX | 0xXXXXX XXXX | 0x30 0000 03 | 08:10:24 | MID#0 transmitted | MID#0 restored | No for all generations | ... |
| ... | ... | ... | ... | ... | ... | ... | ... | ... | ... |
| 0x0000 | 0xXXXXX XXXX | 0xXXXX XXXXX | 0xXXXXX XXXX | 0x30 0001 00 | 09:59:59 | MID#0 transmitted | MID#0 restored | No for all generations | ... |
| 0x0002 | 0xXXXXX XXXX | 0xXXXX XXXXX | 0xXXXXX XXXX | 0x30 0001 01 | 10:00:02 | MID#0 transmitted | MID#0 restored | G#0 : No<br>G#1 : Yes<br>G#2 : No<br>G#3 : Spare | ... |
| 0x0002 | 0xXXXXX XXXX | 0xXXXX XXXXX | 0xXXXXX XXXX | 0x30 0001 02 | 10:00:12 | MID#0 untransmitted | MID#0 restoring not performed | No for all generations | ... |

[Fig. 16]

P-site JNCB management table (OPEN) T12B

| LDEV# | Start SLOT# | Start LBA | # of LBAs | SEQ# | Timestamp | Transmission for each MID Y/N | Restored state for each MID | Marker for each generation Y/N | |
|---|---|---|---|---|---|---|---|---|---|
| 0x0006 | 0xXXXX XXXX | 0xXXX XXXXX | 0xXXX XXXXX | 0x00 0000 01 | NULL | MID#3 transmitted | MID#3 restored | No for all generations | ... |
| 0x0004 | 0xXXXX XXXX | 0xXXX XXXXX | 0xXXX XXXXX | 0x00 0000 02 | NULL | MID#3 transmitted | MID#3 restored | No for all generations | ... |
| 0x0004 | 0xXXXX XXXX | 0xXXX XXXXX | 0xXXX XXXXX | 0x00 0000 03 | NULL | MID#3 transmitted | MID#3 restored | No for all generations | ... |
| ... | ... | ... | ... | ... | ... | ... | ... | ... | ... |
| 0x0004 | 0xXXXX XXXX | 0xXXX XXXXX | 0xXXX XXXXX | 0x00 0002 05 | NULL | MID#3 transmitted | MID#3 restored | No for all generations | ... |
| 0x0006 | 0xXXXX XXXX | 0xXXX XXXXX | 0xXXX XXXXX | 0x00 0002 06 | NULL | MID#3 transmitted | MID#3 restored | G#0 : No<br>G#1 : No<br>G#2 : Yes<br>G#3 : No | ... |
| 0x0006 | 0xXXXX XXXX | 0xXXX XXXXX | 0xXXX XXXXX | 0x00 0002 07 | NULL | MID#3 untransmitted | MID#3 restoring not performed | No for all generations | ... |

[Fig. 17]

I-site JNCB management table (MF) T22A

| LDEV# | Start SLOT# | Start LBA | # of LBAs | SEQ# | TimeStamp | Transmission for each MID Y/N | Restored state for each MID | Marker for each generation Y/N |
|---|---|---|---|---|---|---|---|---|
| 0x0000 | 0xXXXXXX XXX | 0xXXXX XXXX | 0xXXXXXX XX | 0x0000 0001 | 08:00:00 | MID#1 transmitted<br>MID#2 transmitted<br>MID#3 transmitted | MID#1 restored<br>MID#2 restored<br>MID#3 restored | No for all generations |
| 0x0000 | 0xXXXXXX XXX | 0xXXXX XXXX | 0xXXXXXX XX | 0x0000 0002 | 08:00:03 | MID#1 transmitted<br>MID#2 transmitted<br>MID#3 transmitted | MID#1 restored<br>MID#2 restored<br>MID#3 restored | No for all generations |
| 0x0002 | 0xXXXXXX XXX | 0xXXXX XXXX | 0xXXXXXX XX | 0x0000 0003 | 08:10:24 | MID#1 transmitted<br>MID#2 transmitted<br>MID#3 transmitted | MID#1 restored<br>MID#2 restored<br>MID#3 restored | No for all generations |
| ... | ... | ... | ... | ... | ... | ... | ... | ... |
| 0x0000 | 0xXXXXXX XXX | 0xXXXX XXXX | 0xXXXXXX XX | 0x0000 0100 | 09:59:59 | MID#1 transmitted<br>MID#2 transmitted<br>MID#3 transmitted | MID#1 restored<br>MID#2 restored<br>MID#3 restored | No for all generations |
| 0x0002 | 0xXXXXXX XXX | 0xXXXX XXXX | 0xXXXXXX XX | 0x0000 0101 | 10:00:02 | MID#1 untransmitted<br>MID#2 transmitted<br>MID#3 transmitted | MID#1 restoring not performed<br>MID#2 restored<br>MID#3 restored | G#0 : No<br>G#1 : Yes<br>G#2 : No<br>G#3 : Spare |

[Fig. 18]

I-site JNCB management table (OPEN) T22B

| LDEV# | Start SLOT # | Start LBA | # of LBAs | SEQ# | TimeStamp | Transmission for each MID Y/N | Restored state for each MID | Marker for each generation Y/N |
|---|---|---|---|---|---|---|---|---|
| ... | ... | ... | ... | ... | ... | ... | ... | ... |
| 0x0006 | 0xXXX XXXXX | 0xXXXXXX XX | 0xXXXXX XXX | 0x0000 0001 | NULL | MID#0 transmitted<br>MID#1 transmitted<br>MID#2 transmitted | MID#0 restored<br>MID#1 restored<br>MID#2 restored | No for all generations |
| 0x0004 | 0xXXX XXXXX | 0xXXXXXX XX | 0xXXXXX XXX | 0x0000 0002 | NULL | MID#0 transmitted<br>MID#1 transmitted<br>MID#2 transmitted | MID#0 restored<br>MID#1 restored<br>MID#2 restored | No for all generations |
| 0x0004 | 0xXXX XXXXX | 0xXXXXXX XX | 0xXXXXX XXX | 0x0000 0003 | NULL | MID#0 transmitted<br>MID#1 transmitted<br>MID# 2 transmitted | MID#0 restored<br>MID#1 restored<br>MID#2 restored | No for all generations |
| ... | ... | ... | ... | ... | ... | ... | ... | ... |
| 0x0004 | 0xXXX XXXXX | 0xXXXXXX XX | 0xXXXXX XXX | 0x0000 0205 | NULL | MID#0 transmitted<br>MID#1 transmitted<br>MID#2 transmitted | MID#0 restored<br>MID#1 restored<br>MID#2 restored | No for all generations |
| 0x0006 | 0xXXX XXXXX | 0xXXXXXX XX | 0xXXXXX XXX | 0x0000 0206 | NULL | MID#0 transmitted<br>MID#1 untransmitted<br>MID#2 transmitted | MID#0 restored<br>MID#1 restoring not performed<br>MID#2 restored | G#0 : No<br>G#1 : No<br>G#2 : Yes<br>G#3 : No |

[Fig. 19]
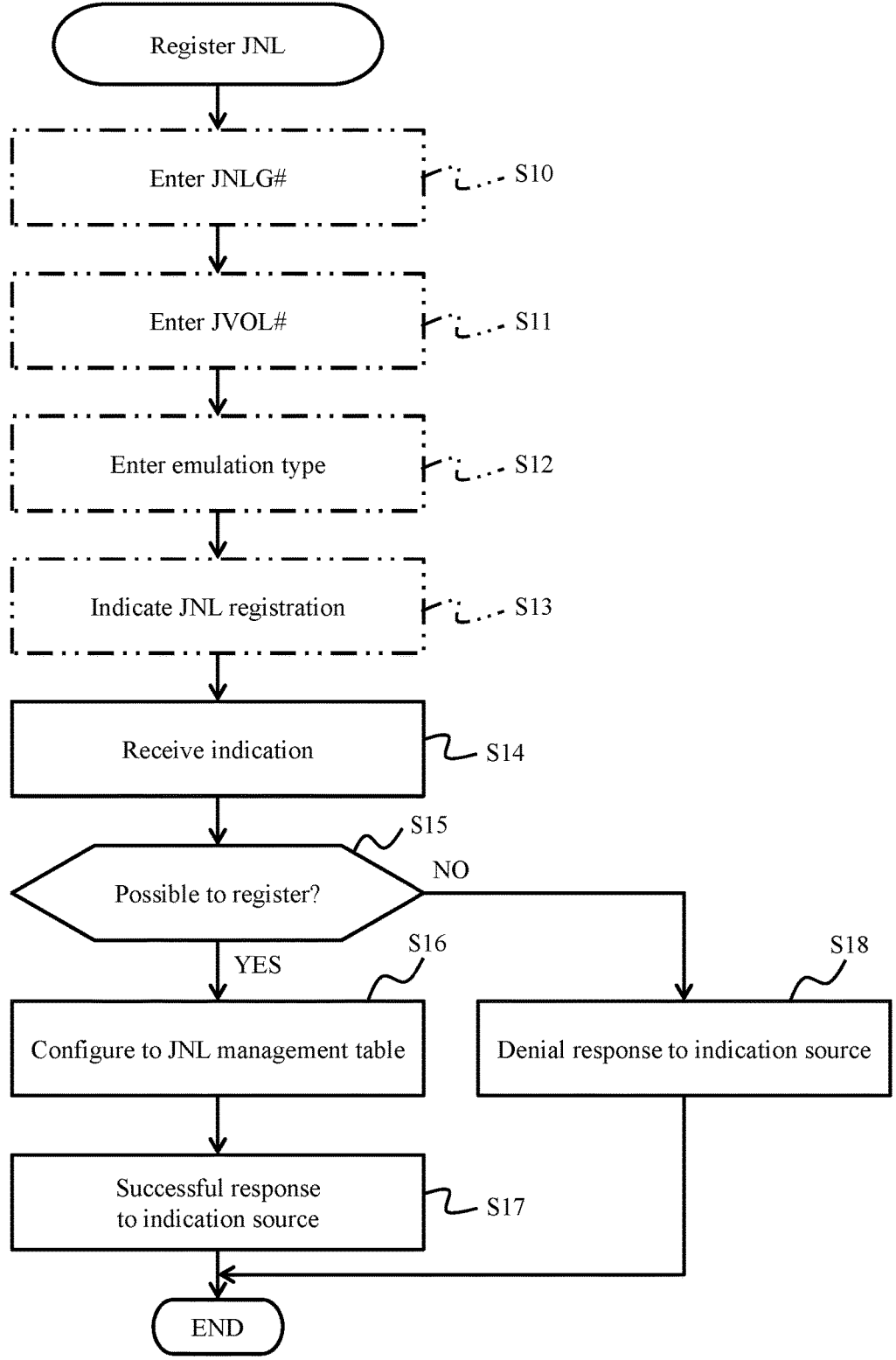

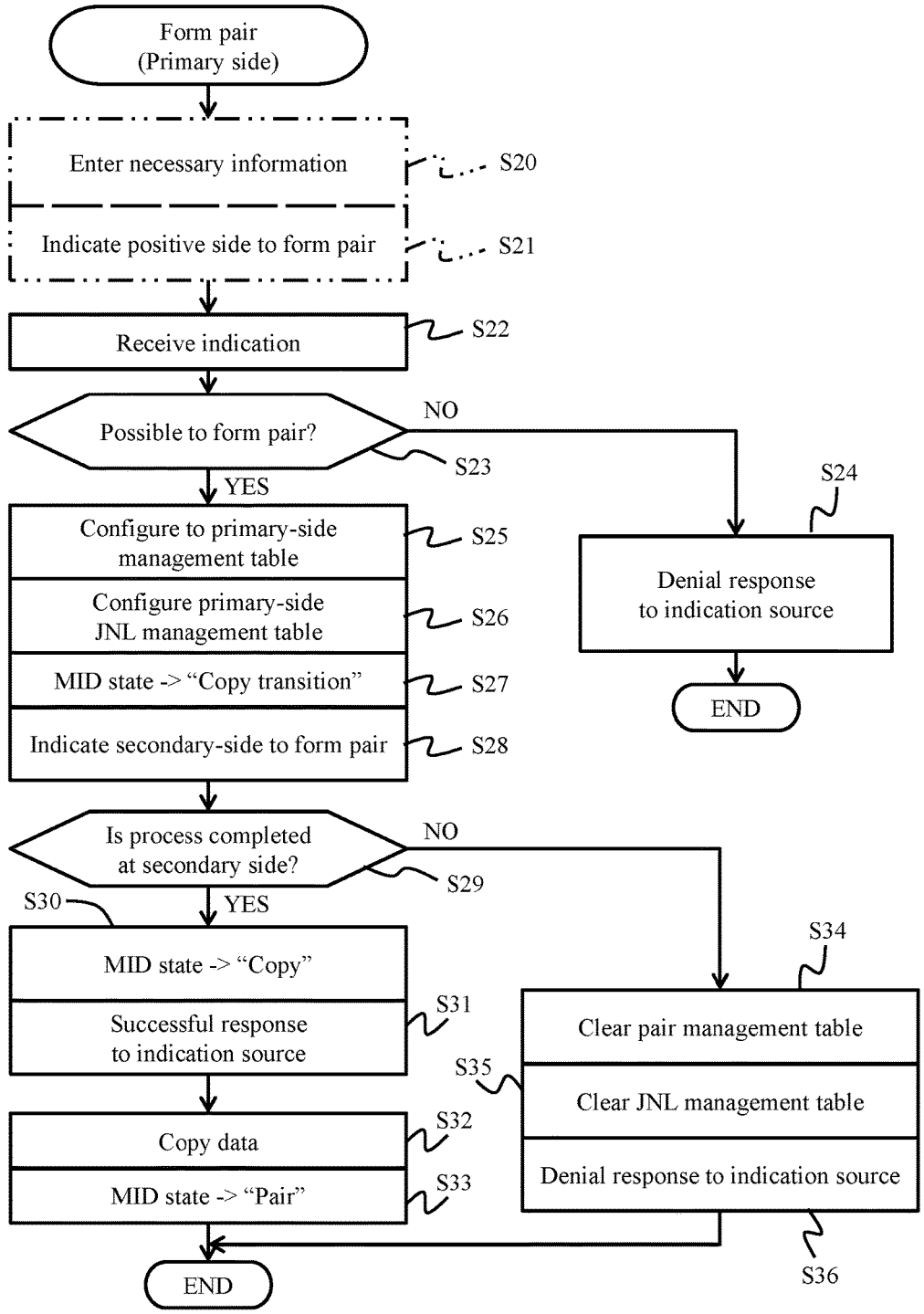

[Fig. 21]
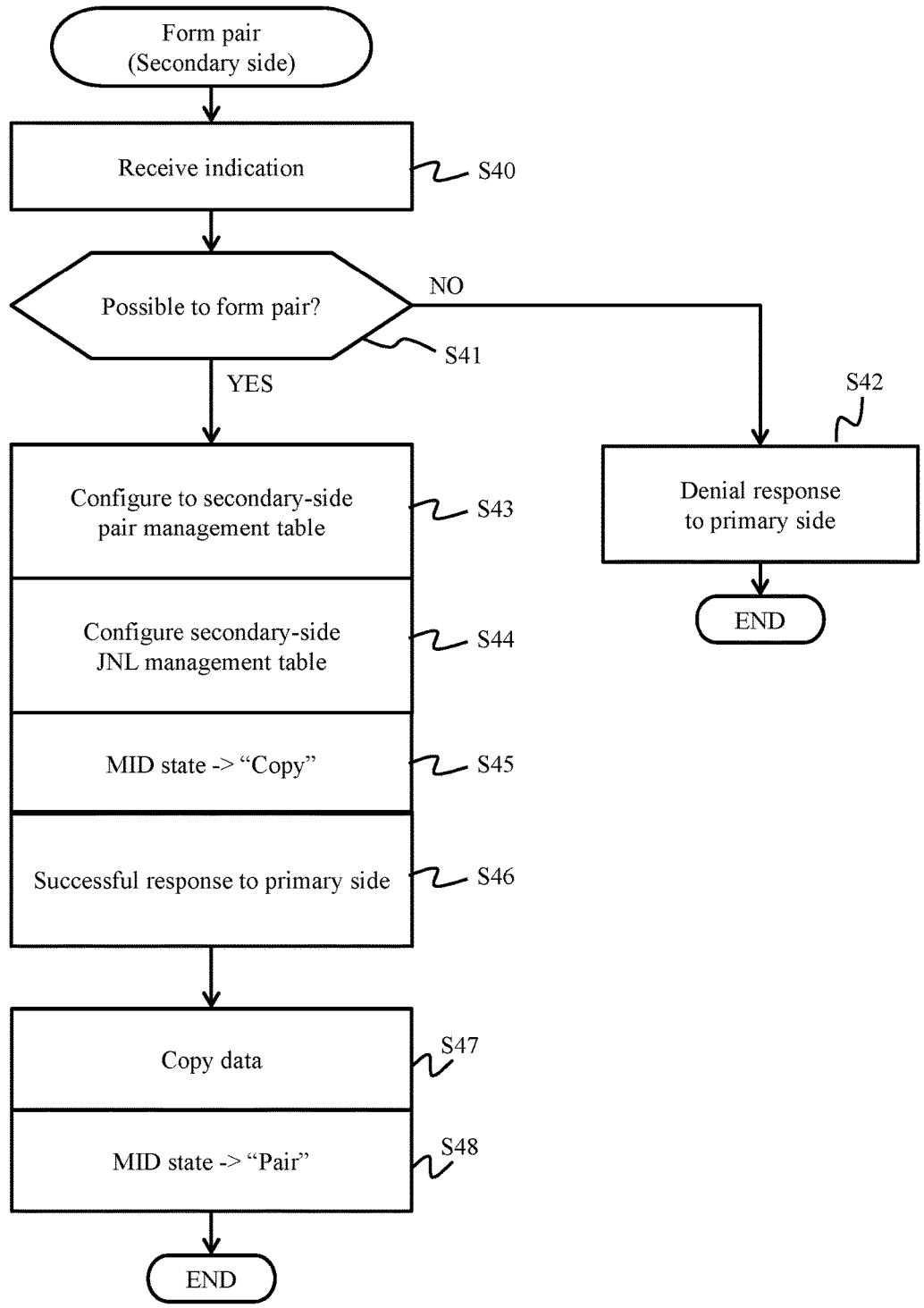

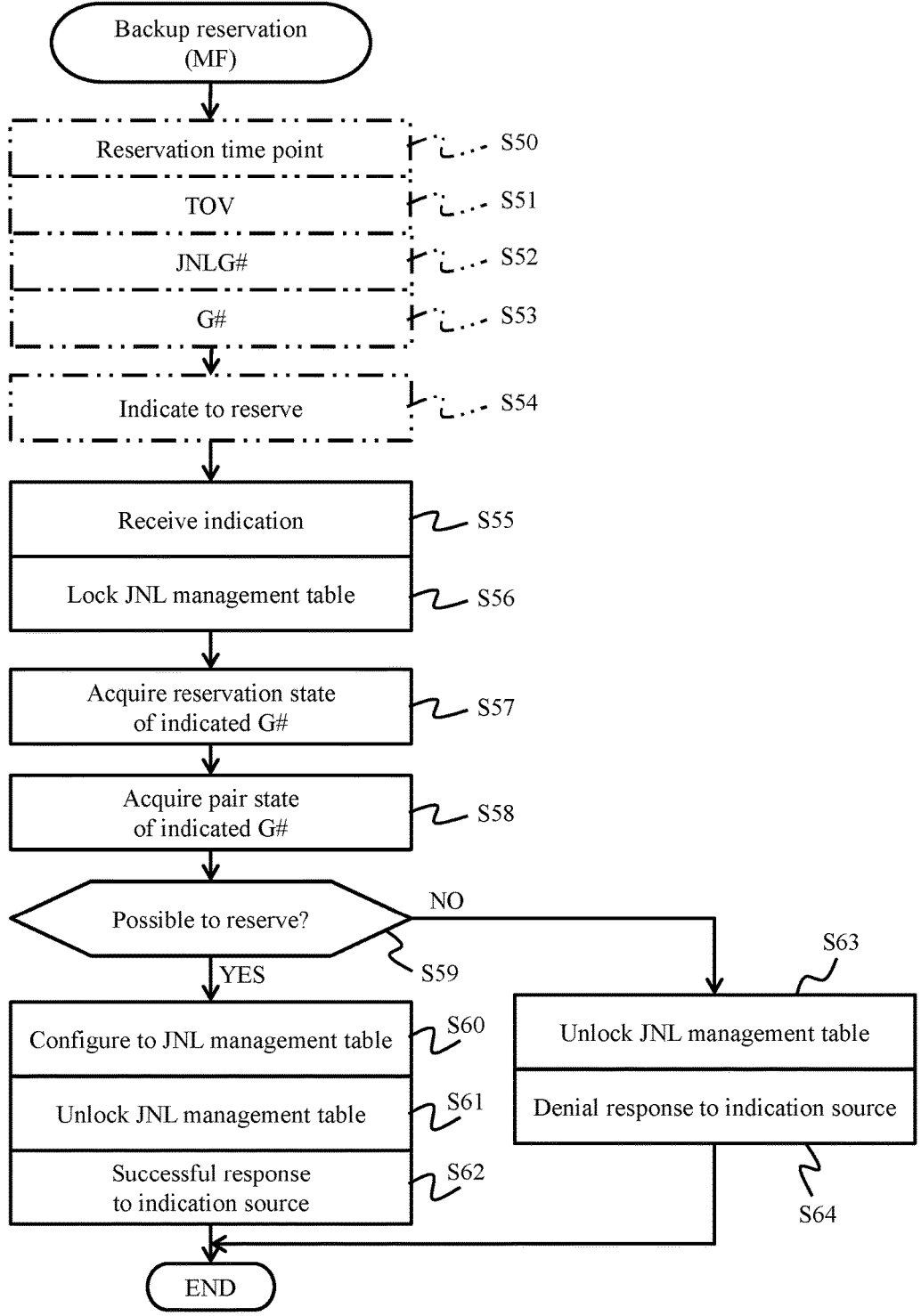

[Fig. 23]
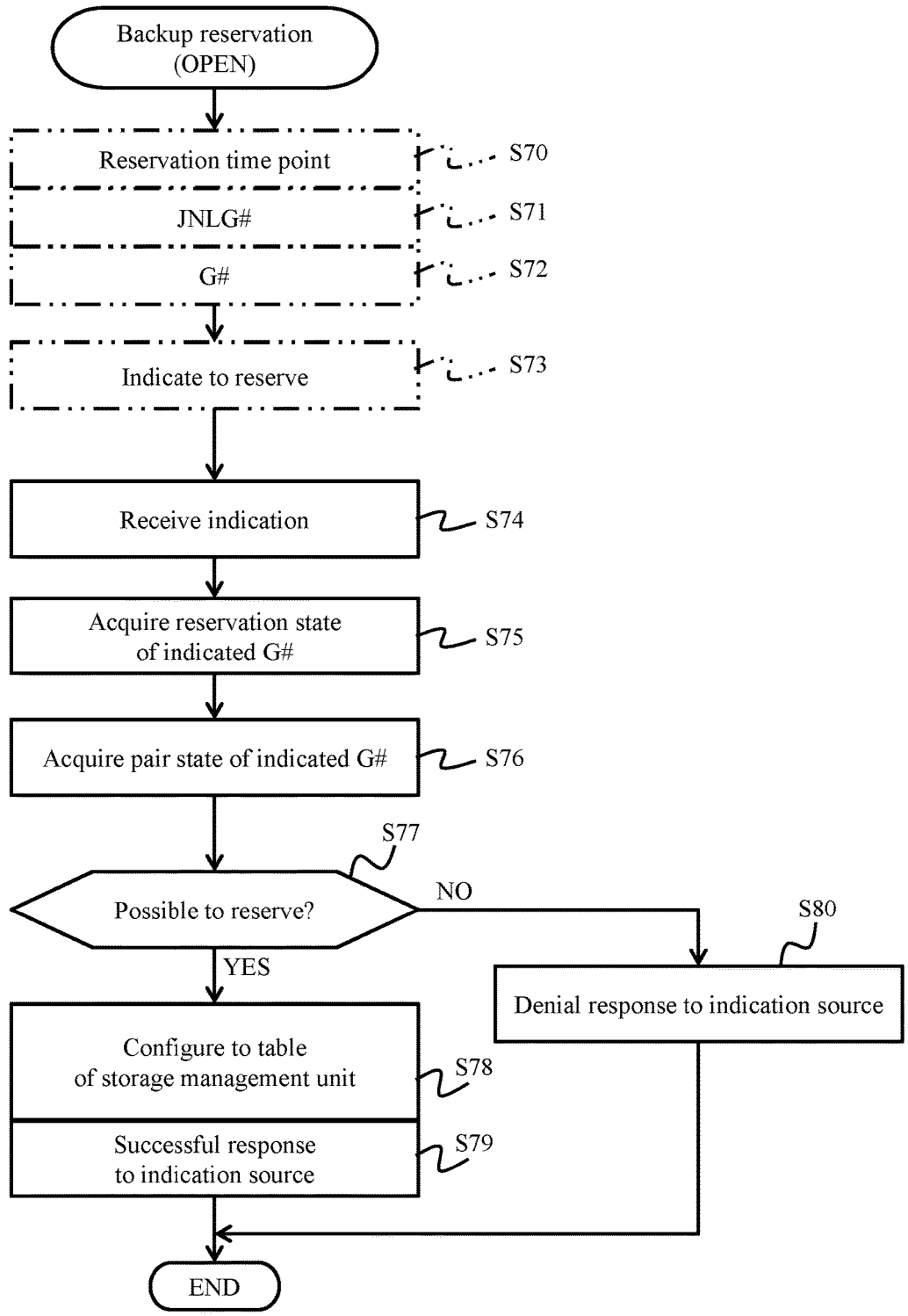

[Fig. 24]
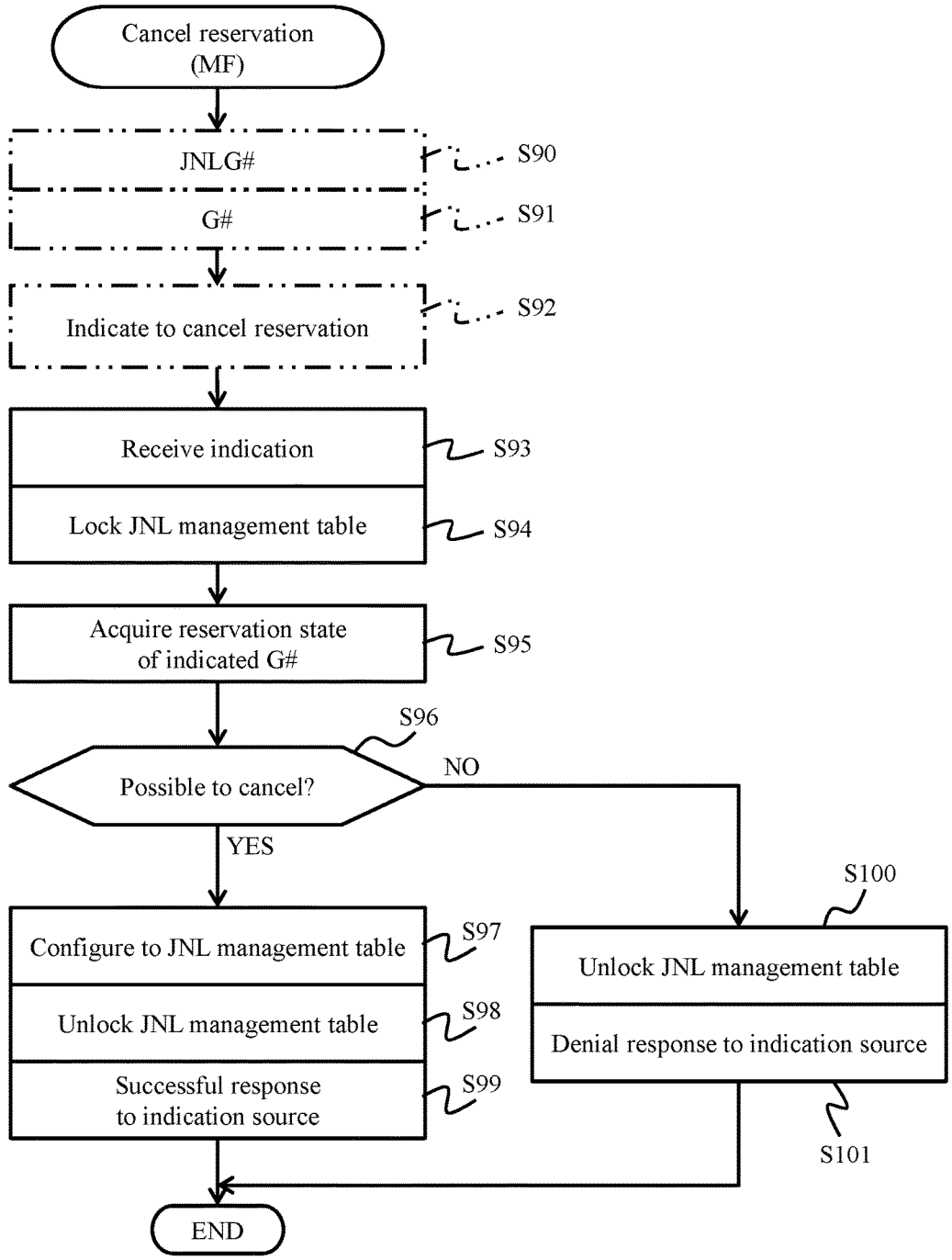

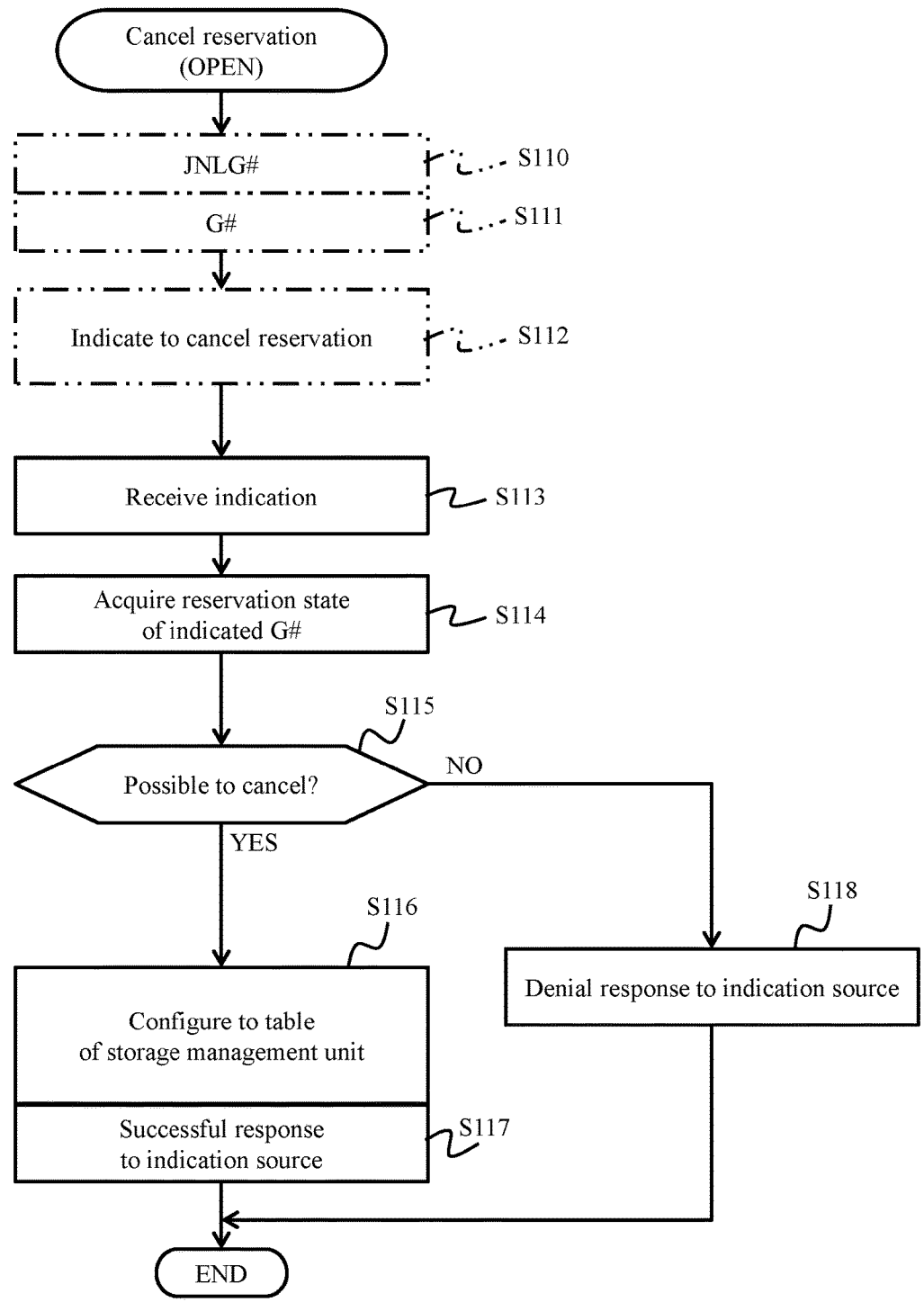

[Fig. 26]
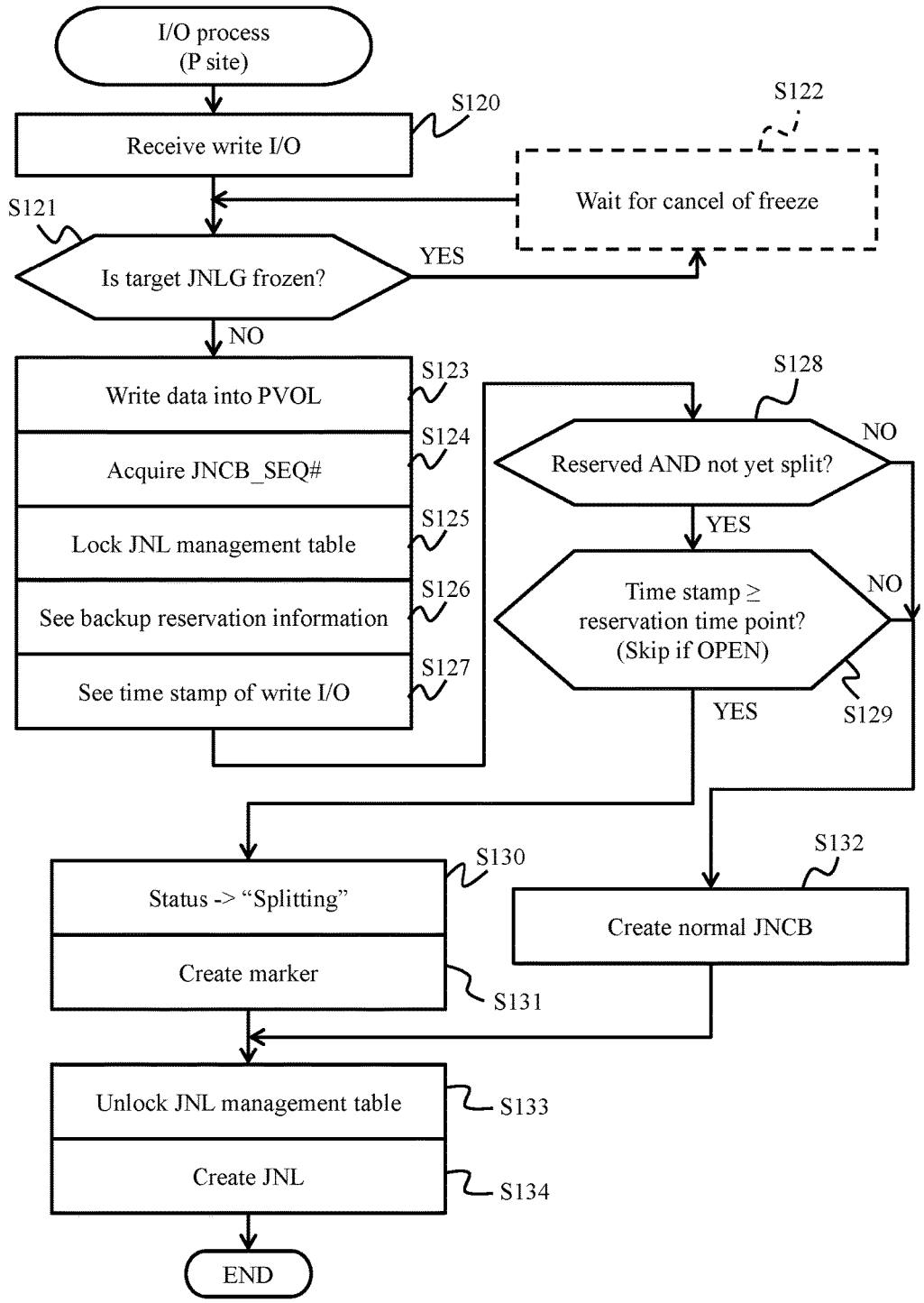

[Fig. 27]
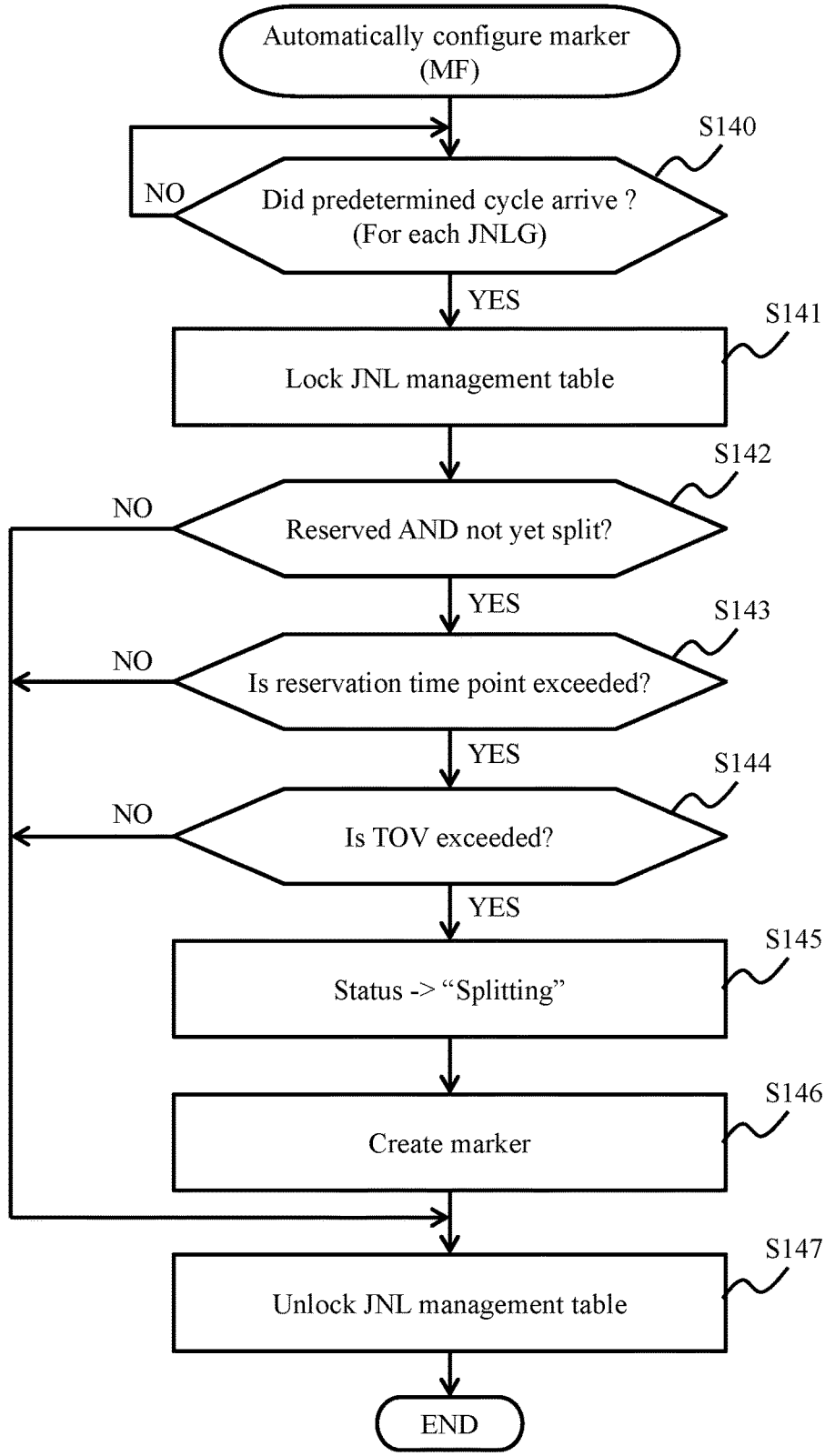

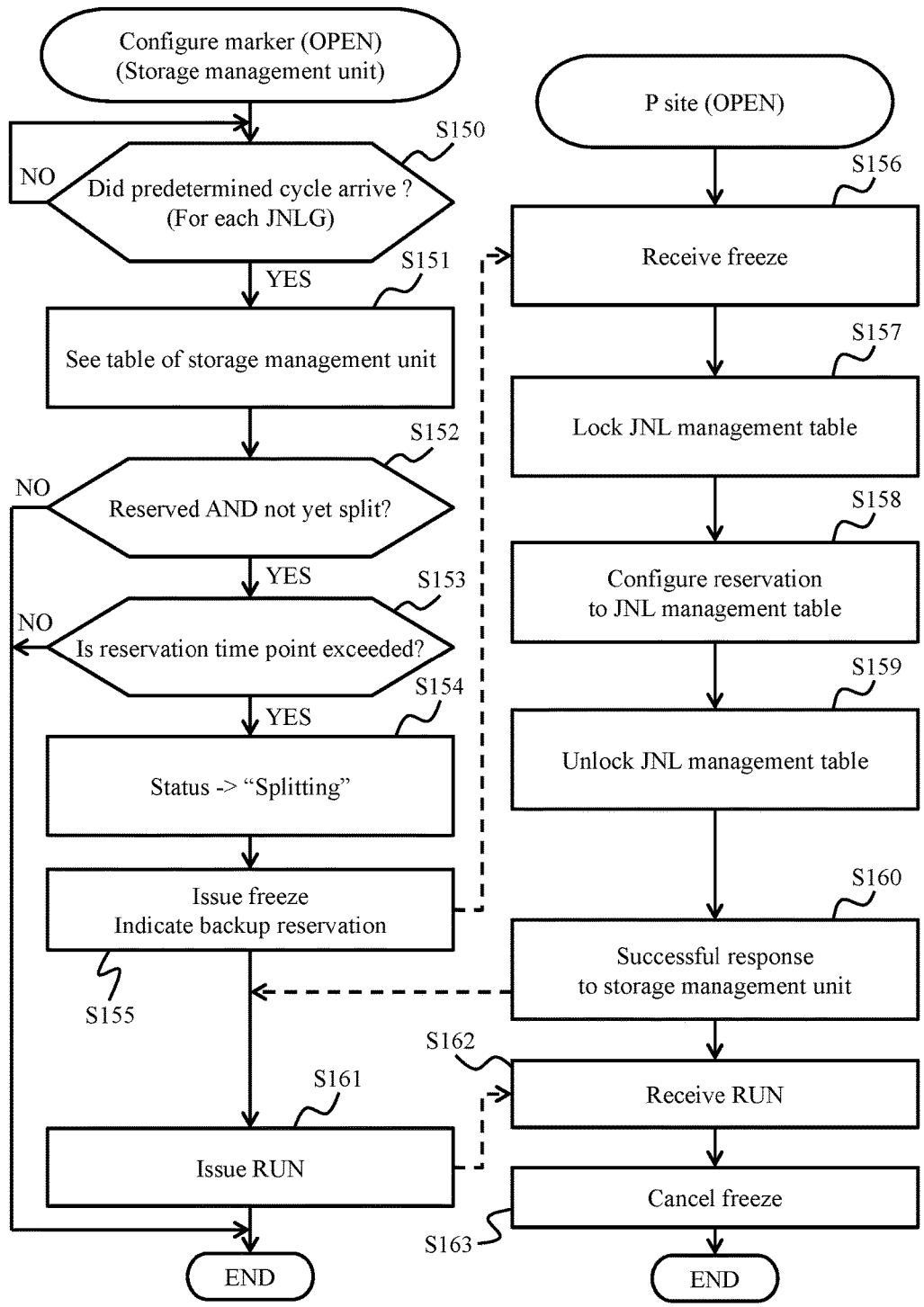

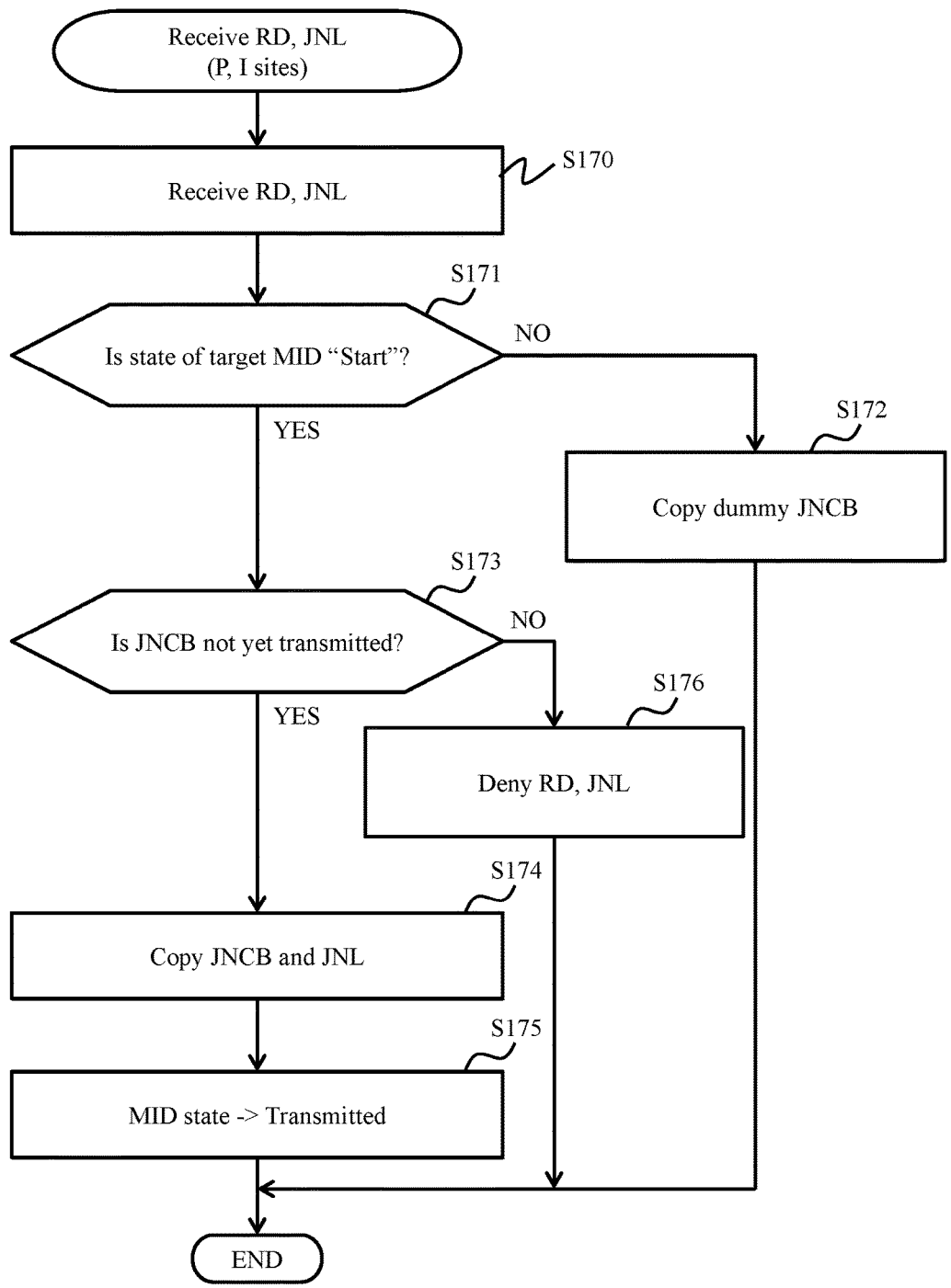
[Fig. 29]

[Fig. 30]
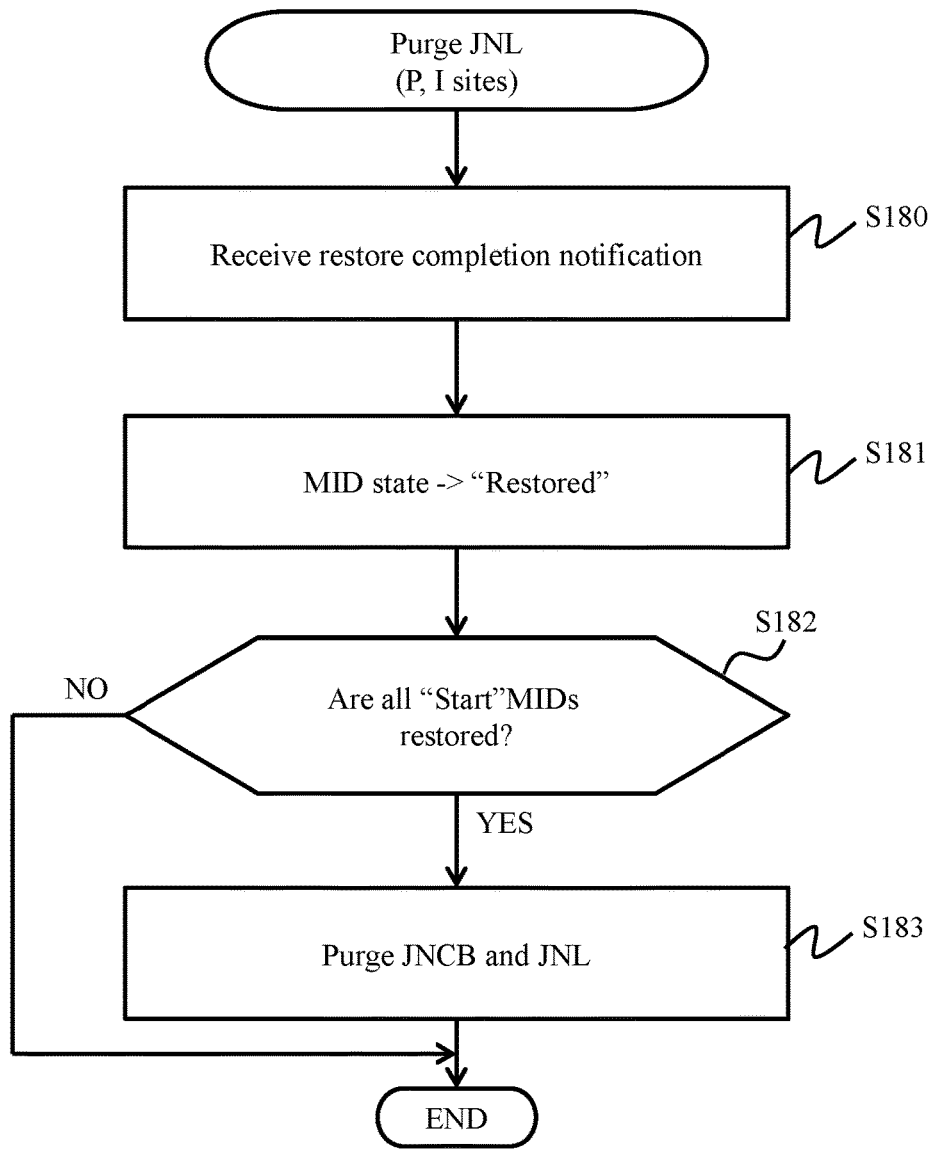

[Fig. 31]
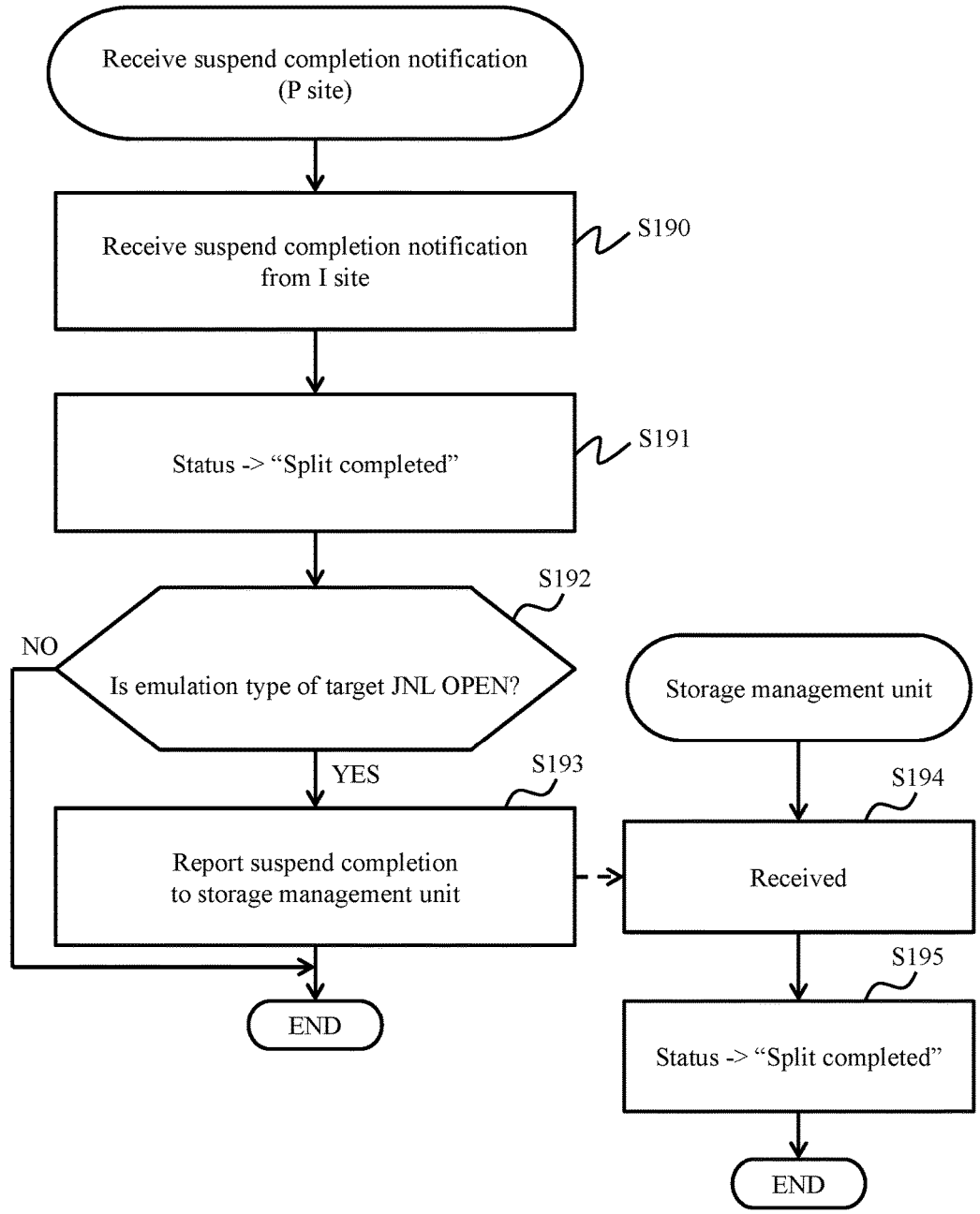

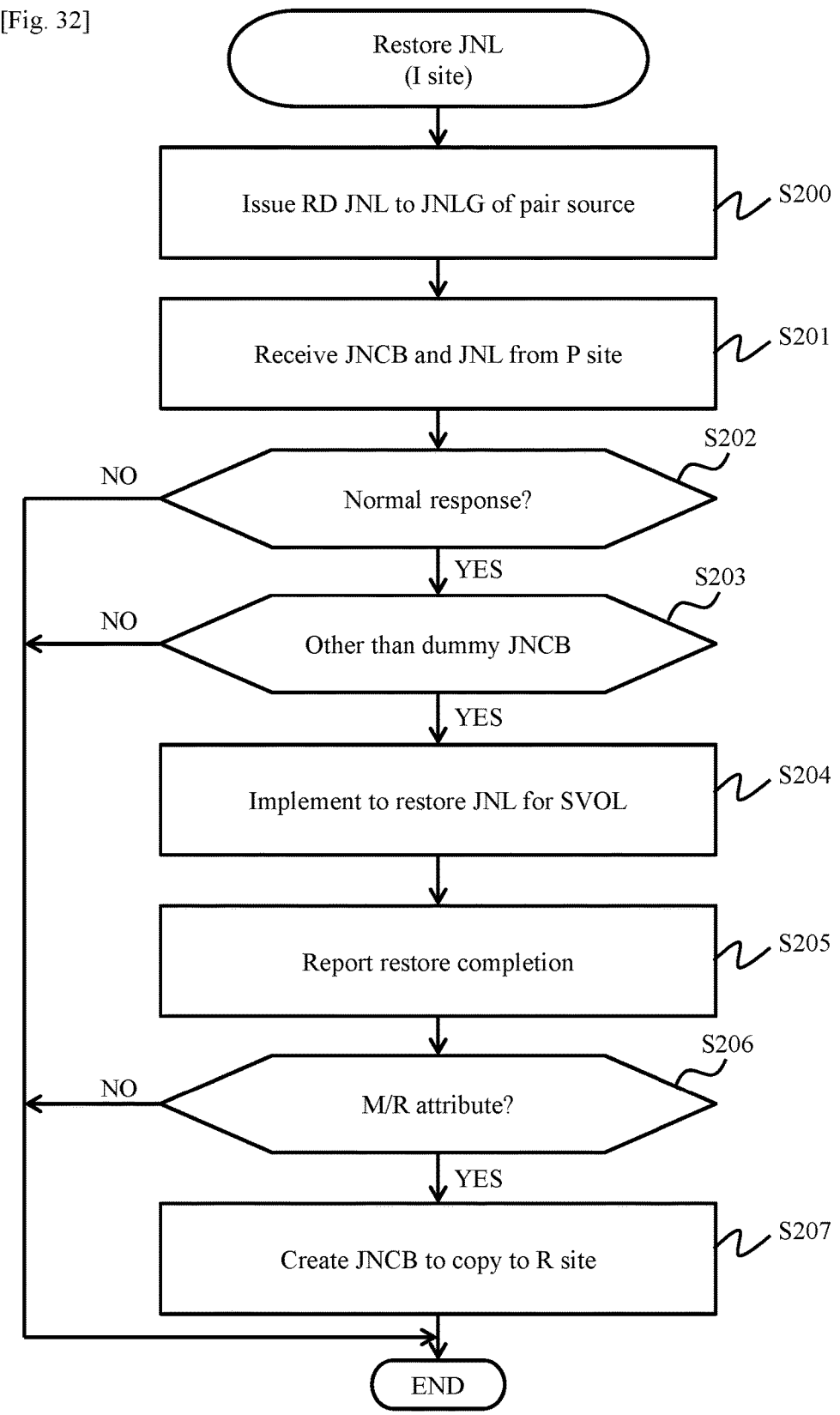
[Fig. 32]

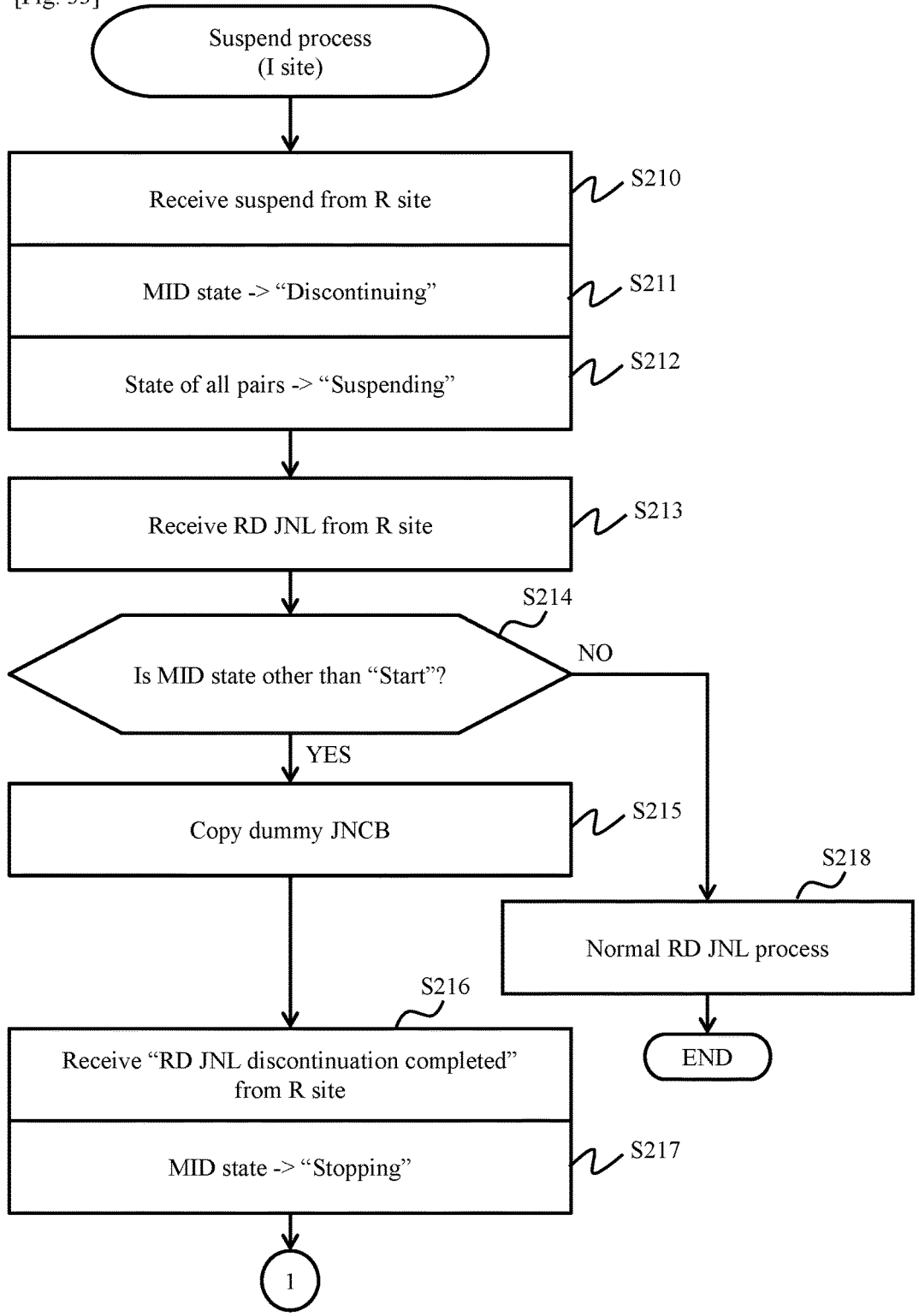

[Fig. 34]
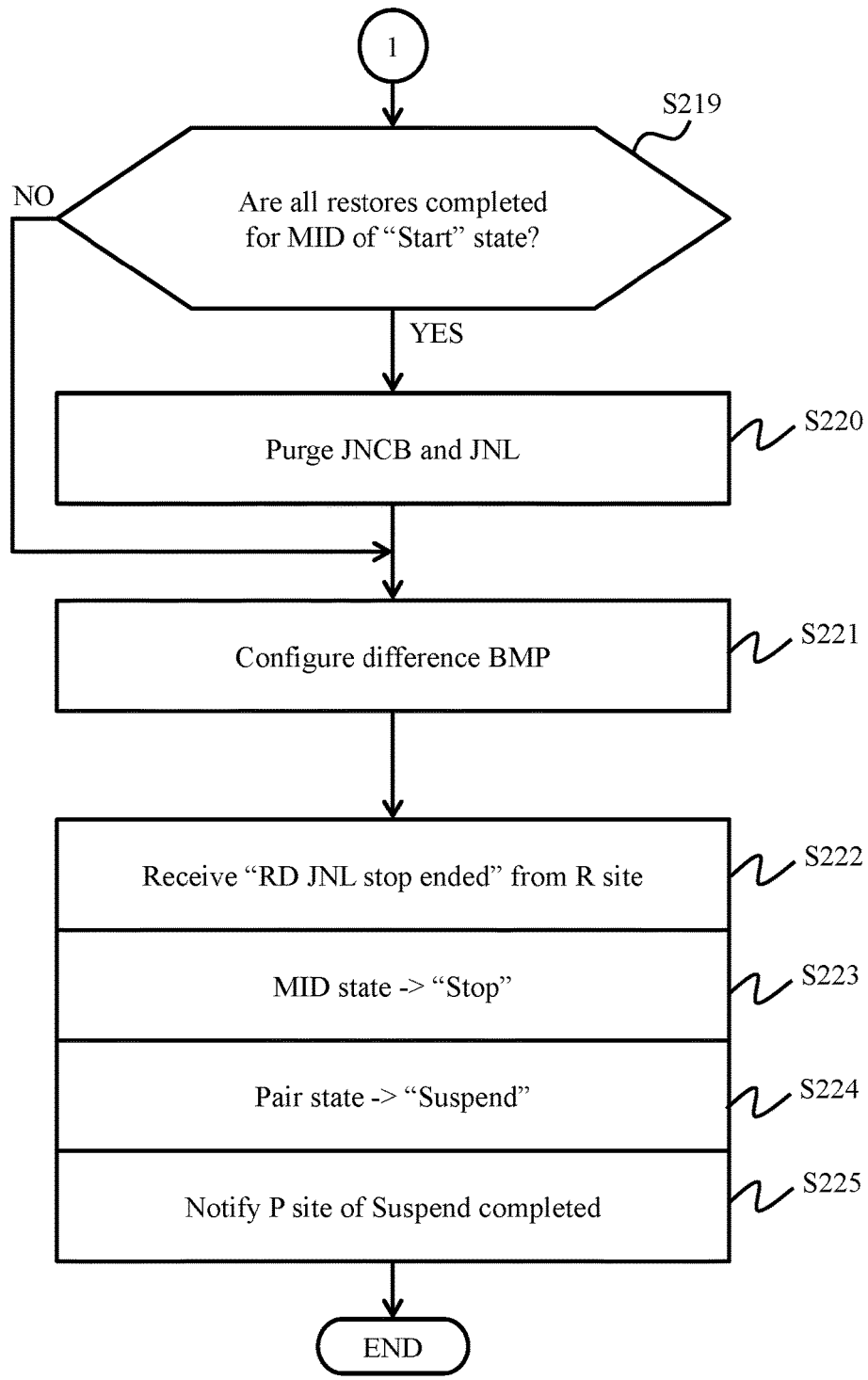

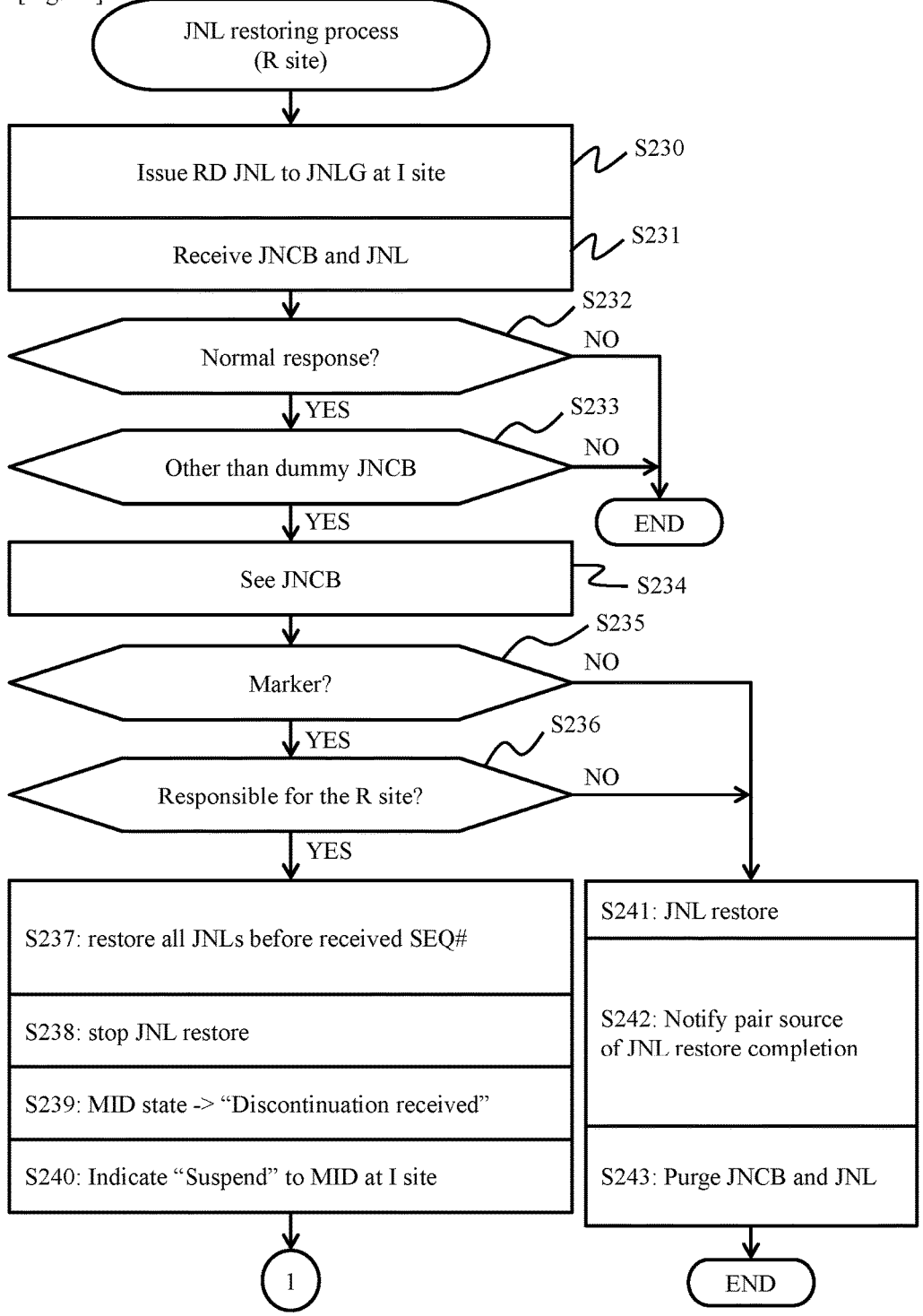
[Fig. 35]

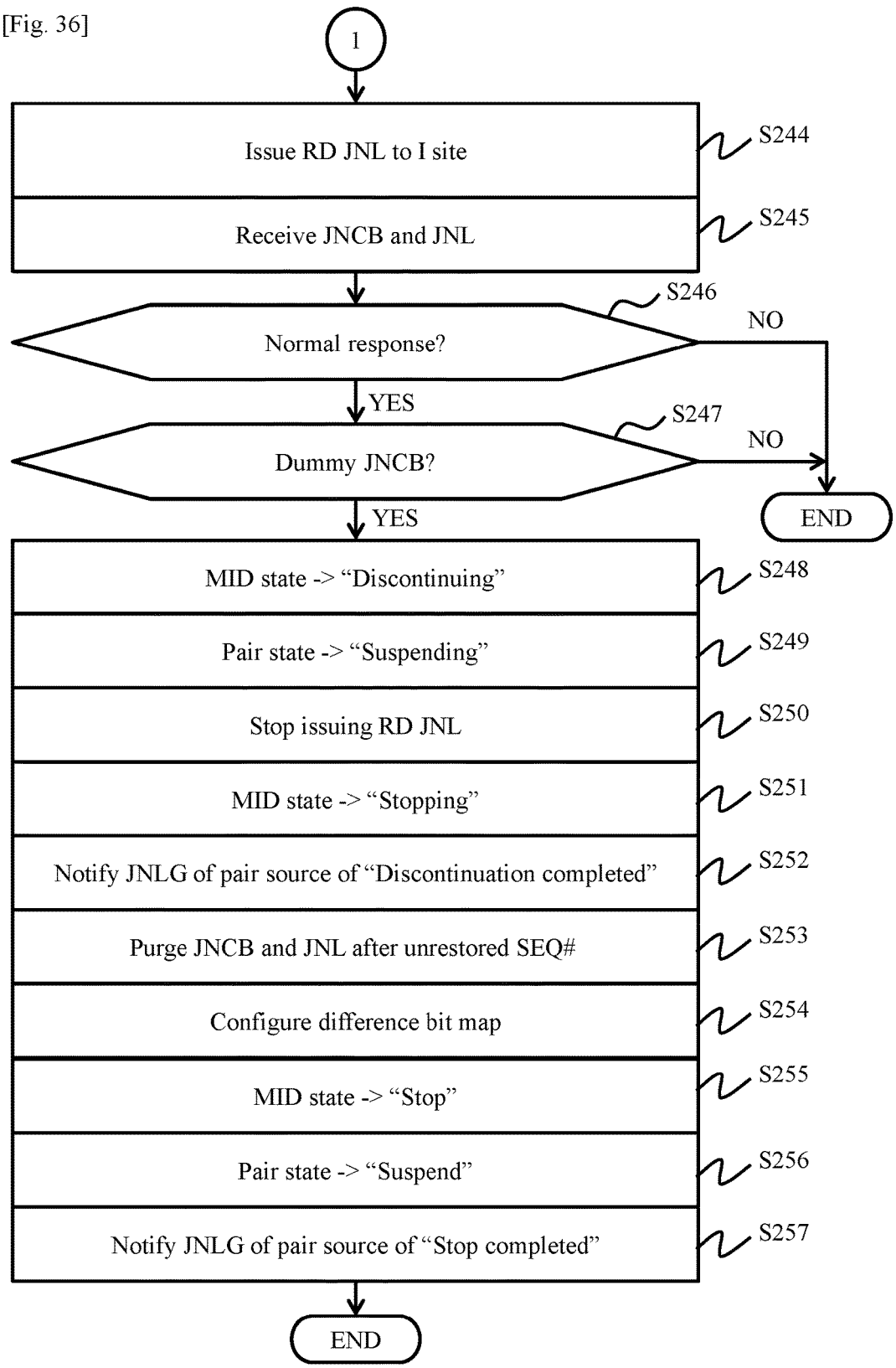
[Fig. 36]

[Fig. 37]
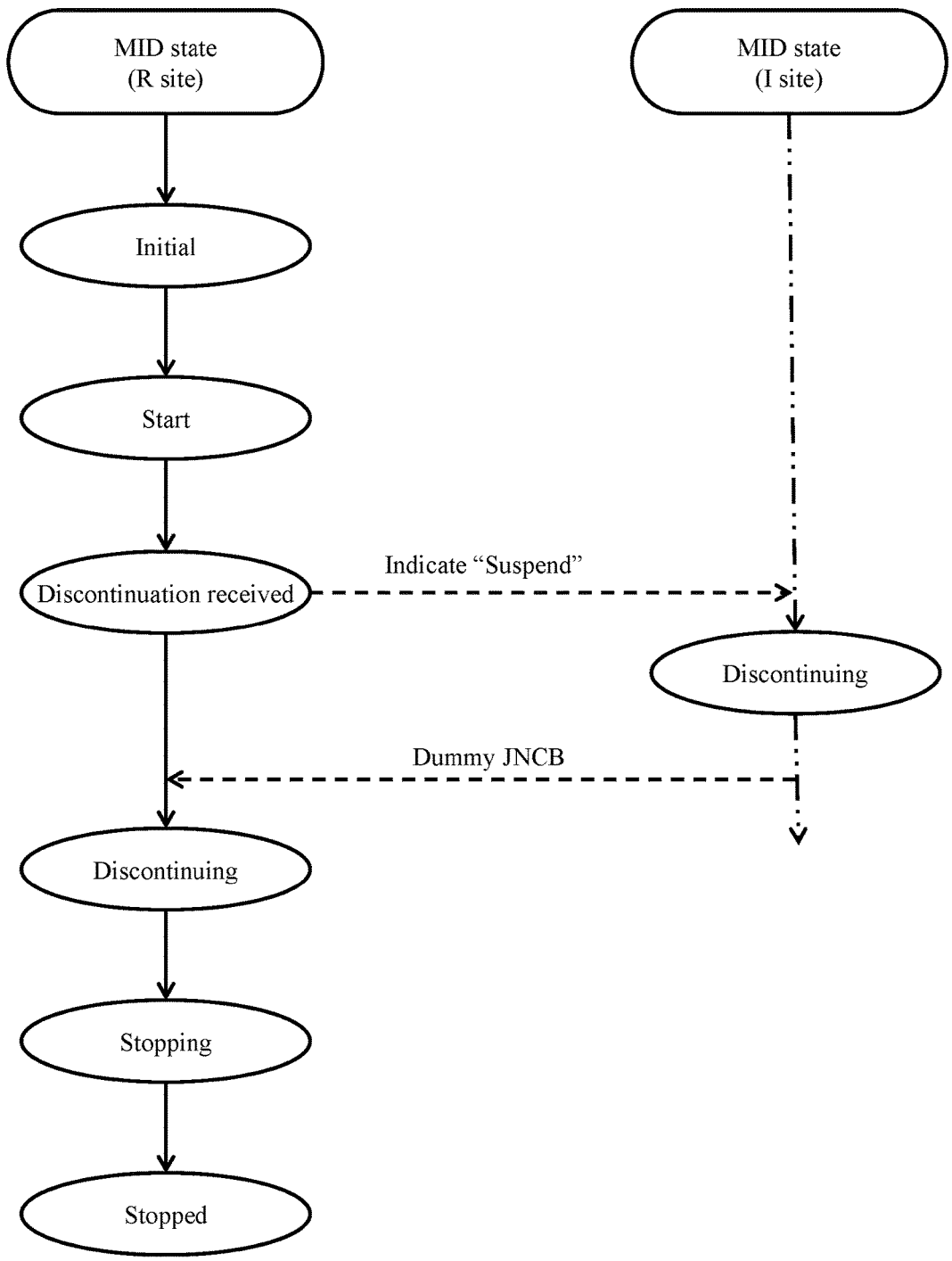

STORAGE SYSTEM AND METHOD OF CREATING BACKUP OF STORAGE SYSTEM

TECHNICAL FIELD

The present invention relates to a storage system and a method of creating a backup of the storage system.

BACKGROUND ART

For example, a there is known a technology of storing data in a plurality of storage control apparatuses (storage apparatuses) installed at a physically separated location so that it is possible to prevent a loss of data even in the event of occurrence of a disaster such as an earthquake, fire, or war (PTL 1).

According to the conventional art, asynchronous remote copying is executed between a storage apparatus installed at a local site and a storage apparatus installed at a remote site. By creating, at the remote site, a backup of data at the local site, it is possible to protect data even when a disaster, etc., occurs at the local site. In addition, the conventional art enables the backup creation over a plurality of generations in the remote site.

CITATION LIST

Patent Literature

[PTL 1] Japanese Patent No. 5042644

SUMMARY OF INVENTION

Technical Problem

According to the conventional art, data in a local site storage apparatus is transferred to a storage apparatus at a remote site through asynchronous remote copying to create a backup over a plurality of generations in the storage apparatus at the remote site. According to the conventional art, a copy pair is split at a designated time point in the storage apparatus at the remote site, and a secondary data volume which is a copy source is provided to a host computer at the remote site. The host computer at the remote site is capable of performing a business process using data at the remote site.

However, since the copying process is executed in the storage apparatus at the remote site and a backup is created, a process load of the storage apparatus at the remote site increases, causing a decline in performance. The load increases further when the business process using the secondary data volume, and the copying process from the secondary data volume to the backup volume are performed simultaneously. When the performance of the storage apparatus at the remote site declines, the speed of asynchronous remote copying process between the local site and the remote site also slows down, and as a result, the performance of the storage apparatus at the local site also declines.

The present invention is achieved in view of the above problems, and an object thereof is to provide a storage system and a method of creating a backup of the storage system with which it is possible to execute a process necessary for creating a backup at a designated time point through sharing among a plurality of storage control apparatuses. Another object of the present invention is to provide a storage system and a method of creating a backup of the storage system by which a process of copying from a primary data volume to a secondary data volume is divided into a plurality of processes, and each process is executed in a different storage control apparatus so as to enable a reduction in the load of the secondary storage control apparatuses.

Solution to Problem

In order to solve the above problems, a storage system according to the present invention is a storage system including a plurality of storage control apparatuses, and out of the plurality of storage control apparatuses, a primary storage control apparatus comprises: a primary data volume that is used by a primary-side host apparatus; and a primary journal volume, which is associated with the primary data volume, and which stores journal data generated from write data that is written into the primary data volume by the primary-side host apparatus, and journal management information for managing the journal data, and at least one secondary storage control apparatus included in the plurality of storage control apparatuses comprises: a secondary data volume for forming a backup of the primary data volume; and a secondary journal volume, which is associated with the secondary data volume, and which stores journal data and journal management information managed in the primary journal volume, and out of the plurality of storage control apparatuses, an intermediate storage control apparatus provided between the primary storage control apparatus and the secondary storage control apparatus comprises: an intermediate data volume capable of forming both a copy pair in which the primary data volume is a copy source, and a copy pair in which the secondary data volume is a copy destination; and an intermediate journal volume, which is associated with the intermediate data volume, and which reads and acquires, from the primary journal volume, the journal data and journal management information managed in the primary journal volume, and passes the acquired journal data and journal management information in response to a read request from the secondary journal volume, and the primary storage control apparatus creates predetermined journal management information including a backup creation reservation time point and backup-destination designation information for designating a secondary data volume for which the backup is created on the basis of backup reservation information, and stores the predetermined journal management information that is created, in the primary journal volume, the intermediate storage control apparatus reads the journal data and journal management information including predetermined journal management information from the primary journal volume, and stores the data and the information in the intermediate journal volume, and the secondary storage control apparatus reads the journal data and journal management information including predetermined journal management information from the intermediate journal volume, and stores the data and the information in the secondary journal volume, and also determines whether the backup-destination designation information included in the predetermined journal management information denotes the secondary data volume, and when it is determined that the backup-destination designation information denotes the secondary data volume, of the journal data stored in the secondary journal volume, the secondary storage control apparatus restores the journal data up to the creation reservation time point included in the predetermined journal management information into the secondary data volume, and after completion of the restore, cancels the copy pair of the secondary data volume and the intermediate data volume, and creates a backup of the primary data volume corresponding to the creation reservation time point.

Advantageous Effects of Invention

According to the present invention, when creating a copy of a primary data volume in a secondary data volume, it is possible to divide the copying process into copying from a primary data volume to an intermediate volume that is executed within an intermediate storage control apparatus, and copying from an intermediate data volume to a secondary data volume that is executed within an additional storage control apparatus. This makes it possible to prevent an increase in load on the secondary storage control apparatus.

BRIEF DESCRIPTION OF DRAWINGS

FIG. 1 is an explanatory diagram showing an overview of an embodiment.

FIG. 2 is a functional block diagram of a storage system.

FIG. 3 shows a software configuration of a storage system.

FIG. 4 shows a connection relationship between each storage apparatus.

FIG. 5 shows a configuration of a remote copy management table used at a primary site.

FIG. 6 shows a configuration of a remote copy management table used at an intermediate site.

FIG. 7 shows a configuration of a remote copy management table used at a first secondary site.

FIG. 8 shows a configuration of a remote copy management table used at a second secondary site.

FIG. 9 shows a configuration of a remote copy management table used at a third secondary site.

FIG. 10 shows a configuration of a journal management table used at a primary site.

FIG. 11 shows a configuration of a journal management table used at an intermediate site.

FIG. 12 shows a configuration of a journal management table used at a first secondary site.

FIG. 13 shows a configuration of a journal management table used at a second secondary site.

FIG. 14 shows a configuration of a journal management table used at a third secondary site.

FIG. 15 shows a configuration of a JNCB (Journal Control Block) management table for a mainframe used at a primary site.

FIG. 16 shows a configuration of a JNCB management table for an open system used at a primary site.

FIG. 17 shows a configuration of a JNCB management table for a mainframe used at an intermediate site.

FIG. 18 shows a configuration of a JNCB management table for an open system used at an intermediate site.

FIG. 19 is a flowchart showing a process for configuring a journal.

FIG. 20 is a flowchart showing a process for forming a copy pair in a storage apparatus that acts as a copy source.

FIG. 21 is a flowchart showing a process for forming a copy pair in a storage apparatus that acts as a copy destination.

FIG. 22 is a flowchart showing a process for reserving backup creation of a data volume used in a mainframe.

FIG. 23 is a flowchart showing a process for reserving a backup of a data volume used in an open system.

FIG. 24 is a flowchart showing a process for canceling a backup creation reservation of a data volume used in a mainframe.

FIG. 25 is a flowchart showing a process for canceling a backup creation reservation of a data volume used in an open system.

FIG. 26 is a flowchart of an I/O (Input/Output) process executed at a primary site.

FIG. 27 is a flowchart showing a process for configuring a marker (JNCB) for creating a backup of a data volume for a mainframe.

FIG. 28 is a flowchart showing a process for configuring a marker (JNCB) for creating a backup of a data volume for an open system.

FIG. 29 is a flowchart showing a process executed when a command for reading a journal (RD JNL) is received from a copy-destination storage apparatus.

FIG. 30 is a flowchart showing a process for purging journal data that is no longer needed due to completion of restoring a copy-destination volume.

FIG. 31 is a flowchart showing a process executed when a primary site receives a suspend completion notification from an intermediate site.

FIG. 32 is a flowchart showing a process for restoring an intermediate data volume at an intermediate site, and a process for creating a JNCB for a secondary site.

FIG. 33 is a flowchart showing a suspend process executed at an intermediate site.

FIG. 34 is a flowchart following the flowchart in FIG. 33.

FIG. 35 is a flowchart showing a restoring process executed in a secondary site.

FIG. 36 is a flowchart following the flowchart in FIG. 35.

FIG. 37 is an explanatory diagram showing a change in status of a copy pair.

DESCRIPTION OF EMBODIMENTS

Hereinafter, an embodiment of the present invention will be described with reference to drawings. FIG. 1 is an explanatory diagram showing an overview of the present embodiment. FIG. 1 is prepared for understanding the present embodiment, and the configuration of the storage system according to the present embodiment is not intended to be restricted to the configuration example shown in FIG. 1.

As described below, in the present embodiment, an intermediate site (I site) is provided between a primary site (P site) and a secondary site (R site), and storage apparatuses 1, 2, and 3 are installed as "storage control apparatuses" in each of the above sites. In the drawings, sometimes, the primary site is represented as a "main site" instead of a "primary site". When the primary site is represented as a main site, it is abbreviated as "M". A hardware configuration and a software configuration of each storage apparatus 1 are described later in FIG. 2 and FIG. 3.

The storage apparatus 1 at the primary site is an example of a "primary storage control apparatus". The storage apparatus 1 may also be called a primary storage apparatus 1. In the primary storage apparatus 1, host computers 4A and 4B are coupled as the "primary-side host apparatuses" via a first communication network CN1. One is the host computer 4A which is a mainframe computer, and the other is the host computer 4B which is a server of a so-called open system. When not differentiating a mainframe and an open system, the host computer 4A and the host computer 4B are referred to as a host 4.

When a host is a mainframe, for example, a communication protocol such as FICON (Fibre Connection: registered trademark), ESCON (Enterprise System Connection: registered trademark), ACONARC (Advanced Connection Architecture: registered trademark), and FIBARC (Fibre Connection Architecture: registered trademark) is used. When a host is an open system, a communication protocol such as FCP (Fibre Channel Protocol) and FCoE (Fibre Channel over Ethernet (registered trademark)) is used.

A terminal 6 is a computer that is coupled to a controller of the primary storage apparatus 1. By using the terminal 6, a system administrator is capable of reading and displaying information regarding the state of the primary storage apparatus 1, and is capable of giving indications to the primary storage apparatus 1.

In FIG. 1, the first communication network CN1 is shown as one network, but a plurality of communication networks having different physical layers may also be used. For example, communication networks, such as a dedicated line, a public line, and the Internet may be combined together and used.

To the first communication network CN1, in addition to the host 4, an NTP (Network Time Protocol) server 7 is also coupled.

As described later, the host 4 has at least a management function (management apparatus) for giving an indication related to backup creation to the primary storage apparatus 1. The management function may be configured as another computer other than the host 4, which may be configured to be coupled to both the host 4 and the primary storage apparatus 1.

The NTP server 7 is a computer that provides time information. By using the NTP server 7, it is possible to synchronize a time point among a plurality of computers.

The storage apparatus 1 installed at the primary site includes a primary data volume 17 and a primary journal volume 18. The primary data volume 17 stores data that is used by the host 4. The primary journal volume 18 stores journal data and a JNCB (Journal Control Block) as "journal management information". In the present embodiment, as described later, by using the journal data, data is synchronized between a copy-source volume and a copy-destination volume.

It is noted that although not differentiated in FIG. 1, the primary data volume 17 used by the host 4A which is a mainframe, and the primary data volume 17 used by the host 4B which is an open system are different. Similarly, there is the primary journal volume 18 for a mainframe and also for an open system. The primary journal volume 18 is capable of being associated with a plurality of primary data volumes 17. Similarly, even at an intermediate site and at a secondary site, one journal volume is capable of being associated with a plurality of data volumes.

The intermediate site is provided as a site positioned between the primary site and the secondary site. A storage apparatus 2 is installed as an "intermediate storage control apparatus" at the intermediate site. The storage apparatus 2 at the intermediate site may also be called an intermediate storage apparatus 2. As described later, the intermediate site is provided for balancing the load of the secondary site. Therefore, the intermediate site need not be installed in the physical middle position between the primary site and the secondary site, and may be installed closer to the primary site or closer to the secondary site.

The intermediate storage apparatus 2 is coupled to the primary storage apparatus 1 via a second communication network CN2. In addition, the intermediate storage apparatus 2 is coupled to secondary storage apparatuses 3(1), 3(2), and 3(3) via a third communication network CN3. The communication protocols used by the intermediate storage apparatus 2 and the secondary storage apparatuses 3(1), 3(2), and 3(3) in the communication networks CN2 and CN3 are similar to those described for the communication network CN1. It is noted that the communication network CN2 may be common with either the communication network CN1 or CN3.

The intermediate storage apparatus 2 includes an intermediate data volume 27 and an intermediate journal volume 28. The intermediate data volume 27 forms a copy pair with the primary data volume 17, and is synchronized with the primary data volume 17. In such a case, the intermediate data volume 27 is a copy-destination volume, and the primary data volume 17 is a copy-source volume.

In addition, the intermediate data volume 27 forms a copy pair with secondary data volumes 37(1), 37(2), and 37(3) as well, which are described later. In such a case, the intermediate data volume 27 is a copy-source volume, and the secondary data volumes 37(1), 37(2), and 37(3) are copy-destination volumes. Thus, the intermediate data volume 27 has the attributes of both a copy-source volume and a copy-destination volume.

The intermediate journal volume 28 forms a copy pair with the primary journal volume 18, and stores the journal data and the JNCB read from the primary journal volume 18, which is a copy-source volume. In such a case, the intermediate journal volume 28 is a copy-destination volume, and acquires the journal data and the JNCB from the primary journal volume 18, by issuing a read request.

In addition, the intermediate journal volume 28 forms a copy pair with secondary data volumes 38(1), 38(2), and 38(3) as well. In response to a read request from the secondary journal volumes 38(1), 38(2), and 38(3), which are copy-destination volumes, the intermediate journal volume 28, which is a copy-source volume, supplies journal data and a JNCB to the secondary journal volumes 38(1), 38(2), and 38(3). Here, "supplies data" implies that data is sent in response to a request from a read source (the copy destination).

A plurality of secondary sites may be provided. The secondary sites may be provided, for example, for each backup generation. In the present embodiment, an example of providing three secondary sites is illustrated; however, the present invention is not limited thereto, and it is possible to provide two, or four or more secondary sites.

The storage apparatuses 3(1), 3(2), and 3(3) are provided as a "secondary storage control apparatus" at each secondary site. The storage apparatus 3(1) includes the secondary data volume 37(1) and the secondary journal volume 38(1). The storage apparatus 3(2) includes the secondary data volume 37(2) and the secondary journal volume 38(2). The storage apparatus 3(3) includes the secondary data volume 37(3) and the secondary journal volume 38(3).

When not particularly differentiated, the storage apparatuses 3(1), 3(2), and 3(3) are referred to as a storage apparatus 3. The storage apparatus 3 may also be called a secondary storage apparatus 3. When not particularly differentiated, the secondary data volumes 37(1), 37(2), and 37(3) are referred to as a secondary data volume 37. When not particularly differentiated, the secondary journal volumes 38(1), 38(2), and 38(3) are referred to as a secondary journal volume 38.

The secondary data volume 37 acts as a copy-destination volume, and forms a copy pair with the intermediate data volume 27, which is a copy-source volume. As a result, the secondary journal volume 38 acts as a copy-destination volume, and forms a copy pair with the intermediate journal volume 28, which is a copy-source volume.

The secondary storage apparatus 3 is coupled to host apparatuses 5A and 5B via a fourth communication network CN4. Similarly to the primary-side host apparatus 4A, the host apparatus 5A is a mainframe computer. Similarly to the primary-side host apparatus 4B, the host apparatus 5B is a server of a so-called open system.

Of each of the secondary data volumes 37, the host 5A which is a mainframe accesses the secondary data volume 37 for a mainframe, and reads and writes data. Of each of the secondary data volumes 37, the host 5B which is an open system accesses the secondary data volume 37 for an open system, and reads and writes data. The host 5 may also be called a secondary-side host apparatus. It is possible to configure the communication network CN4 similarly to the communication network CN1 at the primary site. A server that conforms to an open system may also be called an open system server.

Next, an overview of the general operation of the storage system shown in FIG. 1 will be described. Of the plurality of primary data volumes 17, the host 4 issues a write command to a primary data volume 17 for which the host 4 has an access permission, and updates the data in the primary data volume 17.

The write data associated with the write command is written into the primary data volume 17. A copy of the write data is stored in the primary journal volume 18, as journal data. In addition, the JNCB, which is the journal management information for managing the journal data is also stored in the primary journal volume 18. In FIG. 1, the journal data and the JNCB stored in the primary journal volume 18 is shown as data D1. Here, data including both the journal data and the JNCB is called journal data and others D.

By issuing a journal read request to the primary storage apparatus 1 at a predetermined timing, the intermediate storage apparatus 2 reads the journal data and others D1 stored in the primary journal volume 18. The read journal data and others D1 are stored in the intermediate journal volume 28.

In particular, the intermediate storage apparatus 2 converts the journal data and others D1 read from the primary journal volume 18 to journal data and others D2 for the secondary journal volume 38, and stores the journal data and others D2 in the intermediate journal volume 28. The substantial contents of the journal data and others D1 and the journal data and others D2 are the same, but a part of the management information, such as a transmission destination is different.

The intermediate storage apparatus 2 writes the journal data acquired from the primary storage apparatus 1 into the intermediate data volume 27 according to the order shown by the JNCB. As a result, the stored contents in the intermediate data volume 27 match the stored contents in the primary data volume 17 at a certain time point. The process of writing the journal data into a data volume and updating the stored contents is called a restoring process.

In the present embodiment, by issuing a read request from a copy-destination apparatus to a copy-source apparatus, the copy-destination apparatus acquires the journal data etc., from the journal volume of the copy-source apparatus, and restores the data into the data volume of the copy-destination apparatus. The copying process is an asynchronous remote copying process that is executed at a timing different from the timing of writing into the primary data volume 17 from the primary-side host 4. Since the copying process is an asynchronous remote copying process that the copy-destination apparatus (the copy-destination volume) leads to execute, it may be called a copy destination-led asynchronous remote copying process, for example.

When the state of a copy pair formed by the primary data volume 17 and the intermediate data volume 27 is a "pair state", the stored contents in the intermediate data volume 27 match those of the primary data volume 17 with a slight time delay through the above-described asynchronous remote copying.

By issuing a journal read request to the intermediate storage apparatus 2 at a predetermined timing, the secondary storage apparatus 3 reads the journal data and others D2 stored in the intermediate journal volume 28. The secondary storage apparatus 3 stores the journal data and others D2 read from the intermediate journal volume 28 in the secondary journal volume 38, as journal data and others D3 for the secondary storage apparatus. The journal data and others D2 and the journal data D3 are substantially the same.

The secondary storage apparatus 3 writes the journal data acquired from the intermediate storage apparatus 2 into the secondary data volume 37 according to the order shown by the JNCB. Thus, asynchronous remote copying is executed between the intermediate storage apparatus 2 and the secondary storage apparatus 3 as well.

The primary storage apparatus 1 creates a predetermined JNCB on the basis of the backup reservation information entered from the host 4. The predetermined JNCB includes a backup creation reservation time point, and information for designating a backup destination (information for designating a backup generation). The predetermined JNCB may also be called, for example, a marker, a marker whose time point is designated, or a marker JNCB.

Each secondary storage apparatus 3 acquires the same journal data and others D2 from the intermediate journal volume 28 of the intermediate storage apparatus 2. A case in which a predetermined JNCB is included in the JNCBs included in the journal data and others D2 will be described. In such a case, of the secondary storage apparatuses 3, the secondary storage apparatus 3 having a secondary data volume 37 designated by a predetermined JNCB restores the journal data up to the reservation time point included in the predetermined JNCB into the secondary data volume 37 in which the backup is to be created. Thus, it is possible to generate a backup having the stored contents at a designated time point. In reality, a slight difference occurs between a backup start time point designated by a user, and the time point when the backup actually starts.

In the other secondary storage apparatuses 3 that do not have the designated secondary data volume 37, the predetermined JNCB is handled as a normal JNCB, and the journal data associated with the predetermined JNCB is written into the secondary data volume 37.

In the example shown in FIG. 1, the second secondary storage apparatus 3(2) creates a backup at a designated time point. The first secondary storage apparatus 3(1) and the third secondary storage apparatus 3(3) are not requested to create a backup.

A method of creating a backup at a designated time point will be described. Using a management function (a storage management unit 401 described in FIG. 3) provided in the host 4, a user configures information for designating a backup creation reservation time point and a backup destination in the primary storage apparatus 1.

Information for designating a backup destination includes, for example, information for specifying a journal group, and information for specifying a backup generation. The backup-destination designation information may be configured from a plurality of instances of information, as long as it includes information capable of specifying a backup-destination volume.

The user is capable of using the management function of the host 4 to even cancel a backup creation reservation at a designated time point. However, when a copy pair state of a volume which is a backup target is "Splitting", the backup creation is already started, and therefore, it is not possible to cancel the reservation.

It is noted that as described later, when reserving backup creation for the primary data volume 17 used by the host 4B which is an open system, a backup creation reservation time point and information for designating a backup destination are entered and retained into the management function of the host 4B which is an open system. In the present embodiment, the storage management function in the host 4B manages the backup creation reservation time point and the backup-destination designation information.

In the present embodiment, the backup creation in the storage system is managed at the primary site. In other words, in the present embodiment, a marker is created in the primary storage apparatus 1. Upon receiving a write command from the host 4, the primary storage apparatus 1 writes the write data into the primary data volume 17 designated as a write destination. Hereinafter, a write command is sometimes referred to as a write I/O or a write request.

At the same time as writing into the primary data volume 17, the primary storage apparatus 1 acquires the sequence number for managing the update order of journal data, and stores the journal data and the JNCB for managing the journal data in the primary journal volume 18.

The primary storage apparatus 1 determines whether backup creation is reserved for the primary data volume 17. When backup creation is reserved, the primary storage apparatus 1 determines whether the current time point exceeds the backup creation reservation time point. When the primary storage apparatus 1 determines that the backup creation reservation time point is exceeded, the primary storage apparatus 1 creates a marker for requesting backup creation at a designated time point as a JNCB. The marker thus created is stored in the primary journal volume 18 along with the journal data as one of the JNCBs.

The more detailed method of creating a marker is different for a data volume used in a mainframe, and a data volume used in an open system server. First of all, the method for a mainframe will be described, followed by the method for an open system.

In the case of the host 4A which is a mainframe, time point information (a time stamp) is appended to the write command (the write I/O). The primary storage apparatus 1 determines whether the time point denoted in the time stamp of the write command reaches (or exceeds) the backup creation reservation time point.

When the primary storage apparatus 1 determines that the current time point exceeds the backup creation reservation time point, the primary storage apparatus 1 creates a marker for a mainframe volume. For example, it is assumed that the backup creation reservation time point is "10:00". When the time stamp of the write command received from the host 4A denotes "09:58", the primary storage apparatus 1 creates journal data from the write data, and at the same time, creates a JNCB for managing the journal data, and stores the journal data and the JNCB in the primary journal volume 18.

Since the time stamp of the write command does not exceed the backup creation reservation time point, a process as usual is performed.

Next, when the time stamp of the write command received from the host 4A denotes "10:03", the primary storage apparatus 1 determines that the backup creation reservation time point is exceeded, creates a marker, and stores the marker in the primary journal volume 18. The marker is transmitted to the secondary storage apparatus 3 which is a backup destination via the intermediate storage apparatus 2. Therefore, the reservation time point "10:00" designated by the user and the time point when the backup process is started in the secondary storage apparatus 3 which is a backup destination (a time point later than 10:03) are slightly mismatched.

The difference between the backup creation reservation time point and the time point of actually starting the backup is preferably as small as possible. Thus, in the present embodiment, it is also possible to configure an upper-limit standby time (time-over time: TOV) during creating a maker. When the current time is later than the time point obtained by adding the time regulated by the TOV to the backup creation reservation time point, the primary storage apparatus 1 creates a marker without waiting to receive a write command from the host 4A. The TOV is capable of defining the deviation between the reservation time point and the actual start time point as the maximum acceptable time, for example.

In the above example, a case in which the TOV is configured as "for 5 minutes" will be described. When the primary storage apparatus 1 fails to receive a write command from the host 4A even when the current time point exceeds "10:05", the primary storage apparatus 1 creates a marker, and stores the marker in the primary journal volume 18.

Next, the method of creating a marker in an open system will be described. Time point information is not appended to the write command issued by the host 4B which is an open system. Thus, in the storage management function of the host 4B which is an open system, it is determined whether the current time point reaches the backup creation reservation time point.

Upon determining that the current time point reaches the backup creation reservation time point, the storage management function of the host 4B issues a freeze command for the target volume for the backup process to the primary storage apparatus 1. The primary storage apparatus 1 stops the process for the primary data volume 17 designated by the freeze command. The storage management function of the host 4B reserves to create a backup either concurrently with issuing the freeze command, or after issuing the freeze command. Thereafter, the storage management function of the host 4B indicates cancellation of the freeze command, to the primary storage apparatus 1.

When the freeze command is canceled and the primary storage apparatus 1 comes to execute a process for the data volume 17 which is a backup target, the primary storage apparatus 1 creates a marker for creating a backup as a JNCB, and stores the marker in the primary journal volume 18.

In either case of a mainframe or an open system, the marker stored in the primary journal volume 18 is read from the primary journal volume 18 and stored in the intermediate journal volume 28 by the intermediate storage apparatus 2. In addition, the marker is read from the intermediate journal volume 28 and stored in the secondary journal volume 38, by the secondary storage apparatus 3.

Of the plurality of secondary storage apparatuses 3, an operation of the backup-destination secondary storage apparatus 3 having the secondary data volume 37 designated as a backup destination will be described. Of the all journal data issued until before the issue of the marker, the backup-destination secondary storage apparatus 3 writes, into the secondary data volume 37, the journal data that is not yet written into the secondary data volume 37.

In other words, the backup-destination secondary storage apparatus 3 restores the unprocessed journal data before the issue of the marker into the backup-destination secondary data volume 37. After completion of restoring, the backup-destination secondary storage apparatus 3 splits a copy pair of the intermediate data volume 27 and the backup-destination secondary data volume 37, and changes the state of the copy pair to the suspend state. As a result, the backup-destination secondary data volume 37 retains the stored contents in the primary data volume 17 immediately before the issue of the marker.

The other secondary storage apparatuses 3 that are not designated as a backup destination (3(1) and 3(3) are applicable in FIG. 1) handle the marker as a normal JNCB, and write the journal data associated with the marker into the secondary data volume.

Thus, in the present embodiment, when creating a backup of the primary data volume 17 at a certain time point in the secondary data volume 37, the work is shared between the intermediate storage apparatus 2 and the secondary storage apparatus 3. In other words, the intermediate storage apparatus 2 creates a volume that acts as a backup source, and the secondary storage apparatus 3 writes the journal data into the secondary data volume 37 until the time point designated by the marker, and thus restores the journal data. Since the process is shared between the intermediate storage apparatus 2 and the secondary storage apparatus 3, it is possible to reduce the process load of the secondary storage apparatus 3 as compared to the conventional art.

In the present embodiment, it is possible to create a backup at a designated time point even for a data volume used by the so-called open system host 4B. In the present embodiment, as described above, when the backup creation reservation time point is reached, the storage management function of the host 4B which is an open system requests the process to be stopped for the data volume which is a backup target, and reserves to create the backup at a confirmed time. Therefore, it is possible to create a backup at a designated time point, not only for the host 4A which is a mainframe system, but also for the host 4B which is an open system, to enhance convenience for a user.

In the present embodiment, since it is possible to reserve to create a backup, for example, at a primary site where normal business operations are performed, convenience for a user is enhanced as compared to the conventional art.

First Embodiment

FIG. 2 is a functional block diagram of a storage system. In FIG. 2 and FIG. 3, which is described later, the terminal 6 and the NTP server 7 are not shown. In addition, in FIG. 2 and FIG. 3, only one of the plurality of secondary storage apparatuses 3 is shown.

The primary storage apparatus 1, the intermediate storage apparatus 2, and the secondary storage apparatus 3 may basically be configured as storage apparatuses having the same structure. Thus, the primary storage apparatus 1 will be described in detail, and some description of the intermediate storage apparatus 2 and the secondary storage apparatus 3 will be appropriately omitted. It is noted that the primary storage apparatus 1, the intermediate storage apparatus 2, and the secondary storage apparatus 3 may be storage apparatuses provided by the same vendor and having the same performance, or may be storage apparatuses provided by the same vendor and having different performances, or storage apparatuses provided by a plurality of vendors and having almost the same performance or different performance.

The primary storage apparatus 1 includes a controller 10 and a storage unit 11. First of all, the storage unit 11 is described, followed by the controller 10. The storage unit 11 has a plurality of storage apparatuses (not shown in the figures). As the storage apparatus, for example, various types of storage apparatuses capable of reading and writing data, such as a hard disk device, a semiconductor memory device, an optical disk device, and a magnetic optical disk device may be used. When using a hard disk device, for example, an FC (Fibre Channel) disk, an SCSI (Small Computer System Interface) disk, a SATA disk, an ATA (AT Attachment) disk, and an SAS (Serial Attached SCSI) disk may be used. Moreover, for example, various types of storage apparatuses such as a flash memory, an MRAM (Magnetoresistive Random Access Memory), a Phase-Change Memory, and a ReRAM (Resistive random-access memory), and a FeRAM (Ferroelectric Random Access Memory) may be used. In addition, for example, a configuration in which different types of storage apparatuses are mixed may be used.

For example, by virtualizing a physical storage area included in one or a plurality of storage apparatuses as a RAID (Redundant Arrays of Inexpensive Disks) group, it is possible to form one or a plurality of logical storage areas. By cutting a physical storage area managed as a RAID group into a fixed size or an optional size, it is possible to obtain a logical storage area. The logical storage area is provided to the host 4 as a logical storage apparatus (hereinafter, a logical volume). The data volume 17 and the journal volume 18 shown in FIG. 1 are also created as logical volumes. It is noted that the logical volume used by the host 4A which is a mainframe, and the logical volume used by the host 4B which is an open system are different.

A configuration example of the controller 10 will be described. The controller 10 controls the operation of the primary storage apparatus 1. The controller 10, for example, includes a plurality of front end packages (hereinafter, FEPKs) 12, a plurality of back end packages 13, a plurality of microprocessor packages 14, and a plurality of cache memory packages 15 such that each package is mutually coupled via a switch 16, or the like.

The FEPK 12 is a package for communication control that is used for communicating with an external apparatus such as the host 4. The FEPK 12 includes an FEPK for communicating with a mainframe, and an FEPK for communicating with an open system server, and an FEPK for communicating with another storage apparatus. The FEPK 12 may also be called "first communication control unit", etc.

The back end package (hereinafter, BEPK) 13 is a package for communication control that is used for communicating with each logical volume in the storage apparatus 11. The BEPK 13 may also be called "second communication control unit", etc.

The microprocessor package (hereinafter, MPPK) 14 is a package in which one or a plurality of microprocessors are loaded, and the microprocessor package 14 controls the operation of the controller 10. The MPPK 14 reads and runs a predetermined computer program from a specific logical volume or a cache memory package 15 in the storage unit 11. Thus, the MPPK 14 performs creation and deletion of the logical volume, and various command processes. The MPPK 14 has also a local memory. The MPPK 14 also is capable of copying, to a local memory, the necessary parts of the tables stored in the cache memory package 15, and using the parts.

The cache memory package (hereinafter, CMPK) 15 is a package in which the cache memory is loaded. The memory area of the CMPK 15 includes a shared memory area for storing management information and control information, and a cache area.

Similarly to the primary storage apparatus 1, the intermediate storage apparatus 2 includes also a controller 20 and a storage unit 21. The controller 20 includes an FEPK 22, a BEPK 23, an MPPK 24, a CMPK 25, and a switch 26.

Similarly to the primary storage apparatus 1, the secondary storage apparatus 3 includes also a controller 30 and a storage unit 31. The controller 20 includes an FEPK 32, a BEPK 33, an MPPK 34, a CMPK 35, and a switch 36.

Since the hosts 4 and 5 are configured as ordinary computers including, for example, a microprocessor, a memory, and a communication circuit, the description thereof is omitted. It is noted that a user interface function for operating the hosts 4 and 5 by a user may be provided in the hosts 4 and 5, or may be provided in another computer other than the hosts 4 and 5. By coupling another computer to the hosts 4 and 5, the user is capable of operating the hosts 4 and 5 from a location different from the installation location of the hosts 4 and 5.

FIG. 3 shows, of the software configurations of the storage system, an overview of the software configuration related to backup creation at a designated time point. In FIG. 3, the operating system and the device driver, etc., are omitted.

The primary storage apparatus 1 has a remote copy control unit 100 as a computer program, and management tables T10, T11, and T12 described later. Similarly to the primary storage apparatus 1, the intermediate storage apparatus 2 has also a remote copy control unit 200, and management tables T20, T21, and T22 described later. Similarly to the primary storage apparatus 1, the secondary storage apparatus 3 has also a remote copy control unit 300, and management tables T30 and T31 described later.

The host 4A has an application program 400A and a storage management function (abbreviated as "storage management" in the figure. The same hereinafter.) 401A. The host 4B has also an application program 400B and a storage management unit 401B. The storage management units 401A and 401B are an example of the "management apparatus". When not differentiated, the storage management units 401A and 401B are called the storage management unit 401. The storage management unit 401, which is the management apparatus, may be able to operate in coordination with the host 4 and the storage apparatus 1. Therefore, a storage management function may be provided in a computer outside the host 4.

Here, at least the storage management unit 401B includes a management table T40 in which information necessary for reserving a backup at a designated time point is stored. The management table T40, for example, manages a generation, a split time point, a split status, etc.

FIG. 4 shows a configuration example for creating a backup at a designated time point, by sharing the process among a plurality (three) of sites, namely the primary site, the intermediate site, and the secondary site. The encircled numbers in the figure are numbers for identifying a pair relationship between journals, and may be abbreviated as a mirror ID (MID) in some cases. A journal group is capable of using four MIDs from "0" to "3". An MID may be prepared for each generation.

A journal group is used to group together and manage one or a plurality of data volumes and one journal volume. In the example shown in FIG. 4, two journal groups, that is, a journal group for a mainframe and a journal group for an open system are illustrated. In the figure, only the reference signs of the journal volumes are shown, but each journal group includes a data volume as well.

The primary storage apparatus 1, the intermediate storage apparatus 2, and each secondary storage apparatus 3 respectively include two journal groups, that is, a journal group for a mainframe and a journal group for an open system. The journal group may be called a primary-side journal group, an intermediate journal group, and a secondary-side journal group.

The primary-side journal group for a mainframe acts as a copy source, and the intermediate journal group for a mainframe acts as a copy destination, thus forming a copy pair. The identification number MID of the copy pair is "0".

The intermediate journal group for a mainframe acts as a copy source, and the secondary-side journal group for each mainframe acts as a copy destination, thus forming a total of three copy pairs. The identification number MID of the copy pairs is "1", "2", and "3". In the present embodiment, it is possible to create a backup in three generations for the primary data volume 17 used by the host 4A which is a mainframe.

Similarly, the primary-side journal group for an open system acts as a copy source, and the intermediate journal group for an open system acts as a copy destination, thus forming a copy pair. The identification number MID of the copy pair is "3".

The intermediate journal group for an open system acts as a copy source, and the secondary-side journal group for each open system acts as a copy destination, thus forming a total of three copy pairs. The identification number MID of the copy pairs is "0", "1", and "2". In the present embodiment, it is possible to create a backup in three generations for the primary data volume 17 used by the host 4B which is an open system.

Next, a configuration example of the management tables used in the storage apparatus at each site will be described using FIG. 5 through FIG. 18. FIG. 5 through FIG. 9 show the tables for managing a pair of asynchronous remote copying. FIG. 10 through FIG. 14 show the tables for managing journals. FIG. 15 through FIG. 18 show the tables for managing a JNCB. It is noted that each management table described hereinafter is prepared for explaining the present embodiment, and may not completely match the description of the other management tables.

The remote copy pair management table T10 shown in FIG. 5 is used by the primary storage apparatus 1. The management table T10, for example, manages a management number (#), an existence of a pair, an emulation type, pair-source volume information, pair-destination volume information, an MID, a mirror attribute, and a pair state. Items other than those shown in the figures may also be managed by the tables, including the other tables described hereinafter. A remote copy pair may be abbreviated as a copy pair.

The management number (#) is a number for managing a remote copy pair inside the primary storage apparatus 1. The numeric characters are configured in the order of registration of the remote copy pairs to be managed. The existence of a pair is information denoting whether a pair of asynchronous remote copying is formed. The emulation type includes a mainframe (MF) and an open system (OPEN).

The pair-source volume information is information about a volume that acts as a pair source (copy source) of an asynchronous remote copy pair. In the description provided below, an asynchronous remote copy pair may be abbreviated as a copy pair. The pair-source volume information, for example, manages an apparatus number (SN) for specifying a storage apparatus in which a pair-source volume exists, an identification number (VOL #) of the pair-source volume, a number of a journal group (JNLG #) to which the pair-source volume belongs, and a journal attribute. In the journal attribute, either a copy source (M) or a copy destination (R) is configured. Here, since the volume in the primary storage apparatus 1 is a copy-source volume (the pair-source volume), the journal attribute is configured to "M". Here, since the pair-source volume exists in the primary storage apparatus 1, the number of the primary storage apparatus 1 is configured to the apparatus number of the pair-source volume information.

The pair-destination volume information is information about a volume that acts as a pair destination (copy destination) of an asynchronous remote copy pair. The pair-destination volume information, for example, manages an apparatus number (SN) for specifying a storage apparatus in which a pair-destination volume exists, an identification number (VOL #) of the pair-destination volume, and a number of a journal group (JNLG %) to which the pair-destination volume belongs. Here, since the pair-destination volume is provided in the intermediate storage apparatus 2, the number of the intermediate storage apparatus 2 is configured to the apparatus number of the pair-destination volume information.

As described above, the MID denotes the mirror ID. Here, the mirror ID "0" is used in a journal group for a mainframe and the mirror ID "3" is used in a journal group for an open system. In the mirror attribute, either a copy source (M) or a copy destination (R) is configured. Here, "M" is configured in the mirror attribute of each mirror ID. The pair state is information denoting the state of a pair of asynchronous remote copying. The pair state includes "PAIR", "PSUS", and the like. When a pair is not formed, "NULL" is configured.

The remote copy pair management table T20 shown in FIG. 6 is used by the intermediate storage apparatus 2. Since the structure of the management table T20 is similar to that of the management table T10 described in FIG. 5, duplicate description will be omitted, and the differences from the management table T10 will be described.

In the apparatus number of the pair-source volume information, the number of the intermediate storage apparatus 2 is configured. In the journal attribute of the pair-source volume information, any one of a copy source (M), a copy destination (R), or a copy source or copy destination (M/R) is configured. The journal volume of the intermediate storage apparatus 2 acts as a copy destination for the journal volume of the primary storage apparatus 1, and as a copy source for the journal volume of the secondary storage apparatus 3. The journal attribute varies depending on with which storage apparatus the remote copying is executed.

In the apparatus number of the pair-destination volume information, the apparatus number of the secondary storage apparatus 3 having the volume of the pair destination (copy destination) is configured.

FIG. 7 through FIG. 9 show the remote copy pair management table T30 that is used by each secondary storage apparatus 3. The first secondary storage apparatus 3(1) uses the remote copy pair management table T30(1), the second secondary storage apparatus 3(2) uses the remote copy pair management table T30(2), and the third secondary storage apparatus 3(3) uses the remote copy pair management table 30(3). When not particularly differentiated, the management tables T30(1) to 30(3) are called the management table T30. Similarly, in the other tables described below, when not differentiated, a bracketed subscript numeral is omitted.

Since the management table T30 used in the secondary storage apparatus 3 is similar to the management table T10 described in FIG. 5, duplicate description will be omitted, and the differences from the management table T10 is described.

In the apparatus number of the pair-source volume information, the number of the secondary storage apparatus 3 is configured. In the journal attribute, in most cases, "R" which denotes to be a copy destination, is configured. In the apparatus number of the pair-destination volume information, the number of the intermediate storage apparatus 2 is configured. The same applies to FIG. 8 and FIG. 9.

FIG. 10 shows a configuration example of the table T11 for managing a journal group. The journal management table T11 is used by the primary storage apparatus 1.

The journal management table T11, for example, manages a management number (#), an existence of a group (grp.), a journal group number (JNLG #), an emulation type of the journal group (Type), a journal volume number (JVOL #), a JNL attribute, an existence of receipt of a freeze command (Freeze), the number of pairs (PN), backup management information (Backup), MID #, an existence of an MID, an MID attribute (M/R), an MID generation # (MIDG #), and an MID state. The backup management information may also be called backup reservation information.

The management number (#) is a number for managing a journal group inside a storage apparatus. A consecutive number is configured in the order of registration of the journal group. The existence of a group (grp.) is information denoting whether a journal group is actually registered. The journal group number (JNLG #) is information for identifying and managing a journal group in the storage system. In a user interface, the journal group number is used to specify the journal group.

The emulation type of the journal group is information for differentiating whether the journal group is for a mainframe or for an open system. The journal volume number (JVOL #) is information for identifying the journal volume. The journal attribute is information for differentiating whether the journal volume is a copy source (M) or a copy destination (R).

The existence of receipt of a freeze command (Freeze) is information denoting whether the primary storage apparatus 1 receives the freeze command. When the freeze command is received, "Received" is configured.

The freeze command is a command for requesting to discontinue a process on the data volume 17 which is a backup target. The freeze command is issued when backup creation is indicated at a predetermined time point for the data volume 17 used by the host 4B which is an open system (host computer configured as a server of an open system). Here, the role of the freeze command is described in brief.

An issuing source of a freeze command is a computer having a function of managing the primary storage apparatus 1, and in the present embodiment, the issuing source is the host 4B which is an open system. The storage management unit 401B of the host 4B issues a freeze command when a predetermined time point designated by a user is reached.

Upon receiving the freeze command, the primary storage apparatus 1 stops a process on the primary data volume 17 designated by the freeze command. As a result, the stored contents in the primary data volume 17 are fixed at the time point when the freeze command is received by the primary storage apparatus 1. The time point when the freeze command is received by the primary storage apparatus 1 may also be considered as the time point when the freeze command is issued.

During the time the process stops, the storage management unit 401B of the host 4B indicates the primary storage apparatus 1 to create a marker for indicating to create a backup. As a result, in the primary journal volume 18, the marker is stored after the journal data stored immediately before the issue of the freeze command.

Upon receiving, from the storage management unit 401B of the host 4B, a RUN command for canceling the freeze command, the primary storage apparatus 1 resumes a process on the primary data volume 17. When the host 4B updates the data of the primary data volume 17 on which the process is resumed, journal data is generated. The journal data is positioned after the marker, and is stored in the primary journal volume 18.

The number of pairs (PN) is the number of pairs of asynchronous remote copying that are registered in a journal group.

The backup management information (Backup) is management information for creating a backup at a designated time point. The backup management information, for example, may include generation reservation information (reservation), a split time point (time point), a split status (status), and a TOV time (TOV).

The generation reservation information (reservation) is information for designating a generation for backup creation. A plurality of generations may be reserved. The split time point (time point) is the time point of splitting a remote copy pair, and being reserved from the host 4A which is a mainframe.

In a case of the data volume 17 for an open system, the process is discontinued by a freeze command from the host 4B, and the process is resumed by a RUN command from the host 4B. During the time the process is being discontinued, a marker for creating a backup at a designated time point is generated, and the marker is stored in the journal volume 18. Therefore, NULL is configured in the split time point for the data volume 17 for an open system. In the case of an open system, the storage management unit 401B of the host 4B gives an indication at the time point when the copy pair needs to be split.

The split status (status) denotes the status when a copy pair is split. The split statuses include "Split not complete", "Splitting", and "Split completed".

The TOV time (TOV) is a time during which a time-over is allowed when a copy pair does not split even when a split reservation time point is exceeded. The TOV time is an example of the "upper-limit standby time". When the TOV time from a designated time point for a backup has elapsed, the primary storage apparatus 1 automatically generates a marker for creating a backup without waiting for an update from the host 4A.

For example, it is assumed that "10:00" is designated as the backup creation reservation time point, and the TOV time is configured as for five minutes. When the host 4A updates data in the primary data volume 17 during the time zone from 10:00 and later, and before 10:05, a JNCB having the function of a marker is created along with the journal data corresponding to the update, and is stored in the journal volume 18. The same applies to a case when a write command from the host 4A is received at 10:04. In such a case, a backup is created after a slight delay from the initial reservation time point, and there is practically no effect. When a difference between the reservation time point and the actual backup creation time point is to be reduced, the TOV time may be configured to a short period.

When it is not possible to receive a write command from the host 4A even after 10:05 is exceeded, the primary storage apparatus 1 automatically creates a marker, and stores the marker in the primary journal volume 18 along with the journal data. The marker for indicating to create a backup is created as a JNCB. Therefore, in order to enable the marker to function also as a JNCB, the primary storage apparatus 1 also creates the journal data together. The journal data does not have any relationship with the write data from the host 4A, and is therefore generated as a so-called dummy journal data. In the dummy journal data, the contents of the restore-destination volume are not changed.

The MID number (MID #) is information for specifying an MID used in asynchronous remote copying. The existence of an MID (existence) denotes whether or not an MID is configured. The MID attribute (M/R) denotes the differentiation whether the MID is a copy source (M) or a copy destination (R). The MID generation (MIDG #) denotes the generation to which the MID corresponds. When the JNL attribute is a copy source (M), a generation # is configured in the MID having the M attribute. When the JNL attribute is a copy destination (R), a generation # is configured in the MID having the R attribute.

The MID state (state) denotes the state of the MID, that is, the state of asynchronous remote copying. The MID state includes, for example, "start", "init", and "stop". The state before forming a copy pair is "init" (initial state), the state in which a copy pair is formed and synchronism is started is "start", and the state in which the copy pair is split and copying is stopped is "stop".

FIG. 11 shows a configuration example of the journal management table T21 used by the intermediate storage apparatus 2. The journal management table T21 has the same structure as the journal management table T11 described in FIG. 10, and therefore, duplicate description will be omitted.

In the present embodiment, reservation and cancellation for backup creation are managed at the primary site. Therefore, the intermediate storage apparatus 2 need not have information regarding the backup. Thus, the backup management information is not configured in the journal management table T21 of the intermediate storage apparatus 2. The backup management information is not required in the journal management table T21 of the intermediate storage apparatus 2. However, in the present embodiment, since common tables are used in the primary storage apparatus 1, the intermediate storage apparatus 2, and each secondary storage apparatus 3 in order to simplify the control structure, the journal management table T21 also includes the backup management information.

FIG. 12 through FIG. 14 show configuration examples of the journal management table T31 used by each secondary storage apparatus 3. The journal management table T31(1) shown in FIG. 12 is used by the first secondary storage apparatus 3(1). The journal management table T31(2) shown in FIG. 13 is used by the second secondary storage apparatus 3(2). The journal management table T31(3) shown in FIG. 14 is used by the third secondary storage apparatus 3(3).

As described in the journal management table T21 used by the intermediate storage apparatus 2, NULL is configured in the backup management information even in the journal management table T31 used by the secondary storage apparatus 3. This is because in the present embodiment, reservation and cancellation for backup is managed at the primary site, and the backup creation is indicated to the secondary storage apparatus 3 using the marker created as a type of a JNCB.

FIG. 15 is a configuration example of a table T12A that manages a JNCB for managing journal data for a mainframe. When the host 4A writes data into the primary data volume 17 for a mainframe, journal data corresponding to the write data, and a JNCB that is journal management information for managing the journal data are created. The JNCB management table T12A for a mainframe that is shown in FIG. 15 manages the JNCB.

The JNCB management table T12A, for example, includes a logical volume number (LDEV #), a start slot number, a start LBA (Logical Block Address), the number of LBAs, a sequence number (SEQ #), a time stamp, an existence of transmission for each MID, a restored state for each MID, and an existence of a marker for each generation.

The logical volume number (LDEV #) is information for identifying a journal volume, which is a storage destination of the JNCB. The start slot number is information for specifying a slot for storing the JNCB. The start LBA denotes the head address for storing the JNCB in the slot specified by the start slot number. The number of LBAs represents the data length of the JNCB in the form of number of LBAs. The sequence number (SEQ #) is information for managing the update order of the journal data. The time stamp is information for denoting the creation time point of the journal data and the JNCB.

The existence of transmission for each MID is information denoting whether the journal data and the JNCB are already transmitted to the copy-destination journal volume 28 from the MID corresponding to the journal data. The primary storage apparatus 1 transmits, to the journal volume 28 of the intermediate storage apparatus 2, the JNCB and the journal data that are not configured in "Already transmitted".

The restored state for each MID is information denoting whether the journal data transmitted to the copy-destination journal volume 28 is already restored to the copy-destination intermediate data volume 27. It is possible to delete the journal data and the JNCB for which the restore is complete from the primary journal volume 18. The removal of the journal data and the JNCB from the journal volume is referred to as purging. The existence of a marker for each generation is information denoting, for each generation, whether or not a marker is issued. In the figure, the generation is denoted as "G #". "Yes" is configured in a generation for which a marker is issued. "No" is configured in a generation for which a marker is not issued. "Spare" is configured in an unused generation.

FIG. 16 is an example of a table T12B that manages a JNCB for an open system. The JNCB management table T12B has the same structure as the JNCB management table T12A described in FIG. 15. Therefore, duplicate description is omitted, and the differences between the two are described.

In the JNCB management table T12B for an open system, no value is configured in a time stamp. This is because time point information is not configured in a write command received from the host 4B which is an open system.

FIG. 17 shows an example of a JNCB management table T22A for a mainframe that is used in the intermediate storage apparatus 2. The JNCB management table T22A has the same structure as the JNCB management table T12A described in FIG. 15.

The intermediate storage apparatus 2 reads journal data and a JNCB from the primary journal volume 18 for a mainframe, and stores the read journal data and JNCB in the intermediate journal volume 28 for a mainframe. The intermediate storage apparatus 2 stores the JNCB read from the primary storage apparatus 1 in the JNCB management table T22A. In being stored, an address of the storage destination, for example, is appropriately corrected.

FIG. 18 shows an example of a JNCB management table T22B for an open system that is used in the intermediate storage apparatus 2. The JNCB management table T22B has the same structure as the JNCB management table T12B described in FIG. 16. The intermediate storage apparatus 2 reads journal data and a JNCB from the primary journal volume 18 for an open system, and stores the read journal data and JNCB in the intermediate journal volume 28 for an open system. As described for the JNCB for a mainframe, the intermediate storage apparatus 2 stores the JNCB read from the primary storage apparatus 1 in the JNCB management table T22B for an open system.

Next, a method of sharing a backup process at a designated time point among a plurality of sites will be described using FIG. 19 through FIG. 37. In the figures, a primary site (P site), an intermediate site (I site) and a secondary site (R) are shown as if they were operating subjects in a process, however, the actual operating subjects are the storage apparatuses 1 to 3, and the host 4.

FIG. 19 shows a process of registering a journal in the storage system. In the figure, a process enclosed by an alternate long and two short dashes line denotes a process operated by a user. Some or all steps of the user operations may be automated.

In the present embodiment, a journal group and an indication for a backup process, for example, are managed at the primary site. The user need not give an indication to the storage system from an intermediate site and a secondary site. Of information included in the primary storage apparatus 1, the information necessary for the intermediate storage apparatus 2 is passed from the primary storage apparatus 1 to the intermediate storage apparatus 2. Similarly, of information included in the primary storage apparatus 1, the information necessary for the secondary storage apparatus 3 is passed from the primary storage apparatus 1 to the secondary storage apparatus 3 via the intermediate storage apparatus 2. The information on a backup process flows among the storage apparatuses 1 and 3 mainly with the help of the JNCBs.

The user uses a user interface provided by the storage management unit 401 of the host 4 to enter a journal group management number (JNLG #) (S10). The user enters a journal volume number (JVOL #) (S11), and then enters an emulation type of the journal group (S12). The user indicates the primary storage apparatus 1 via the storage management unit 401 to register the journal group (S13).

Upon receiving the indication related to the registration of the journal from the host 4 (S14), the primary storage apparatus 1 determines whether it is possible to register the journal having the indicated contents (S15). When the primary storage apparatus 1 determines that it is possible to register the journal having the indicated contents (S15: YES), the primary storage apparatus 1 configures the information in the journal management table T11 (S16). The primary storage apparatus 1 replies to an indication source that the registration of the journal ends successfully (S17).

The indication source is an apparatus that issues the indication in step S13, and in the present embodiment, the indication source is the host 4.

In step S16, the primary storage apparatus 1 configures the journal group management number, the journal volume number, and the emulation type for the journal management table T11 shown in FIG. 10, and in addition, configures "Yes" in the "Existence of a group".

When the primary storage apparatus 1 determines that it is not possible to register the journal having the indicated contents (S15: NO), the primary storage apparatus 1 denies the indication for the registration of the journal to the indication source (S18). For example, when the designated journal volume does not exist, or is already in use, it is not possible to register the journal.

FIG. 20 shows a process of forming an asynchronous remote copy pair. FIG. 20 shows a process of configuring a copy source of a copy pair. The process is executed in the primary storage apparatus 1 or the intermediate storage apparatus 2.

The data volume 17 and the journal volume 18 of the primary storage apparatus 1 act as the primary-side volumes for the data volume 27 and the journal volume 28 of the intermediate storage apparatus 2. The data volume 27 and the journal volume 28 of the intermediate storage apparatus 2 act as the secondary-side volumes.

The data volume 27 and the journal volume 28 of the intermediate storage apparatus 2 act as the primary-side volumes for the data volume 37 and the journal volume 38 of the secondary storage apparatus 3. The data volume 37 and the journal volume 38 of the secondary storage apparatus 3 act as the secondary-side volumes. Hereinafter, a case in which a copy pair is configured between the primary storage apparatus 1 and the intermediate storage apparatus 2 is described as an example.

A user enters, into the storage management unit 401 of the host 4, the information necessary for forming a copy pair (S20). The information necessary for forming a copy pair includes, for example, an apparatus number, a volume number, a journal group management number, and an MID.

The apparatus number includes an apparatus number for specifying the primary storage apparatus 1 that acts as a copy-source apparatus, and an apparatus number for specifying the intermediate storage apparatus 2 that acts as a copy-destination apparatus. The volume number includes a volume number for specifying the primary data volume 17 that acts as a copy-source volume, and a volume number for specifying the intermediate volume 27 that acts as a copy-destination volume. The journal group management number includes a journal group management number of the primary storage apparatus 1, and a journal group management number of the intermediate storage apparatus 2. The MID (also called the MID number) includes an MID used by the journal group of the primary storage apparatus 1, and an MID used by the journal group of the intermediate storage apparatus 2.

The user indicates the primary storage apparatus 1, via the storage management unit 401 of the host 4, to form a copy pair (S21).

Upon receiving the indication for forming a copy pair (S22), the primary storage apparatus 1 determines whether it is possible to form a copy pair having the indicated contents (S23). When the primary storage apparatus 1 determines that it is not possible to form a copy pair having the indicated contents (S23: NO), the primary storage apparatus 1 denies the indication for the formation of a copy pair to the indication source (S24).

When the primary storage apparatus 1 determines that it is possible to form a copy pair having the indicated contents (S23: YES), the primary storage apparatus 1 configures predetermined information in the remote copy pair management table T10 (S25), and in addition, configures another predetermined information in the journal management table T11 (S26).

In step S25, the primary storage apparatus 1 configures the "Existence of a pair" to "Yes" for the remote copy pair management table T10, and in addition, configures the emulation type, the pair-source volume information, the pair-destination volume information, the MID, and the mirror attribute.

In step S26, the primary storage apparatus 1 configures the journal attribute, the number of pairs, the MID attribute, and the MID generation for the journal management table T11, and in addition, configures "Yes" in the "Existence of an MID".

In the primary storage apparatus 1, "Copy transition" is configured in the MID state of the journal management table T11 (S27). The state of the primary data volume is also configured to "Copy transition". "Copy transition" implies that a process of forming a copy pair is in progress. At the time point of step S27, the status of the intermediate storage apparatus 2, which is a pair destination, is unclear, and therefore, the transition state is configured in the journal management table T11.

Upon completion of configurations to the tables T10 and T11 is complete, the primary storage apparatus 1 indicates the intermediate storage apparatus 2 to form a copy pair (S28). It is noted that in the figure, the "secondary side" implies a pair destination of the copy pair, and does not denote the secondary storage apparatus 3. As described above, when the primary storage apparatus 1 is the primary side (pair source), the secondary side (pair destination) is the intermediate storage apparatus 2. When the intermediate storage apparatus 2 is the primary side (pair source), the secondary side (pair destination) is the secondary storage apparatus 3.

The primary storage apparatus 1 awaits a response from the intermediate storage apparatus 2, and determines whether the copy pair formation process in the intermediate storage apparatus 2 is complete (S29).

When the primary storage apparatus 1 determines that the process in the intermediate storage apparatus 2 is complete (S29: YES), the primary storage apparatus 1 transits the MID state that was configured to "Copy transition" in step S27 to "Copy" (S30). The state of the primary data volume also changes to "Copy". The primary storage apparatus 1 replies to the host 4, which is an indication source, that the formation of the copy pair is successfully completed (S31).

Thereafter, asynchronously with the indication for the formation of a copy pair, data copying is executed from the primary data volume 17 to the intermediate data volume 27 (S32). The copying performed in step S32 is an initial copying that is performed for matching the stored contents in the primary data volume 17 with the stored contents in the intermediate data volume 27. After completion of the initial copying, the primary storage apparatus 1 transits the MID state of the journal management table T11 to "Pair" (S33).

On the other hand, when the process in the intermediate storage apparatus 2 is not complete (S29: NO), it is not possible to form an asynchronous copy pair between the primary storage apparatus 1 and the intermediate storage apparatus 2. Thus, the primary storage apparatus 1 deletes the configuration contents into the remote copy pair management table T10 that were configured in step S25 (S34), and also deletes the configuration contents into the journal management table T11 that were configured in step S26 (S35). Then, the primary storage apparatus 1 denies the indication for the formation of a copy pair to the indication source of the copy pair formation (S36).

FIG. 21 shows a process of configuring a copy destination of a copy pair. The process is executed in the intermediate storage apparatus 2 or the secondary storage apparatus 3. Here, a case in which the process is executed in the intermediate storage apparatus 2 will be described. The process shown in FIG. 21 corresponds to the process described in FIG. 20.

As described above, in step S28 of FIG. 20, the primary storage apparatus 1 indicates the intermediate storage apparatus 2 to form a copy pair. The intermediate storage apparatus 2 receives the indication from the primary storage apparatus 1 (S40).

The intermediate storage apparatus 2 determines whether it is possible to form a copy pair according to the indication from the primary storage apparatus 1 (S41). When the intermediate storage apparatus 2 determines that it is not possible to form a copy pair (S41: NO), the intermediate storage apparatus 1 denies the indication for the formation of a copy pair to the primary storage apparatus 1 (S42).

When the intermediate storage apparatus 2 determines that it is possible to form a copy pair according to the indication from the primary storage apparatus 1 (S41: YES), the intermediate storage apparatus 2 configures the information in the remote copy pair management table T20 and the journal management table T21, respectively (S43, S44).

In step S43, the intermediate storage apparatus 2 configures "Yes" in the "Existence of a copy pair" for the remote copy pair management table T20, and in addition, configures the emulation type, the pair-source volume information, the pair-destination volume information, the MID, and the mirror attribute, respectively.

In step S44, the intermediate storage apparatus 2 configures the journal attribute, the number of pairs, the MID attribute, and the MID generation for the journal management table T21, and in addition, configures "Yes" in the "Existence of an MID".

After the configurations of the management tables T20 and T21 are ended, the intermediate storage apparatus 2 configures the state of the MID used in the copy pair to "Copy" (S45), and replies to the primary storage apparatus 1 that the copy pair formation process is successfully completed (S46).

Thereafter, at an appropriate timing, data copying (initial copying) is started from the primary data volume 17 to the intermediate data volume 27 (S47). When data copying is complete, and the stored contents in the primary data volume 17 and the stored contents in the intermediate data volume 27 match, the intermediate storage apparatus 2 configures the MID state to "Pair".

It is noted that FIG. 20 and FIG. 21 show a case in which an asynchronous remote copy pair is configured between the primary storage apparatus 1 and the intermediate storage apparatus 2; however, the process shown in FIG. 20 and FIG. 21 may be used even in a case in which an asynchronous remote copy pair is configured between the intermediate storage apparatus 2 and the secondary storage apparatus 3. In such a case, the primary storage apparatus 1 is the intermediate storage apparatus 2, and the intermediate storage apparatus 2 is the secondary storage apparatus 3.

An indication from the user may be provided to the intermediate storage apparatus 2 and the secondary storage apparatus 3 via the primary storage apparatus 1, and a configuration in which an indication is provided from a management computer not shown in figures to the intermediate storage apparatus 2 and the secondary storage apparatus 3 may be adopted.

FIG. 22 shows a process for reserving backup creation at a designated time point, for a data volume used for a mainframe.

A user enters information necessary for creating a backup into the storage management unit 401A of the host 4A, which is a mainframe (S50 to S53). Then, the user indicates to reserve to create a backup to the primary storage apparatus 1 via the storage management unit 401A (S54). Hereinafter, the reservation for creating a backup may be abbreviated as backup reservation.

Information entered by the user into the storage management unit 401A will be described below. In step S50, the user enters a backup creation reservation time point. In step S51, the user enters a TOV time.

In step S52, the user enters a management number of a journal group used in creating a backup. In particular, the user enters the management number of the journal group (JNLG #) to which the primary data volume 17 which is a backup target belongs and the management number of the journal group (JNLG #) to which the secondary data volume 37 that forms a copy pair with the primary data volume 17 belongs. Here, the relationship among the primary data volume 17 which is a backup target, the backup-destination secondary data volume 37 in which the contents of the primary data volume 17 at a designated time point are backed up, and the intermediate data volume 27 that intermediates between the primary data volume 17 and the secondary data volume 37 is linked up.

In step S53, the user enters a generation for creating a backup into the storage management unit 401A.

Upon receiving an indication for backup reservation from the host 4A (S55), the primary storage apparatus 1 locks the journal management table T11 (S56), and prohibits the operation of the management table T11 by other processes. This is to successfully register the backup reservation.

The primary storage apparatus 1 acquires the reservation state for the generation (G #) indicated by the host 4A from the journal management table T11 (S57). In addition, the primary storage apparatus 1 acquires the state of the copy pair for the generation indicated by the host 4A from the journal management table T11 (S58).

The primary storage apparatus 1 determines whether a backup reservation is possible, on the basis of reservation enabled conditions configured beforehand (S59). The reservation enabled condition, for example, could include that (condition 1) the reservation time point is a time point in the future, that (condition 2) no other reservation is configured for the indicated generation, that (condition 3) the configuration of the copy pair of the indicated generation is a copy pair from the journal of the M attribute to the journal of the R attribute, and that (condition 4) the copy pair state of the indicated generation is "Pair". When all of the above conditions 1 through 4 are satisfied, the primary storage apparatus 1 determines that the backup reservation is possible.

When the primary storage apparatus 1 determines that the backup reservation is possible (S59: YES), the primary storage apparatus 1 configures the backup information (reservation of the generation->Yes, split time point, status, and TOV) for the journal management table T11 (S60).

Then, the primary storage apparatus 1 unlocks the journal management table T11 (S61), and replies to the indication source of the backup reservation that the backup reservation ends successfully (S62). The indication source of the backup reservation is the host 4A (in particular, the storage management unit 401A), here.

On the other hand, when the primary storage apparatus 1 determines that the backup reservation is not possible (S59: NO), the primary storage apparatus 1 unlocks the journal management table T11 (S63), and replies to the indication source of the backup reservation that the backup reservation is not possible (S64).

FIG. 23 shows a process for reserving backup creation at a designated time point, for a data volume used for an open system. The process is executed in the storage management unit 401B of the host 4B which is an open system.

The user enters the backup creation reservation time point (S70), the journal management number for specifying a copy-source and copy-destination journal groups (S71), and the generation for reserving backup creation (S72), into the storage management unit 401B of the host 4B. A TOV time is not configured in a backup reservation for an open system. This is because the storage management unit 401B of the host 4B manages a marker issuing time point. When the user enters the necessary information on a user interface screen, a backup reservation is indicated to the storage management unit 401B (S73).

Upon receiving the indication for a backup reservation (S74), the storage management unit 401B acquires the backup reservation state of the indicated generation from the management table T40 managed by the storage management unit 401B (S75). In addition, the storage management unit 401B acquires the state of the copy pair of the indicated generation from the management table T40 (S76).

The storage management unit 401B determines whether a backup reservation is possible based on the indicated contents (S77). When all of the above conditions 1 through 4 are satisfied, the storage management unit 401B determines that a backup reservation is possible.

When the storage management unit 401B determines that a backup reservation is possible (S77: YES), the storage management unit 401B configures the information related to the backup reservation indicated by the user in the management table T40 (S78). The storage management unit 401B replies to an indication source that the backup reservation ends successfully (S79).

Here, the indication source is a user interface unit that indicates a backup reservation to the storage management unit 401B. Upon receiving a successful response from the storage management unit 401B, the user interface unit, for example, displays a message such as "In the generation #, a backup creation is reserved for xx:xx" on the screen.

When the storage management unit 401B determines that it is not possible to perform the backup reservation (S77: NO), the storage management unit 401B replies to the indication source that the backup reservation is not possible (S80). The reply may include a reason for the failure to reserve a backup. The user interface unit, for example, displays a message such as "In the generation #, a backup reservation could not be made for xx:xx". Please check your configuration content" on the screen.

FIG. 24 shows a process for canceling a backup reservation that is configured for a data volume used for a mainframe. The process cancels the backup reservation configured in FIG. 22.

The user enters the management number (S90) and the generation (S91) of the journal group into the storage management unit 401A of the host 4A which is a mainframe, as information that is necessary for specifying an already configured backup reservation.

The user indicates cancellation of the backup reservation to the primary storage apparatus 1 via the storage management unit 401A (S92). The cancellation of the backup reservation implies that the backup reservation is withdrawn.

Upon receiving the indication for reservation cancellation (S93), the primary storage apparatus 1 locks the journal management table T11 (S94), and acquires the reservation state of the indicated generation from the journal management table T11 (S95).

The primary storage apparatus 1 determines on the basis of cancellation enabled conditions configured beforehand whether it is possible to cancel the backup reservation (S96). The conditions for canceling the reservation, for example, could include that (cancellation condition 1) a backup creation is reserved for the indicated generation, and that (cancellation condition 2) the split status of the indicated generation is other than "Splitting". When both the cancellation conditions 1 and 2 are satisfied, the primary storage apparatus 1 determines that it is possible to cancel the backup reservation. When the split status is "Splitting", the backup process has already started, and therefore, the reservation is not canceled.

When the primary storage apparatus 1 determines that it is possible to cancel the backup reservation (S96: YES), the primary storage apparatus 1 configures the "Existence of a reservation" to "No" for the indicated generation in the journal management table T11 (S97). The primary storage apparatus 1 releases the lock of the journal management table T11 (S98), and replies to the indication source of the reservation cancellation that the backup reservation is successfully canceled (S99).

On the other hand, when the primary storage apparatus 1 determines that it is not possible to cancel the backup reservation (S96: NO), the primary storage apparatus 1 unlocks the journal management table T11 (S100), and replies to the indication source that it is not possible to cancel the backup reservation (S101).

FIG. 25 shows a process for canceling a backup reservation that is configured for a data volume used for an open system. The process cancels the backup reservation configured in FIG. 23. The process is executed in the storage management unit 401B of the host 4B which is an open system.

By entering the journal group management number (S110) and the generation (S111) into the storage management unit 401B, the user specifies the backup reservation which is a cancellation target. The user indicates cancellation of the backup reservation to the storage management unit 401B (S112).

Upon receiving the indication for reservation cancellation (S113), the storage management unit 401B acquires the reservation state of the indicated generation from the management table T40 (S114), and determines whether it is possible to cancel the indicated backup reservation (S115). When both the cancellation conditions 1 and 2 described above are satisfied, the storage management unit 401B determines that it is possible to cancel the backup reservation.

When the storage management unit 401B determines that it is possible to cancel the backup reservation (S115: YES), the storage management unit 401B configures the state of reservation to "No" for the indicated generation in the management table T40 (S116). Then, the storage management unit 401B replies to the indication source that the backup reservation is successfully canceled (S117).

On the other hand, when the storage management function 401B determines that it is not possible to cancel the backup reservation (S115: NO), the storage management unit 401B replies to the indication source that it is not possible to cancel the backup reservation (S118).

FIG. 26 shows an I/O process executed in the primary storage apparatus 1. The primary storage apparatus 1 receives a write I/O (write command) from the host 4 (S120). The primary storage apparatus 1 determines whether the write-destination data volume 17 designated by the write command is in a freeze state (S121).

As described later, when reserving backup creation for the data volume 17 for an open system, the host 4B which is an open system issues a freeze command at a predetermined time point. The host 4B indicates to create a backup in a state where the process on the primary data volume 17 which is a backup target is stopped. When the write-destination data volume 17 is in the freeze state (S121: YES), the primary storage apparatus 1 receives a RUN command from the host 4B, and waits for the cancellation of the freeze state (S122). When the write-destination data volume 17 is not in the freeze state (S121: NO), the process moves to step S123. When a write command is received from the host 4A which is a mainframe, the above-described steps S121 and S122 are skipped. Steps S121 and S122 are executed when a write command is received from the host 4B which is an open system.

The primary storage apparatus 1 writes the write data received from the host 4 into the designated address in the write-destination primary data volume 17 (S123). The primary storage apparatus 1 acquires the sequence number for managing the update order of the journal data (S124), and then locks the journal management table T11 (S125).

The primary storage apparatus 1 references the backup management information (backup reservation information) of the journal management table T11 (S126). When the write command is from the host 4A which is a mainframe, the primary storage apparatus 1 references the time stamp associated with the write command (S127). It is noted that since the write command issued from the host 4B which is an open system does not have a time stamp, step S127 is skipped.

The primary storage apparatus 1 determines whether a backup is reserved for the write-destination data volume 17 (S128). In particular, the primary storage apparatus 1 determines whether a backup is reserved for the data volume 17, and whether the copy pair of the data volume 17 is not yet split. This is because when splitting has started, the backup process is already being executed.

When the primary storage apparatus 1 determines that backup creation is reserved for the write-destination data volume 17 (S128: YES), the primary storage apparatus 1 determines whether the time point of the time stamp acquired in step S127 exceeds the backup reservation time point (S129).

It is noted that when the write destination is the data volume 17 for an open system, step S129 is skipped. This is because, as described above, the backup reservation time point for the data volume 17 for an open system is managed in the storage management unit 401B.

When the primary storage apparatus 1 determines that the time point of the time stamp exceeds the backup reservation time point (S129: YES), the primary storage apparatus 1 configures the split status of the journal management table T11 to "Splitting" (S130). Next, the primary storage apparatus 1 creates a marker as a JNCB (S131). Here, the cases in which the time point of the time stamp exceeds the backup reservation time point may also include cases where both time points match.

In any of the cases when a backup creation is not reserved in the write-destination data volume 17 (S128: NO), when the backup creation of the write-destination data volume 17 has started (S128: NO), and when a backup creation is reserved; however, the time point of the time stamp does not reach the reservation time point (S129: NO), the primary storage apparatus 1 creates a regular JNCB, and stores the JNCB in the journal volume 18 (S132). That is, when the primary storage apparatus 1 determines that there is no need of reserving backup creation, the primary storage apparatus 1 performs a normal process without creating a marker (S132).

On creating either a JNCB that is a marker, or a regular JNCB, the primary storage apparatus 1 releases the lock of the journal management table T11 (S133). Then, the primary storage apparatus 1 creates journal data by copying the write data received from the host 4, and stores the created journal data in the journal volume 18 in association with the JNCB (S134).

The JNCB with which the journal data is associated includes, as described above, the JNCB that is a marker and that acts as a trigger for backup creation, and the regular JNCB. Since the JNCB that is a marker includes the entire information provided in the regular JNCB, it is possible to treat the JNCB that is a marker in much the same way as a regular JNCB in the secondary storage apparatus 3 that does not have any relation with backup creation. In some cases, the "JNCB that is a marker" may be abbreviated as a marker.

FIG. 27 shows a process for automatically performing a backup reservation that is configured for the primary data volume 17 used for a mainframe.

The process is executed periodically for each journal group (S140). When the predetermined cycle arrives (S140: YES), the primary storage apparatus 1 locks the journal management table T11 (S141). Hereinafter, the journal group to be processed is called a target journal group.

The primary storage apparatus 1 determines whether the primary data volume 17 for which a backup reservation is performed exists in the target journal group (S142). In particular, the primary storage apparatus 1 determines whether there exists a primary data volume 17 for which a backup reservation is performed, and for which a copy pair including the primary data volume 17 is not yet split.

When the primary storage apparatus 1 discovers the primary data volume 17 for which a backup reservation is performed (S142: YES), the primary storage apparatus 1 determines whether the current time point exceeds the backup reservation time point (S143). This also includes the case when the current time point matches the backup reservation time point (current time point≥backup reservation time point). The current time point may be acquired from an external NTP server 7, or may be acquired from a timer within the primary storage apparatus 1.

When the primary storage apparatus 1 determines that the current time point exceeds the backup reservation time point (S143: YES), the primary storage apparatus 1 further determines whether the current time point exceeds a TOV time from the reservation time point (S144). The primary storage apparatus 1 determines whether the time point obtained by adding the TOV time to the reservation time point exceeds the current time point (current time point≥reservation time point+TOV).

When the primary storage apparatus 1 determines that the TOV time has elapsed since the reservation time point (S144: YES), the primary storage apparatus 1 configures the split status to "Splitting" (S145), and creates a marker (S146). The primary storage apparatus 1 stores the created marker in the journal volume 18, and releases the lock of the journal management table T11 (S147).

Thus, in a case when a write command is not issued from the host 4A which is a mainframe even when the reservation time point has elapsed in the data volume 17 for a mainframe, the primary storage apparatus 1 automatically creates a marker at the time point when the TOV time has elapsed since the reservation time point. Even in a case when the host 4A does not update the primary data volume 17 even when the reservation time point designated by the user has elapsed, a marker is created automatically when the TOV time has elapsed since the reservation time point, because of which the convenience of a user improves.

FIG. 28 shows a process for creating a marker for a primary data volume 17 used for an open system. In the process, the storage management unit 401B and the primary storage apparatus 1 operate together.

The storage management unit 401B determines whether a predetermined cycle has arrived for each journal group (S150), and upon determining that the predetermined cycle has arrived (S150: YES), the primary storage apparatus 1 references the management table T40 (S151).

The storage apparatus management unit 401B determines whether there exists a primary data volume 17 in the target journal group for which a backup reservation is performed, and for which the backup has not started (S152). When there is no primary data volume 17 for which a backup reservation is performed (S152: NO), the primary storage apparatus 1 ends the process.

When there exists a primary data volume 17 for which a backup reservation is performed (S152: YES), the storage management function 401B determines whether the current time point exceeds the backup reservation time point (S153). When the current time point does not exceed the backup reservation time point (S153: NO), the primary storage apparatus 1 ends the process.

When the current time point exceeds the backup reservation time point (S153: YES), the storage management unit 401B configures the split status to "Splitting" (S154). Then, the storage management unit 401B issues a freeze command to the primary storage apparatus 1, and indicates to reserve backup creation (S155).

Upon receiving the freeze command from the storage management unit 401B (S156), the primary storage apparatus 1 locks the journal management table T11 (S157). The primary storage apparatus 1 registers the fact that a backup creation is reserved for the indicated generation in the backup management information of the journal management table T11 (S158). The primary storage apparatus 1 releases the lock of the journal management table T11 (S159), and replies to the storage management unit 401B that the reservation for backup creation is completed (S160).

Upon receiving the reservation completion notification from the primary storage apparatus 1, the storage management function 401B issues a RUN command for canceling the freeze command (S161). Upon receiving the RUN command (S162), the primary storage apparatus 1 resumes the process of the primary data volume 17 that was temporarily stopped (S163).

FIG. 29 shows a process executed when a storage apparatus that acts as a copy source of a copy pair provides journal data and a JNCB in response to a request (a journal read request) from a storage apparatus that acts as a copy destination. The process is executed by the primary storage apparatus 1 and the intermediate storage apparatus 2. In response to the journal read request (RD JNL) from the intermediate storage apparatus 2, the primary storage apparatus 1 provides the journal data and the JNCB to the intermediate storage apparatus 2. In response to the journal read request from the secondary storage apparatus 3, the intermediate storage apparatus 2 provides the journal data and the JNCB to the secondary storage apparatus 3. Hereinafter, a case in which the primary storage apparatus 1 receives the journal read request from the intermediate storage apparatus 2 is described as an example.

Upon receiving the journal read request from the intermediate storage apparatus 2 (S170), the primary storage apparatus 1 references the journal management table T11, and determines whether the state of the MID corresponding to the journal which is a read target is configured to "Start" (S171).

When the MID state is other than "Start" (S171: NO), the primary storage apparatus 1 copies a dummy JNCB and passes the dummy JNCB to the intermediate storage apparatus 2 (S172). The dummy JNCB is a JNCB that does not have substantial information for managing journal data, and is not related to restoring of a copy-destination volume.

When the MID state is configured to "Start" (S171: YES), the copy pair is operated such that the stored contents in the primary data volume 17 match the stored contents in the intermediate data volume 27. Thus, the primary storage apparatus 1 determines whether the journal data and the JNCB are not yet transmitted to the intermediate storage apparatus 2 (S173).

When the primary storage apparatus 1 determines that the journal data and the JNCB are not yet transmitted (S173: YES), the primary storage apparatus 1 copies the un-transmitted journal data and JNCB (S174), and passes the journal data and JNCB to the intermediate storage apparatus 2. The primary storage apparatus 1 configures "Already transmitted" in "Existence of transmission for each MID" of the JNCB management table T12 (S175).

When the un-transmitted journal data and JNCB do not exist (S173: NO), the primary storage apparatus 1 declines the journal read request (S176). Thus, in the present embodiment, in response to the journal read request from the copy-destination storage apparatus, the copy-source storage apparatus supplies the journal data and the JNCB to the copy-destination storage apparatus.

FIG. 30 shows a process in which journal data and a JNCB which are unnecessary are purged. The process is executed by the primary storage apparatus 1 and the intermediate storage apparatus 2. Here, a case in which the process is executed in the primary storage apparatus 1 is described as an example.

Upon receiving, from the intermediate storage apparatus 2 which is a copy destination, a notification denoting completion of a restore (S180), the primary storage apparatus 1 configures the state of the MID used for reading the journal data and the JNCB to "Restored" (S181).

The primary storage apparatus 1 determines whether a restore is complete for all MIDs that are configured to the "Start" state (S182). Upon confirming that all MIDs with the state configured to "Start" are changed to "Restored" (S182: YES), the primary storage apparatus 1 purges the already restored journal data and JNCB from the journal volume 18 (S183).

Same as a relationship between the intermediate storage apparatus 2 and each secondary storage apparatus 3, in some cases, the journal data and the JNCB are supplied from one journal group to a plurality of journal groups, and as a result, in step S182, the primary storage apparatus 1 confirms whether all the restores are complete. When there is even a single journal group not yet complete in being restored, in other words, when there remains an MID for which the state is not configured to "Restored" (S182: NO), the primary storage apparatus 1 ends the process.

FIG. 31 shows the process executed when a suspend completion is received. The process is executed in the primary storage apparatus 1. As described later, when backup creation is complete in the secondary storage apparatus 3 designated by a marker, the intermediate storage apparatus 2 reports suspend completion to the primary storage apparatus 1. In other words, the process shown in FIG. 31 is a process that is executed when the primary storage apparatus 1 receives a report denoting the completion of backup creation at a designated time point.

Upon receiving the suspend completion from the intermediate storage apparatus 2 (S190), the primary storage apparatus 1 changes the split status of the journal management table T11 to "Split completed" (S191).

The primary storage apparatus 1 determines whether the emulation type of the journal for which the suspend is complete is for an open system (S192). The backup creation for the data volume 17 used for an open system is managed in the storage management unit 401B in the host 4B which is an open system.

Thus, when the primary storage apparatus 1 determines that a suspend completion notification related to the data volume 17 for an open system is received (S192: YES), the primary storage apparatus 1 reports the completion of the suspend to the storage management unit 401B (S193). Upon receiving the suspend completion report (S194), the storage management unit 401B changes the split status in the management table T40 to "Split completed" (S195).

FIG. 32 shows a process of writing the journal data read from the primary storage apparatus 1 into the intermediate data volume 27 (restoring process), in the intermediate storage apparatus 2.

The intermediate storage apparatus 2 issues a journal read request to the primary storage apparatus 1 (S200). In particular, of the journal groups in the primary storage apparatus 1, the intermediate storage apparatus 2 issues a journal read request to the journal groups that form a copy pair with the journal groups configured in the intermediate storage apparatus 2.

The intermediate storage apparatus 2 reads the journal data and the JNCB from the journal volume 18 of the primary storage apparatus 1, and stores the journal data and the JNCB in the intermediate journal volume 28 (S201). The intermediate storage apparatus 2 determines whether the response of the primary storage apparatus 1 is normal (S202). When the response is not normal (S202: NO), the intermediate storage apparatus 2 ends the process.

When the intermediate storage apparatus 2 determines that the response of the primary storage apparatus 1 is normal (S202: YES), the intermediate storage apparatus 2 determines whether the JNCB received in step S201 is other than a dummy JNCB, that is, whether a regular JNCB or a marker is received in step S201 (S203). When the intermediate storage apparatus 2 receives a dummy JNCB from the primary storage apparatus 1 (S203: NO), the intermediate storage apparatus 2 ends the process. When the intermediate storage apparatus 2 receives the dummy JNCB, and when the MID state of the journal group related to the dummy JNCB is "Discontinuation received", the intermediate storage apparatus 2 transits the MID state to "Discontinuing", and executes the suspend process between the primary storage apparatus 1 and the intermediate storage apparatus 2.

When the intermediate storage apparatus 2 receives a JNCB (that is, a regular JNCB or a marker) other than the dummy JNCB (S203: YES), the intermediate storage apparatus 2 writes and restores the journal data received in step S201 into the intermediate data volume 27 (S204). As described above, the intermediate data volume 27 acts as the secondary-side volume (SVOL) for the primary data volume 17 of the primary storage apparatus 1, and acts as the primary-side volume (PVOL) for the secondary volume 37 of the secondary storage apparatus 3. Therefore, in FIG. 32, the intermediate data volume 27 is represented as "SVOL".

When the restoring process is complete for the intermediate data volume 27, the intermediate storage apparatus 2 reports the completion of the restore to the primary storage apparatus 1 (S205). Then, the intermediate storage apparatus 2 determines whether the attribute of the intermediate journal volume 28 is "M/R" (S206). The "M/R" attribute is SVOL (the R attribute) for the primary journal volume 18, and PVOL (the M attribute) for the secondary journal volume 38.

When the intermediate journal volume 28 is configured in the "M/R" attribute (S206: YES), the intermediate storage apparatus 2 creates a JNCB for copying to the secondary journal volume 38 of the secondary storage apparatus 3, and then stores the JNCB in the intermediate journal volume 28 (S207). The JNCB for supplying to the secondary journal volume 38 is created on the basis of the JNCB read from the primary journal volume 18.

FIG. 33 shows a suspend process executed in the intermediate storage apparatus 2. Upon receiving a suspend completion from the secondary storage apparatus 3 (S210), the intermediate storage apparatus 2 changes the state of the target MID to "Discontinuing" (S211), and changes the state of all copy pairs related to the target MID to "Suspending" (S212).

Upon receiving the journal read request from the secondary storage apparatus 3 (S213), the intermediate storage apparatus 2 determines whether the state of the MID related to the journal read request is configured to other than "Start" (S214). When the MID state is "Start" (S214: NO), the intermediate storage apparatus 2 executes the regular journal read request process in order to synchronize the stored contents in the intermediate data volume 27 and the stored contents in the secondary data volume 37 (S218). In the regular journal read request process, the intermediate storage apparatus 2 supplies the journal data and the JNCB to the secondary storage apparatus 3.

When the MID state is other than "Start" (S214: YES), the intermediate storage apparatus 2 copies the dummy JNCB to the intermediate journal volume 28 (S215).

Upon receiving, from the secondary storage apparatus 3, a notification to the effect that discontinuation of the journal read request is complete (S216), the intermediate storage apparatus 2 transits the state of the MID of the journal management table T21 to "Stopping" (S217). Next, a description is provided for the flowchart shown in FIG. 34.

The intermediate storage apparatus 2 determines whether the restoring process is complete for all MIDs that are configured to the "Start" state (S219). When the restoring process is complete (S219: YES), the intermediate storage apparatus 2 purges the unnecessary journal data and JNCB from the intermediate journal volume 28 (S220). In the area that is made available due to purging, other new journal data and JNCBs are stored in any case.

The intermediate storage apparatus 2 configures a differential bitmap for managing differences between volumes that form a copy pair (S221). Steps S219 through S221 are executed for all JNCBs of the suspend target generation (backup creation target generation) for which the restoring process is not executed. That is, each time journal data is restored, the journal data and the JNCB are purged from the intermediate journal volume 28.

Upon receiving, from the secondary storage apparatus 3, a notification to the effect that stopping of the journal read request process ends (S222), the intermediate storage apparatus 2 transits the MID state to "Stopped" (S223), and transits the state of the copy pair to "Suspended" (5224). Then, the intermediate storage apparatus 2 notifies the primary storage apparatus 1 that the suspend is completed (S225).

FIG. 35 shows a restoring process executed in the secondary storage apparatus 3. The secondary storage apparatus 3 issues a journal read request to the intermediate storage apparatus 2 (S230), and receives the journal data and the JNCB from the intermediate journal volume 28 of the intermediate storage apparatus 2 (S231).

The secondary storage apparatus 3 determines whether the intermediate storage apparatus 2 has responded normally (S232), and when the intermediate storage apparatus 2 has not responded normally (S232: NO), the secondary storage apparatus 3 ends the process. When the intermediate storage apparatus 2 has responded normally (S232: YES), the secondary storage apparatus 3 determines whether other than the dummy JNCB is received from the intermediate journal volume 28 (S233). When the dummy JNCB is received (S233: NO), the secondary storage apparatus 3 ends the process.

When other than the dummy JNCB is received (S233: YES), the secondary storage apparatus 3 references the received JNCB (S234), and determines whether the JNCB is a marker (S235).

When the secondary storage apparatus 3 determines that a marker is received from the intermediate journal volume 28 (S235: YES), the secondary storage apparatus 3 determines whether the generation denoted by the marker is the generation that is managed by the secondary storage apparatus 3 (S236).

When the secondary storage apparatus 3 determines that the generation denoted by the marker is the generation that is managed by the secondary storage apparatus 3 (S236: YES), that is, when the secondary storage apparatus 3 determines that a backup creation in the secondary storage apparatus 3 is indicated, the secondary storage apparatus 3 creates a backup as shown below (S237 through S40).

The secondary storage apparatus 3 writes and restores all journal data having a sequence number lower than the sequence number denoted by the marker, into the secondary data volume 37 according to the specified order (S237).

For example, when the time point denoted by the marker is "10:00", the secondary storage apparatus 3 restores, into the secondary data volume 37, the journal data corresponding to the time point that does not reach "10:00" (for example, the journal data issued up to 9:59:59) from the unprocessed journal data.

When the secondary storage apparatus 3 restores, into the secondary data volume 37, the journal data up to the time point denoted by the marker, the secondary storage apparatus 3 stops the restoring process (S238). The secondary storage apparatus 3 transits the MID state to "Discontinuation received" (S239), and indicates the MID of the intermediate storage apparatus 2 to be suspended (S240).

On the other hand, in any of the cases when the JNCB received from the intermediate journal volume 28 is not a marker (S235: NO), or when the received marker is an indication for another secondary storage apparatus 3 (S236: NO), the secondary storage apparatus 3 proceeds with the process as for a regular JNCB.

In other words, the secondary storage apparatus 3 restores the journal data into the secondary data volume 37 on the basis of the JNCB (S241), and notifies completion of the restore to the intermediate storage apparatus 2 (S242). The secondary storage apparatus 3 notifies the intermediate storage apparatus 2 of the completion of the restore (S242), and purges, from the secondary journal volume 38, the journal data and the JNCB that is no longer needed due to the completion of the restore (S243). Next, FIG. 36 is described.

Here, again, the secondary storage apparatus 3 issues a journal read request to the intermediate storage apparatus 2 (S244), and reads and receives the journal data and the JNCB from the intermediate journal volume 28 (S245).

The secondary storage apparatus 3 determines whether the intermediate storage apparatus 2 has responded normally (S246), and when the intermediate storage apparatus 2 has responded normally (S246: YES), the secondary storage apparatus 3 determines whether a dummy JNCB is received (S247). When the intermediate storage apparatus 2 has not responded normally (S246: NO), or a JNCB other than a dummy JNCB (that is, a regular JNCB or a marker) is received (S247: NO), the secondary storage apparatus 3 ends the process.

When a dummy JNCB is read from the intermediate journal volume 28 of the intermediate storage apparatus 2 (S247: YES), the secondary storage apparatus 3 executes the following end process (S248 through S257).

The secondary storage apparatus 3 configures the MID state to "Discontinuing" (S248), configures the state of the copy pair to "Suspending" (S249), and then stops the issue of the journal read request (S250).

Then, the secondary storage apparatus 3 changes the MID state to "Stopping" (S251), and notifies "Discontinuation completed" to the pair-source journal group (the journal group within the intermediate storage apparatus 2) (S252).

The secondary storage apparatus 3 purges the unrestored journal data and JNCB from the secondary journal volume 38 (S253). This is because a backup is created at the designated time point denoted by the marker, and therefore, the journal data corresponding to a time point later than the designated time point is not needed.

The secondary storage apparatus 3 configures a differential bitmap (S254), and manages differences between the intermediate data volume 27 and the secondary data volume 37 that occur later than the time point of backup creation.

The secondary storage apparatus 3 transits the MID state to "Stopped" (S255), then changes the state of the copy pair to "Suspended" (S256), and notifies "Stop completed" to the pair-source journal group (S257).

In the present embodiment, by requesting a suspend to the intermediate storage apparatus 2 (S240 in FIG. 35), and then issuing a journal read request to the intermediate storage apparatus 2, the secondary storage apparatus 3 inquires whether the suspend is complete in the intermediate storage apparatus 2 (S244 through S247 in FIG. 36). When the JNCB read from the intermediate storage apparatus 2 is a dummy JNCB (S247: YES), the secondary storage apparatus 3 confirms that the suspend is complete in the intermediate storage apparatus 2. In other words, upon being requested to perform the suspend by the secondary storage apparatus 3, the intermediate storage apparatus 2 need not send a notification to the effect that the suspend is complete, from the intermediate storage apparatus 2 to the secondary storage apparatus 3. It is possible to inform the completion of the suspend from the intermediate storage apparatus 2 to the secondary storage apparatus 3 by using the mechanism of an asynchronous remote copying system using journal data and JNCBs.

FIG. 37 is an explanatory diagram showing the transition of the MID state. The left side shows the MID state in the secondary storage apparatus 3, and the right side shows the MID state in the intermediate storage apparatus 2.

The MID state, for example, transits as "Initial", "Start", "Discontinuation received", "Discontinuing", "Stopping", and "Stopped". When the MID state transits to "Discontinuation received", the secondary storage apparatus 3 indicates the intermediate storage apparatus 2 to be suspended. Upon receiving the indication to be suspended, the intermediate storage apparatus 2 transits the MID state of the intermediate storage apparatus 2 to "Discontinuing", creates a dummy JNCB, and supplies the dummy JNCB to the secondary storage apparatus 3.

Upon reading the dummy JNCB from the intermediate storage apparatus 2, the secondary storage apparatus 3 transits the state of the MID at the secondary storage apparatus 3 side to "Discontinuing". Thereafter, the MID state at the secondary storage apparatus 3 side transits from "Stopping" to "Stopped".

In the present embodiment that is thus configured, it is possible to share a process of creating, at a secondary site, a backup of the data volume 17 at a primary site among the primary storage apparatus 1 at the primary site, the intermediate storage apparatus 2 at an intermediate site, and the secondary storage apparatus 3 at the secondary site. Therefore, in the present embodiment, it is possible to prevent the exertion of excessive load on a single storage apparatus in the backup creation process.

In the present embodiment, by managing a backup creation time point in the host 4B which is an open system, it is possible to create a backup at a designated time point even for the data volume 17 for an open system. This leads to an improvement in convenience of a user.

In the present embodiment, an indication is given for backup creation at a designated time point at a primary site. As a result, a user need not give an indication or make configuring for an intermediate site or a secondary site, which leads to improved convenience.

In the present embodiment, a marker for indicating backup creation is created as a JNCB, and the backup creation at a designated time point is indicated in a mechanism of a regular asynchronous remote copying using journal data and JNCBs. Therefore, there is no need of preparing a special indication form for creating a backup at a designated time point, which enables an improvement in convenience of a user while preventing an increase in a manufacturing cost.

In the present embodiment, when a backup reservation time point of the data volume 17 for a mainframe is exceeded by an upper-limit time (Toy time), a marker for indicating backup creation is created automatically. As a result, it is possible to prevent the occurrence of an event where the issue of a write I/O from the host 4A which is a mainframe exceeds the backup reservation time point causing a significant delay in the backup creation.

In the present embodiment, by issuing a journal read request to a copy-source storage apparatus, a copy-destination storage apparatus that forms an asynchronous remote copy pair reads the journal data and the JNCB from the copy-source storage apparatus. Therefore, it is possible to improve the copying speed as compared to a method in which the journal data and the JNCB are sent from the coy-source storage apparatus to the copy-destination storage apparatus.

It is noted that the present invention is not limited to the above-described embodiments. A person skilled in the art can perform various additions, modifications, etc., within the scope of the present invention. Various types of characteristics of the above-described present embodiment can be combined together and used.

REFERENCE SIGNS LIST

1: Primary storage apparatus, 2: Intermediate storage apparatus, 3: Secondary storage apparatus, 4A, 4B: Host, 17: Primary data volume, 18: Primary journal volume, 27: Intermediate data volume, 28: Intermediate journal volume, 37: Secondary data volume, 38: Secondary journal volume

The invention claimed is:

1. A storage system, comprising a plurality of storage control apparatuses, wherein
out of the plurality of storage control apparatuses, a primary storage control apparatus comprises:
a primary data volume used by a primary-side host apparatus; and
a primary journal volume associated with the primary data volume, which is also configured to store journal data generated from write data that is written into the primary data volume by the primary-side host apparatus, and journal management information for managing the journal data,
at least one secondary storage control apparatus included in the plurality of storage control apparatuses comprises:
a secondary data volume for forming a backup of the primary data volume; and
a secondary journal volume associated with the secondary data volume, which is configured to store the journal data and the journal management information managed in the primary journal volume,
out of the plurality of storage control apparatuses, an intermediate storage control apparatus provided between the primary storage control apparatus and the secondary storage control apparatus comprises:
an intermediate data volume capable of forming both a copy pair in which the primary data volume is a copy source, and a copy pair in which the secondary data volume is a copy destination; and
an intermediate journal volume associated with the intermediate data volume, which is configured to read and acquire, from the primary journal volume, the journal data and the journal management information managed in the primary journal volume, and pass the acquired journal data and journal management information in response to a read request from the secondary journal volume,
the primary storage control apparatus is configured to:
create predetermined journal management information including a backup creation reservation time point and backup-destination designation information for designating a secondary data volume for which the backup is created on the basis of backup reservation information, and store, in the primary journal volume, the predetermined journal management information that is created, the intermediate storage control apparatus is configured to:
read the journal data and the journal management information including the predetermined journal management information from the primary journal volume, and store the data and the information in the intermediate journal volume, and the secondary storage control apparatus is configured to:
read the journal data and the journal management information including the predetermined journal management information from the intermediate journal volume, and store the data and the information in the secondary journal volume, determine whether the backup-destination designation information included in the predetermined journal management information denotes the secondary data volume, when it is determined that the backup-destination designation information denotes the secondary data volume, out of the journal data stored in the secondary journal volume, the secondary storage control apparatus is configured to restore the journal data up to the creation reservation time point included in the predetermined journal management information into the secondary data volume, and after completion of restoring, cancel the copy pair of the secondary data volume and the intermediate data volume, and create a backup of the primary data volume corresponding to the creation reservation time point.

2. The storage system according to claim 1, wherein upon determining that the backup-destination designation information included in the predetermined journal management information does not denote the secondary data volume, the secondary storage control apparatus is configured to handle the predetermined journal management information as other journal management information, and restore, into the secondary data volume, the journal data corresponding to the predetermined journal management information of the journal data stored in the secondary journal volume.

3. The storage system according to claim 2, wherein when the secondary storage control apparatus restores the journal data up to the creation reservation time point into the secondary data volume, the secondary storage control apparatus is configured to issue a suspend indication to the intermediate storage control apparatus, upon receiving the suspend indication from the secondary storage control apparatus, the intermediate storage control apparatus is configured to configure a copy pair of the intermediate data volume and the secondary data volume to a suspend state, and issue a suspend indication to the primary storage control apparatus, and upon receiving the suspend indication from the intermediate storage control apparatus, the primary storage control apparatus is configured to configure a copy pair of the primary data volume and the intermediate data volume to a suspend state.

4. The storage system according to claim 3, wherein when the secondary storage control apparatus restores the journal data up to the creation reservation time point into the secondary data volume, the secondary storage control apparatus is configured to issue a suspend indication to the intermediate storage control apparatus, and thereafter, request the intermediate journal volume to read the journal data and the journal management information, upon receiving the suspend indication from the secondary storage control apparatus, the intermediate storage control apparatus is configured to configure the copy pair of the intermediate data volume and the secondary data volume to a suspending state, and thereafter, in response to a request for reading the journal data and the journal management information from the secondary storage control apparatus to the intermediate journal volume, the intermediate storage control apparatus is configured to supply, to the secondary storage control apparatus, journal management information for state notification denoting that the copy pair of the intermediate data volume and the secondary data volume is configured to a suspending state, upon acquiring the journal management information for state notification from the intermediate storage control apparatus, the secondary storage control apparatus is configured to configure the copy pair of the intermediate data volume and the secondary data volume to a suspend state, and notify that the suspend state is configured, to the intermediate storage control apparatus, upon receiving the notification to the effect that the suspend state is configured, from the secondary storage control apparatus, the intermediate storage control apparatus is configured to configure the copy pair of the intermediate data volume and the secondary data volume to a suspend state, and issue a suspend indication to the primary storage control apparatus, and upon receiving the suspend indication from the intermediate storage control apparatus, the primary storage control apparatus is configured to configure the copy pair of the primary data volume and the intermediate data volume to a suspend state, and notify, to management apparatuses for indicating the primary storage control apparatus about the copy pair and the backup, completion of the backup creation.

5. The storage system according to claim 4, wherein the secondary storage control apparatus is provided for each backup generation, a copy pair management number is configured for each backup generation, a communication path is configured between the intermediate storage control apparatus and the secondary storage control apparatus of each backup generation, and by designating the backup generation, a copy pair management number corresponding to the designated backup generation is specified.

6. The storage system according to claim 5, wherein the primary storage control apparatus is configured to acquire the backup reservation information from the management apparatus.

7. The storage system according to claim 6, wherein the primary-side host apparatus is a mainframe-type host apparatus configured as a mainframe, of the management apparatuses, a management apparatus corresponding to a mainframe-type host apparatus is configured to create a backup reservation information including the creation reservation time point, and an upper-limit standby time when a backup is not created even after the creation reservation time point has elapsed, and indicate the primary storage control apparatus, and the primary storage control apparatus is configured to:
compare a time point at which the write data is written and the creation reservation time point upon receiving write data for the primary data volume from the mainframe-type host apparatus, the primary storage control apparatus;

create the journal data and the journal management information and store the data and the information in the primary journal volume, when the time point at which the write data is written does not exceed the creation reservation time point;

create the journal data and the predetermined journal management information, and store the data and the information in the primary journal volume, when the time point at which the write data is written exceeds the creation reservation time point; and create the predetermined journal management information, and store the information in the primary journal volume, when the mainframe-type host apparatus does not write the write data into the primary data volume regardless of the fact that the current time point exceeds the time point obtained by adding the upper-limit standby time to the creation reservation time point.

8. The storage system according to claim 7, wherein the primary-side host apparatus also includes an open-type host apparatus configured as an open system, out of the management apparatuses, a management apparatus corresponding to the open-type host apparatus is configured to:

retain backup reservation information including the creation reservation time point;

indicate, to the primary storage control apparatus, when the current time point reaches the creation reservation time point, to prohibit a process on the primary data volume; and notify, to the primary storage control apparatus, the retained backup reservation information, and the primary storage control apparatus is configured to:

prohibit the process on the primary data volume, when a prohibition of the process on the primary data volume is received from the management apparatus; and create the predetermined journal management information including the creation reservation time point, and store the information in the primary journal volume.

9. The storage system according to claim 1, wherein the copy pair is formed as an asynchronous remote copy pair.

10. A backup creating method of creating a backup of a storage system in the storage system comprising a plurality of storage control apparatuses, wherein the storage system includes: a primary storage control apparatus; an intermediate storage control apparatus coupled to the primary storage control apparatus so as to communicate with the primary storage control apparatus; and at least one secondary storage control apparatus coupled to the intermediate storage control apparatus so as to communicate with the intermediate storage control apparatus, the primary storage control apparatus comprises: a primary data volume used by a primary-side host apparatus; and a primary journal volume associated with the primary data volume, which is configured to store journal data generated from write data that is written into the primary data volume by the primary-side host apparatus, and journal management information for managing the journal data, the secondary storage control apparatus comprises: a secondary data volume for forming a backup of the primary data volume; and a secondary journal volume associated with the secondary data volume, which is configured to store the journal data and the journal management information managed in the primary journal volume, the intermediate storage control apparatus comprises: an intermediate data volume capable of forming both a copy pair in which the primary data volume is a copy source, and a copy pair in which the secondary data volume is a copy destination; and an intermediate journal volume associated with the intermediate data volume, and which is configured to read and acquire, from the primary journal volume, the journal data and the journal management information managed in the primary journal volume, and pass the acquired journal data and journal management information in response to a read request from the secondary journal volume, the primary storage control apparatus is configured to:

create predetermined journal management information including a backup creation reservation time point and backup-destination designation information for designating a secondary data volume for which the backup is created on the basis of backup reservation information; and store, in the primary journal volume, the predetermined journal management information that is created, and the intermediate storage control apparatus is configured to:

read the journal data and the journal management information including the predetermined journal management information from the primary journal volume, and store the data and the information in the intermediate journal volume, and the secondary storage control apparatus is configured to:

read the journal data and the journal management information including the predetermined journal management information from the intermediate journal volume, and store the data and the information in the secondary journal volume;

determine whether the backup-destination designation information included in the predetermined journal management information denotes the secondary data volume;

restore the journal data up to the creation reservation time point included in the predetermined journal management information into the secondary data volume, when it is determined that the backup-destination designation information denotes the secondary data volume, out of the journal data stored in the secondary journal volume; and cancel the copy pair of the secondary data volume and the intermediate data volume after completion of restoring to thereby create a backup of the primary data volume corresponding to the creation reservation time point.

11. The method of creating a backup of a storage system according to claim 10, wherein upon determining that the backup-destination designation information included in the predetermined journal management information does not indicate the secondary data volume, the secondary storage control apparatus is configured to handle the predetermined journal management information as other journal management information, and restore, into the secondary data volume, the journal data corresponding to the predetermined journal management information of the journal data stored in the secondary journal volume.

12. The method of creating a backup of a storage system according to claim 11, wherein when the secondary storage control apparatus restores the journal data up to the creation reservation time point into the secondary data volume, the secondary storage control apparatus is configured to issue a suspend indication to the intermediate storage control apparatus,
  upon receiving the suspend indication from the secondary storage control apparatus, the intermediate storage control apparatus is configured to configure a copy pair of the intermediate data volume and the secondary data volume to a suspend state, and issue a suspend indication to the primary storage control apparatus, and
  upon receiving the suspend indication from the intermediate storage control apparatus, the primary storage control apparatus is configured to configure a copy pair of the primary data volume and the intermediate data volume to a suspend state.

13. The method of creating a backup of a storage system according to claim 12, wherein when the secondary storage control apparatus restores the journal data up to the creation reservation time point into the secondary data volume, the secondary storage control apparatus is configured to issue a suspend indication to the intermediate storage control apparatus, and thereafter, request the intermediate journal volume to read the journal data and the journal management information,
  upon receiving the suspend indication from the secondary storage control apparatus, the intermediate storage control apparatus is configured to configure the copy pair of the intermediate data volume and the secondary data volume to a suspending state, and thereafter, in response to a request for reading the journal data and the journal management information from the secondary storage control apparatus to the intermediate journal volume, the intermediate storage control apparatus is configured to supply, to the secondary storage control apparatus, journal management information for state notification denoting that the copy pair of the intermediate data volume and the secondary data volume is configured to a suspending state,
  upon acquiring the journal management information for state notification from the intermediate storage control apparatus, the secondary storage control apparatus is configured to configure the copy pair of the intermediate data volume and the secondary data volume to a suspend state, and notify that the suspend state is configured, to the intermediate storage control apparatus,
  upon receiving the notification to the effect that the suspend state is configured, from the secondary storage control apparatus, the intermediate storage control apparatus is configured to configure the copy pair of the intermediate data volume and the secondary data volume to a suspend state, and issue a suspend indication to the primary storage control apparatus, and
  upon receiving the suspend indication from the intermediate storage control apparatus, the primary storage control apparatus is configured to configure the copy pair of the primary data volume and the intermediate data volume to a suspend state, and notify, to management apparatuses for indicating the primary storage control apparatus about the copy pair and the backup, completion of the backup creation.

* * * * *